US008496746B2

(12) United States Patent
Teramoto et al.

(10) Patent No.: US 8,496,746 B2
(45) Date of Patent: Jul. 30, 2013

(54) INK COMPOSITION AND INK JET RECORDING METHOD USING THE SAME

(75) Inventors: Ryosuke Teramoto, Matsumoto (JP); Shigemi Wakabayashi, Shiojiri (JP); Kazuhiko Kitamura, Matsumoto (JP); Yasuhiro Oki, Matsumoto (JP); Yasunari Ikeda, Shiojiri (JP); Hiromi Iseki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/396,797

(22) Filed: Feb. 15, 2012

(65) Prior Publication Data

US 2012/0213930 A1  Aug. 23, 2012

(30) Foreign Application Priority Data

Feb. 21, 2011  (JP) ................. 2011-034296

(51) Int. Cl.
C09D 11/02 (2006.01)
(52) U.S. Cl.
USPC ...................... 106/31.48; 106/31.5
(58) Field of Classification Search
USPC ............... 106/31.48, 31.5; 427/256; 347/100
See application file for complete search history.

(56) References Cited

U.S. PATENT DOCUMENTS

| 7,052,538 | B2* | 5/2006 | Mistry et al. | 106/31.5 |
| 7,094,279 | B2* | 8/2006 | Hanmura et al. | 106/31.48 |
| 7,211,132 | B2* | 5/2007 | Oki et al. | 106/31.48 |
| 7,465,346 | B2* | 12/2008 | Fukumoto et al. | 106/31.48 |
| 7,637,992 | B2* | 12/2009 | Mistry | 106/31.5 |
| 7,638,609 | B2* | 12/2009 | Mistry et al. | 534/551 |
| 7,704,310 | B2* | 4/2010 | Devonald | 106/31.5 |
| 7,704,311 | B2* | 4/2010 | Tojo | 106/31.48 |

(Continued)

FOREIGN PATENT DOCUMENTS

| JP | 2002-003740 A | 1/2002 |
| JP | 2006-176585 A | 7/2006 |
| WO | WO 2011/043184 A1 * | 4/2011 |

OTHER PUBLICATIONS

Extended European Search Report issued Jun. 4, 2012 for Application No. 12152519.0 (4 pages).

*Primary Examiner* — Helene Klemanski
(74) *Attorney, Agent, or Firm* — Nutter McClennen & Fish LLP; John J. Penny, V

(57) ABSTRACT

An ink composition includes: water, a compound represented by the following general formula (1) or a salt thereof, and a compound represented by the following general formula (21) or a salt thereof.

(1)

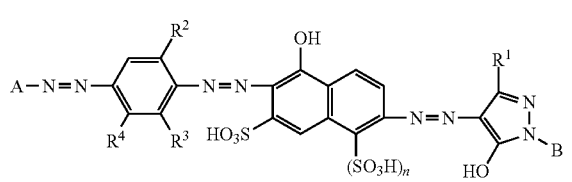

(in the formula (1), n represents 0 or 1, each of $R^1$, $R^2$, $R^3$, and $R^4$ represents a substituent, Group A represents a substituted heterocyclic group represented by the following general formula (2) or (3):

(2)

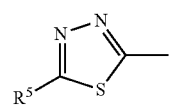

in the formula (2), $R^5$ represents a substituent.

(3)

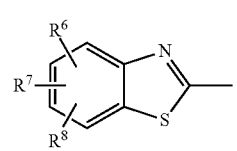

in the formula (3), each of $R^6$, $R^7$, and $R^8$ represents a substituent, and Group B has a substituted phenyl group or naphthyl group).

(21)

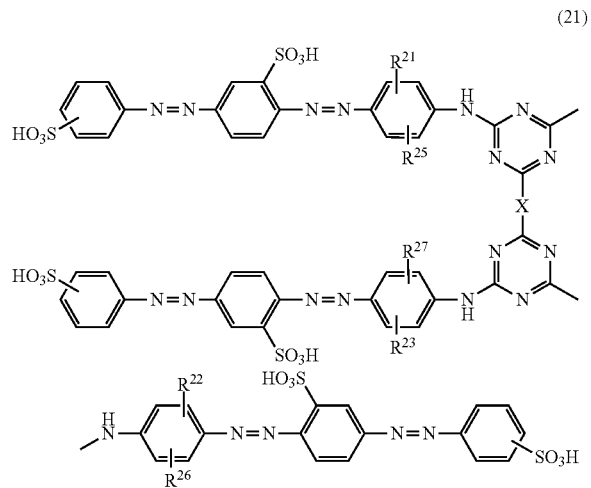

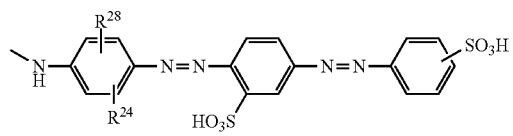

(in the formula (21), each of $R^{21}$, $R^{22}$, $R^{23}$, $R^{24}$, $R^{25}$, $R^{26}$, $R^{27}$, and $R^{28}$ represents a substituent, and X represents a divalent crosslinking group).

20 Claims, No Drawings

U.S. PATENT DOCUMENTS

| | | | |
|---|---|---|---|
| 7,740,695 B2 * | 6/2010 | Kitamura et al. | 106/31.48 |
| 7,887,627 B2 * | 2/2011 | Rengaswamy et al. | 106/31.5 |
| 8,372,190 B2 * | 2/2013 | Tateishi et al. | 106/31.5 |
| 2005/0126435 A1 | 6/2005 | Hanmura et al. | |
| 2007/0263056 A1 | 11/2007 | Fukumoto et al. | |
| 2008/0257206 A1 | 10/2008 | Rengaswamy et al. | |
| 2010/0118067 A1 * | 5/2010 | Morita et al. | 347/9 |
| 2012/0202019 A1 * | 8/2012 | Matsui et al. | 534/796 |

* cited by examiner

INK COMPOSITION AND INK JET RECORDING METHOD USING THE SAME

The entire disclosure of Japanese Application No: 2011-034296 filed on Feb. 21, 2011 is expressly incorporated by reference herein.

BACKGROUND

1. Technical Field

The present invention relates to an ink composition and an ink jet recording method using the same.

2. Related Art

There has been an ink composition known in the related art, including a dye as a coloring material. The ink composition including a dye as a coloring material is used in a variety of fields, and according to the field, it is required to perform recording an image having excellent balance between color developing density and color. The color developability or the color of the image recorded by using the ink composition is often attributed to the dye included in the ink composition. Therefore, the dye included in the ink composition can provide a recorded image with excellent color developability, and it is required to have excellent balance of the colors in order to obtain an image having a desired color.

On the other hand, the ink composition is used in various applications, and may be employed in some cases in, for example, an ink jet recording method. The ink jet recording method is a method in which liquid droplets of the ink composition are ejected from an ink jet recording head or the like, and the liquid droplets are adhered onto a recording medium, so as to perform image recording.

The image obtained by the ink jet recording method is used under various types of environments. For example, an image provided outdoors is allowed to be irradiated with solar light or the like, or to be exposed to a gas in the atmosphere (for example, ozone, nitrogen oxides, sulfur oxides, and the like). The image placed in such an environment may have temporary reduction in the color density due to decomposition of a dye or the like included in the ink composition that is used for forming an image in some cases. In this regard, it is described that a dye having good light resistance, gas resistance, or the like is added to an ink composition in JP-A-2006-176585.

However, an image recorded using the above-described ink composition may not have excellent balance between color developability and color or may not have reduction in light resistance and gas resistance in some cases. Further, in the case of storing the ink composition as described above, the dye may be decomposed in the ink composition, which leads to reduction in the storage stability of the ink composition in some cases.

SUMMARY

An advantage of some aspects of the invention is to provide an ink composition having excellent balance between color developability and color as well as excellent gas resistance.

Application Example 1

An ink composition according to an aspect of the invention includes water, a compound represented by the following general formula (1) or a salt thereof, and a compound represented by the following general formula (21) or a salt thereof.

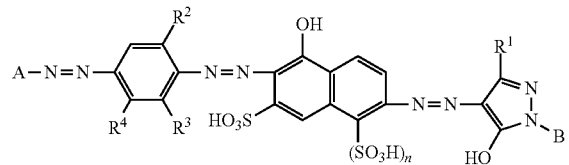

(in the formula (1), n represents 0 or 1, $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group, $R^2$, $R^3$, and $R^4$ each independently represent a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy-C1-C4 alkoxy group, a sulfo group, or a carboxy group; a mono- or di-C1-C4 alkylamino group which may be substituted with a hydroxy group, a sulfo group, or a carboxy group; a C1-C4 alkylcarbonylamino group which may be substituted with a hydroxy group or a carboxy group; an N'—C1-C4 alkylureide group which may be substituted with a hydroxy group, a sulfo group, or a carboxy group; a phenylamino group in which a benzene ring may be substituted with a chlorine atom, a C1-C4 alkyl group, a nitro group, a sulfo group, or a carboxy group; a benzoylamino group in which a benzene ring may be substituted with a chlorine atom, a C1-C4 alkyl group, a nitro group, a sulfo group, or a carboxy group; or a phenylsulfonylamino group in which a benzene ring may be substituted with a chlorine atom, a C1-C4 alkyl group, a nitro group, a sulfo group, or a carboxy group, and Group A represents a substituted heterocyclic group represented by the following general formula (2) or (3)):

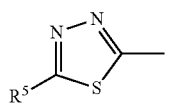

(in the formula (2), $R^5$ represents a mercapto group; or a C1-C4 alkylthio group which may be substituted with a hydroxy group, a C1-C4 alkoxy group, a hydroxy-C1-C4 alkoxy group, a sulfo group, or a carboxy group).

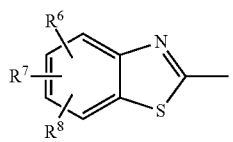

(in the formula (3), $R^6$, $R^7$, and $R^8$ each independently represent a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group which may be substituted with a hydroxy group, a C1-C4 alkoxy group, a sulfo group, or a carboxy group; a C1-C4 alkylsulfonyl group which may be substituted with a hydroxy group, a sulfo group, or a carboxy group; or a phenylsulfonyl group in which a benzene ring may be substituted with a chlorine atom, a C1-C4 alkyl group, a nitro group, a sulfo group, or a carboxy group, Group B represents a substituted phenyl group or naphthyl group, in the case where the Group B is a substituted phenyl group, it has a substituent selected from the group consisting of a hydroxy group; a sulfo group; a carboxy group; a C1-C4 alkyl group; a C1-C4 alkoxy group; an amino group; a mono- or di-C1-C4 alkylamino group; an acetylamino group; and a benzoylamino group in which a benzene ring may be substituted with a chlorine atom, a C1-C4 alkyl group, a nitro group, a sulfo group, or a carboxy group, and in the case where the Group B is a substituted naphthyl group, it has a substituent selected from the group consisting of a hydroxy group; a sulfo group; a C1-C4 alkoxy group; and a phenylsulfonyloxy group in which a benzene ring may be substituted with a methyl group, a nitro group, or a chlorine atom).

a substituent; a di-C1-C4 alkylureide group substituted with at least one group selected from the group consisting of a hydroxy group, a sulfo group, and a carboxy group as a substituent; a benzoylamino group; a benzoylamino group in which a benzene ring is substituted with at least one group selected from the group consisting of a halogen atom, a C1-C4 alkyl group, a nitro group, a sulfo group, and a carboxy group; a benzenesulfonylamino group; or a phenylsulfonylamino group in which a benzene ring is substituted with at least one group selected from the group consisting of halogen atom, a C1-C4 alkyl group, a nitro group, a sulfo group, and a carboxy group; and X represents a divalent crosslinking group).

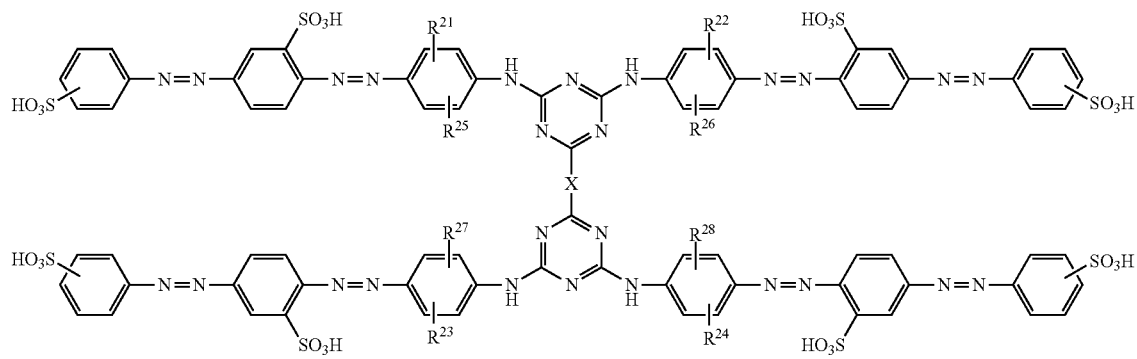

(21)

(in the formula (21), $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group which is substituted with at least one group selected from the group consisting of a hydroxy group, a C1-C4 alkoxy group, a hydroxy-C1-C4 alkoxy group, a sulfo group, and a carboxy group as a substituent; a C1-C4 alkylcarbonylamino group; a C1-C4 alkylcarbonylamino group substituted with a carboxy group; a ureide group; a mono-C1-C4 alkylureide group; a di-C1-C4 alkylureide group; a mono-C1-C4 alkylureide group substituted with at least one group selected from the group consisting of a hydroxy group, a sulfo group, and a carboxy group as By the ink composition described in Application Example 1, an image having excellent balance between color developability and color as well as excellent light resistance and light resistance can be recorded, and the storage stability is excellent. Further, the "image" as used in the invention refers to a print pattern formed with a group of dots, which includes a text print and a solid print.

Application Example 2

In Application Example 1, the ink composition may further include a compound represented by the following general formula (51).

(51)

(in the formula (51), $R^{51}$ represents a halogen atom; a hydrogen atom; $SO_3M$; or COOM; $R^{52}$ and $R^{53}$ each independently represent a hydrogen atom; $SO_3M$; or COOM; and M's each independently represent at least one of Li and Na, provided that there is no case where all of $R^{52}$ and $R^{53}$ are hydrogen atom).

Application Example 3

In Application Example 1 or 2, the divalent crosslinking group represented by X in the general formula (21) may be any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which an alkyl moiety is substituted with a hydroxy group or a carboxy group; an amino-C1-C6 alkoxy-C1-C6 alkylamino group; an amino-C1-C4 alkoxy-C1-C4 alkoxy-C1-C4 alkylamino group; a xylenediamino group; a piperazine-1,4-diyl group; a piperazine-1,4-diyl group substituted with a C1-C4 alkyl group or a C1-C4 alkoxy group; or a phenylenediamino group.

Application Example 4

In any one of Application Examples 1 to 3, $R^{21}$, $R^{22}$, $R^{23}$, $R^{24}$, $R^{25}$, $R^{26}$, $R^{27}$, and $R^{28}$ in the general formula (21) may be each independently a hydrogen atom; a halogen atom; a C1-C4 alkyl group; a C1-C4 alkoxy group; a C1-C4 alkoxy group substituted with a sulfo group or a carboxy group; or C1-C4 alkylcarbonylamino group.

Application Example 5

In any one of Application Examples 1 to 4, the compound represented by the general formula (21) or a salt thereof may be a compound represented by the following formula (41) or a salt thereof.

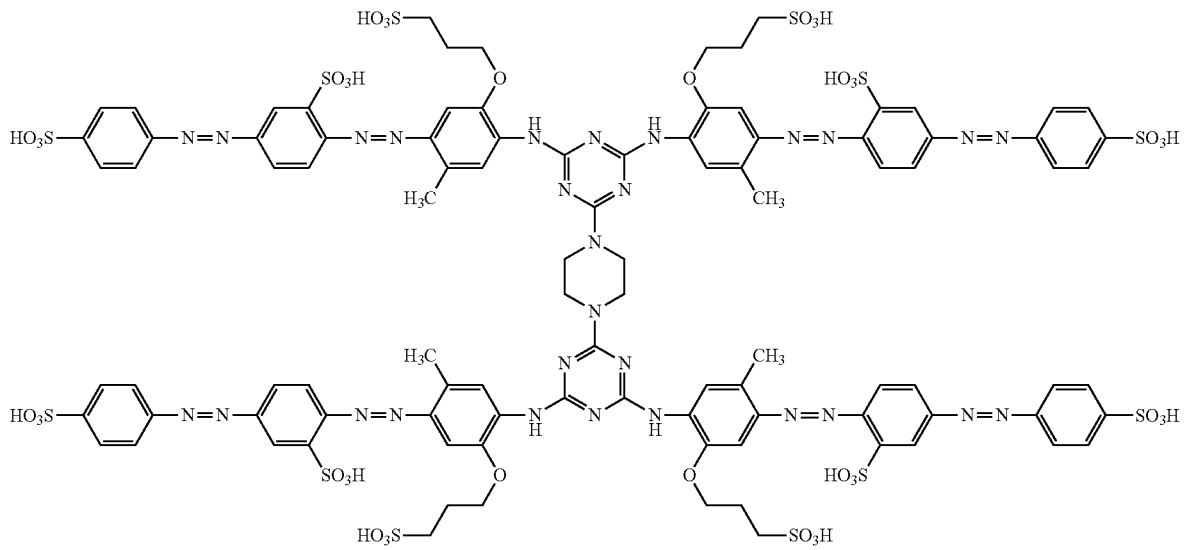

(41)

Application Example 6

In any one of Application Examples 1 to 5, the compound represented by the general formula (1) or a salt thereof may be a compound represented by the following general formula (14) or a salt thereof.

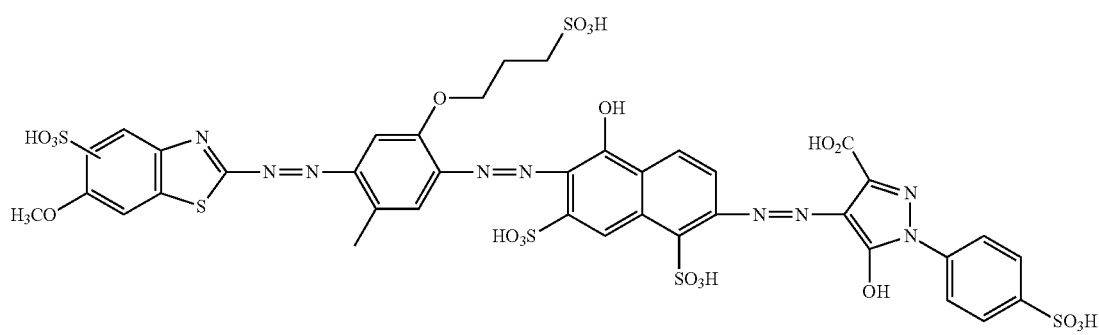

(14)

Application Example 7

In any one of Application Examples 2 to 6, The compound represented by the general formula (51) may be a compound represented by the following general formula (52).

(52)

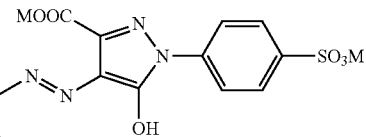
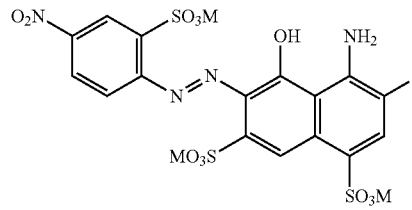

(in the formula (52), M's each independently represent at least one of Li and Na).

Application Example 8

In any one of Application Examples 1 to 7, the ink composition further includes at least one of an organic acid and an organic base, the organic acid is at least one selected from adipic acid, citric acid, and succinic acid, and the organic base is at least one selected from triethanolamine, diethanolamine, monoethanolamine, and triisopropanolamine.

Application Example 9

In any one of Application Examples 1 to 8, the ratio (MB/MA) of the content [MA (% by mass)] of the compound represented by the general formula (1) or a salt thereof and the content [MB (% by mass)] of the compound represented by the general formula (21) or a salt thereof may be equal to or more than 0.4 and equal to or less than 1.

Application Example 10

In any one of Application Examples 2 to 9, the ratio (MC/MA) of the content [MA (% by mass)] of the compound represented by the general formula (1) or a salt thereof and the content [MC (% by mass)] of the compound represented by the general formula (51) may be equal to or more than 0.5 and equal to or less than 1.5.

Application Example 11

In any one of Application Examples 1 to 10, the pH at 20° C. may be equal to or more than 7 and equal to or less than 7.5.

Application Example 12

An ink jet recording method according to one embodiment of the invention includes ejecting the liquid droplets of the ink composition described in any one of Application Examples 1 to 11.

DESCRIPTION OF EXEMPLARY EMBODIMENTS

Hereinbelow, preferable embodiments of the invention will be described. The embodiment as described below illustrates one example of the invention. Further, the invention is not restricted to the following embodiments, and various modifications being conducted within a scope not departing from the spirit of the invention are encompassed by the invention.

Further, in the invention, an acidic functional group such as a sulfo group, a carboxy group, and the like is expressed in the form of a free acid, unless otherwise specified.

In the invention, the "Cv-Cw alkyl (group)" (wherein each of v and w is an integer) means an alkyl group containing v to w carbon atoms. For example, the C1-C4 alkyl refers to an alkyl group containing 1 to 4 carbon atoms. The alkyl group may have any one of a linear structure and a branched structure unless otherwise specified.

Furthermore, the "Cv-Cw alkoxy (group)" (wherein each of v and w is an integer) means an alkoxy group containing v to w carbon atoms. For example, the C1-C4 alkoxy refers to an alkoxy group containing 1 to 4 carbon atoms. The alkoxy group may have any one of a linear structure and a branched structure unless otherwise specified.

In addition, the "Cv-Cw alkylene (group)" (wherein each of v and w is an integer) means an alkylene group containing v to w carbon atoms. For example, the C1-C4 alkylene refers to an alkylene group containing 1 to 4 carbon atoms. The alkylene group may have any one of a linear structure and a branched structure unless otherwise specified.

1. Ink Composition

The ink composition according to an embodiment of the invention includes water, a compound represented by the following general formula (1) or a salt thereof (which is also referred to as a "first dye"), and a compound represented by the following general formula (21) or a salt thereof (which is also referred to as a "second dye"). Hereinafter, each of the components included in the ink composition according to the present embodiment will be described in detail.

1.1. First Dye a. First Dye

The ink composition according to the present embodiment contains a first dye. The first dye is a compound represented by the following general formula (1) or a salt thereof as described above. The first dye is a dye which serves as a coloring material of the ink composition.

The first dye has a tendency to be not easily decomposed even by irradiation with light or exposure to a gas in the atmosphere (particularly, ozone). Accordingly, the image formed using the ink composition according to the present embodiment has excellent light resistance and gas resistance (particularly, ozone resistance), and is thus not easily faded or discolored by the effect of light or the atmosphere.

Furthermore, the first dye has a tendency to be not easily decomposed in the ink composition. For this reason, the ink composition according to the present embodiment has excellent storage stability. Further, in the present specification, a change in the absorbance at a maximum absorbance wavelength of a diluted liquid of the ink composition is used as an index of storage stability. More specifically, the ratio (Ab/Aa) of the absorbance at a maximum absorbance wavelength of the diluted liquid immediately after the preparation (Aa) to the absorbance at a maximum absorbance wavelength after the storage of the diluted liquid in a sealed container at 70° C. for 6 days (Ab) is taken as an index. As the ratio is closer to 1, it can be seen that coloring materials such as a dye in the ink composition, and the like are not easily decomposed over time, and it can be said that the storage stability is excellent. In addition, the absorbance at a maximum absorbance wavelength of the ink composition can be measured using a spectrophotometer in accordance with JIS K0115. Further, the absorbance at a maximum absorbance wavelength of the diluted liquid may be appropriately determined according to the content of the dye in the ink composition. Further, in Examples as described later, 2000-fold dilution is carried out using pure water in terms of volume, and a test on the storage stability is carried out.

The content of the first dye is preferably equal to or more than 1% by mass and equal to or less than 10% by mass, and more preferably equal to or more than 1% by mass and equal to or less than 5% by mass, with respect to the total mass of the ink composition. If the content of the first dye is within the above-described range, the color developing density of a recorded image can be improved, or the light resistance and gas resistance can be improved. On the other hand, if the content of the first dye is over the above-described range, the light resistance or color developing density of a recorded image may be reduced in some cases. In addition, if the content of the first dye is below the above-described range, the gas resistance or color developing density of a recorded image may be reduced in some cases.

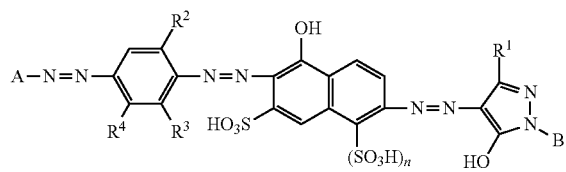

(1)

In the general formula (1), n represents 0 or 1, and $R^1$ represents carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group.

Furthermore, $R^2$, $R^3$, and $R^4$ each independently represent a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy-C1-C4 alkoxy group, a sulfo group, or a carboxy group; a mono- or di-C1-C4 alkylamino group which may be substituted with a hydroxy group, a sulfo group, or a carboxy group; a C1-C4 alkylcarbonylamino group which may be substituted with a hydroxy group or a carboxy group; an N'—C1-C4 alkylureide group which may be substituted with a hydroxy group, a sulfo group, or a carboxy group; a phenylamino group in which a benzene ring may be substituted with a chlorine atom, a C1-C4 alkyl group, a nitro group, a sulfo group, or a carboxy group; a benzoylamino group in which a benzene ring may be substituted with a chlorine atom, a C1-C4 alkyl group, a nitro group, a sulfo group, or a carboxy group; or a phenylsulfonylamino group in which a benzene ring may be substituted with a chlorine atom, a C1-C4 alkyl group, a nitro group, a sulfo group, or a carboxy group.

Furthermore, Group A represents a substituted heterocyclic group represented by the following general formula (2) or (3).

(2)

In the general formula (2), $R^5$ represents a mercapto group; or a C1-C4 alkylthio group which may be substituted with a hydroxy group, a C1-C4 alkoxy group, a hydroxy-C1-C4 alkoxy group, a sulfo group, or a carboxy group.

(3)

In the general formula (3), $R^6$, $R^7$, and $R^8$ each independently represent a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group which may be substituted with a hydroxy group, a C1-C4 alkoxy group, a sulfo group, or a carboxy group; a C1-C4 alkylsulfonyl group which may be substituted with a hydroxy group, a sulfo group, or a carboxy group; or a phenylsulfonyl group in which a benzene ring may be substituted with a chlorine atom, a C1-C4 alkyl group, a nitro group, a sulfo group, or a carboxy group.

Moreover, Group B is a substituted phenyl group or naphthyl group. Further, in the case where the Group B is a substituted phenyl group, it has a substituent selected from the group consisting of a hydroxy group; a sulfo group; a carboxy group; a C1-C4 alkyl group; a C1-C4 alkoxy group; an amino group; a mono- or di-C1-C4 alkylamino group; an acetylamino group; and a benzoylamino group in which a benzene ring may be substituted with a chlorine atom, a C1-C4 alkyl group, a nitro group, a sulfo group, or a carboxy group. On the other hand, in the case where the Group B is a substituted naphthyl group, it has a substituent selected from the group consisting of a hydroxy group; a sulfo group; a C1-C4 alkoxy group; and a phenylsulfonyloxy group in which a benzene ring may be substituted with a methyl group, a nitro group, or a chlorine atom.

The first dye is a compound having a tautomer. Examples of the tautomer include compounds of the general formulae (4) to (6) as shown below, and the like, and their tautomers may be used as the first dye according to the present embodiment.

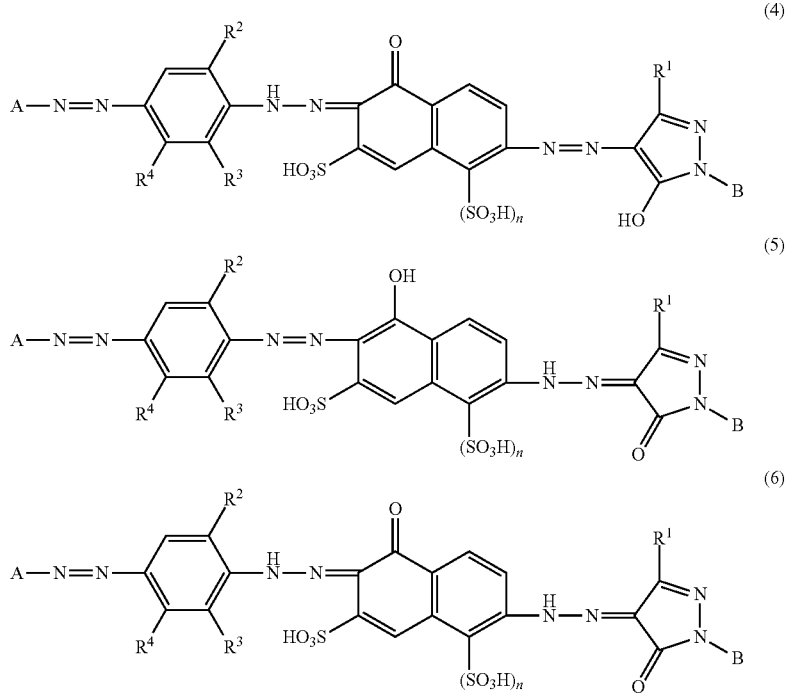

In the general formulae (4) to (6), n, $R^1$, $R^2$, $R^3$, $R^4$, and Groups A and B have the same meanings as in the general formula (1).

In the general formula (1), $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group.

In the case where $R^1$ in the general formula (1) is a C1-C8 alkoxycarbonyl group, the alkoxycarbonyl group may be either linear or branched, and the alkyl moiety may or may not have a cyclic structure, but a linear or branched alkoxycarbonyl group is preferred. Specific examples of the C1-C8 alkoxycarbonyl group include linear ones such as methoxycarbonyl, ethoxycarbonyl, n-propoxycarbonyl, n-butoxycarbonyl, n-pentyloxycarbonyl, n-hexyloxycarbonyl, n-heptyloxycarbonyl, n-octyloxycarbonyl, and the like; branched ones such as isopropoxycarbonyl, isobutyloxycarbonyl, sec-butoxycarbonyl, tert-butoxycarbonyl, 2,2-dimethylpropoxycarbonyl, isopentyloxycarbonyl, sec-pentyloxycarbonyl, 2-methylbutyloxycarbonyl, and the like; alkoxycarbonyl groups having an alkyl moiety with a cyclic structure, such as cyclopropylmethyloxycarbonyl, cyclobutylmethyloxycarbonyl, cyclopentyloxycarbonyl, cyclohexyloxycarbonyl, and the like; etc. Among these, a linear C1-C6 alkoxycarbonyl group is more preferred, and a linear C1-C4 alkoxycarbonyl group is even more preferred.

In the case where $R^1$ in the general formula (1) is a C1-C4 alkyl group which may be substituted with a C1-C8 alkoxycarbonyl group or a carboxy group and the C1-C4 alkyl group is a non-substituted C1-C4 alkyl group, the alkyl group may be either linear or branched, but is preferably linear. Specific examples of the C1-C4 alkyl group include linear ones such as methyl, ethyl, n-propyl, n-butyl, and the like; and branched ones such as isopropyl, isobutyl, sec-butyl, tert-butyl, and the like. Further, in the case where the C1-C4 alkyl group has a substituent, the alkyl group, including its preferred examples, may be the same as those exemplified in the case where the C1-C4 alkyl group is a non-substituted C1-C4 alkyl group. In the case where the substituent of the C1-C4 alkyl group is a C1-C8 alkoxycarbonyl group, the alkoxycarbonyl group, including its preferred examples, may be the same as those in the case where $R^1$ is a C1-C8 alkoxycarbonyl group. In the case where $R^1$ is a C1-C4 alkyl group substituted with a C1-C8 alkoxycarbonyl group, preferred specific examples thereof include methoxycarbonylmethyl, ethoxycarbonylethyl, n-butoxycarbonylmethyl, n-octyloxycarboxyethyl, and the like. In the case where $R^1$ is a C1-C4 alkyl group which may be substituted with a carboxy group, preferred examples thereof include carboxymethyl, 2-carboxyethyl, 3-carboxypropyl, and the like.

Specific examples in the case where $R^1$ in the general formula (1) is a phenyl group which may be substituted with a hydroxy group, a sulfo group, or a carboxy group include non-substituted phenyl; hydroxy-substituted phenyl such as 2-hydroxyphenyl, 4-hydroxyphenyl, and the like; sulfo-substituted phenyl such as 2-sulfophenyl, 4-sulfophenyl, 2,4-disulfophenyl, 3,5-disulfophenyl, and the like; carboxy-substituted phenyl such as 2-carboxyphenyl, 4-carboxyphenyl, 3,5-dicarboxyphenyl, and the like; and phenyl substituted with a plurality of kinds of groups, such as 2-hydroxy-5-sulfophenyl and the like; etc.

$R^1$ in the general formula (1) is more preferably, among the above-described groups, a carboxy group; a C1-C4 alkoxycarbonyl group; a non-substituted C1-C4 alkyl group; a carboxy group-substituted C1-C4 alkyl group; or a non-substituted phenyl group. Specific examples of preferable $R^1$ in the general formula (1) include methyl, ethyl, tert-butyl, carboxymethyl, 3-carboxypropyl, methoxycarbonylmethyl, carboxy, methoxycarboxy, ethoxycarboxy, n-octyloxycarboxy, phenyl, 2-hydroxyphenyl, and 4-sulfophenylmethyl, more preferably methyl, carboxymethyl, carboxy, and phenyl, and further more preferably methyl and carboxy.

In the general formula (1), $R^2$, $R^3$, and $R^4$ each independently represent a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy-C1-C4 alkoxy group, a sulfo group, or a carboxy group; a mono- or di-C1-C4 alkylamino group which may be substituted with a hydroxy group, a sulfo group, or a carboxy group; a C1-C4 alkylcarbonylamino group which may be substituted with a hydroxy group or a carboxy group; an N'—C1-C4 alkylureide group which may be substituted with a hydroxy group, a sulfo group, or a carboxy group; a phenylamino group in which a benzene ring may be substituted with a chlorine atom, a C1-C4 alkyl group, a nitro group, a sulfo group, or a carboxy group; a benzoylamino group in which a benzene ring may be substituted with a chlorine atom, a C1-C4 alkyl group, a nitro group, a sulfo group, or a carboxy group; or a phenylsulfonylamino group in which a benzene ring may be substituted with a chlorine atom, a C1-C4 alkyl group, a nitro group, a sulfo group, or a carboxy group.

In the case where $R^2$ to $R^4$ in the general formula (1) are non-substituted C1-C4 alkoxy groups, the alkoxy group may be either linear or branched. Specific examples of the non-substituted C1-C4 alkoxy group include methoxy, ethoxy, n-propoxy, isopropoxy, n-butoxy, sec-butoxy, tert-butoxy, and the like. In the case where the alkoxy group is substituted with a hydroxy group, a C1-C4 alkoxy group, a hydroxy-C1-C4 alkoxy group, a sulfo group, or a carboxy group, specific examples thereof include hydroxy-C1-C4 alkoxy groups such as 2-hydroxyethoxy, 2-hydroxypropoxy, 3-hydroxypropoxy, and the like; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, and the like; hydroxy-C1-C4 alkoxy-C1-C4 alkoxy groups such as 2-hydroxyethoxyethoxy and the like; sulfo-C1-C4 alkoxy groups such as 3-sulfopropoxy, 4-sulfobutoxy, and the like; carboxy-C1-C4 alkoxy groups such as carboxymethoxy, 2-carboxyethoxy, 3-carboxypropoxy, and the like; etc.

In the case where $R^2$ to $R^4$ in the general formula (1) are non-substituted mono- or di-C1-C4 alkylamino groups, the C1-C4 alkyl moiety may be either linear or branched. Specific examples of the non-substituted mono- or di-C1-C4 alkylamino group include linear ones such as methylamino, ethylamino, n-propylamino, isopropylamino, n-butylamino, dimethylamino, diethylamino, di-n-propylamino, di-n-butylamino, and the like; branched ones such as sec-butylamino, tert-butylamino, diisopropylamino, and the like; etc. In the case where the mono- or di-C1-C4 alkylamino group is substituted with a hydroxy group, a sulfo group, or a carboxy group, specific examples thereof include hydroxy-substituted mono- or di-C1-C4 alkylamino groups such as 2-hydroxyethylamino, 2-hydroxypropylamino, 2,2'-dihydroxydiethylamino, and the like; sulfo-substituted mono- or di-C1-C4 alkylamino groups such as 2-sulfoethylamino, 3-sulfopropylamino, 4-sulfobutylamino, 3,3'-disulfodipropylamino, and the like; carboxy-substituted mono- or di-C1-C4 alkylamino groups such as carboxymethylamino, 2-carboxyethylamino, 3-carboxypropylamino, 2,2'-dicarboxydiethylamino, and the like; etc.

In the case where $R^2$ to $R^4$ in the general formula (1) are non-substituted C1-C4 alkylcarbonylamino groups, the C1-C4 alkyl moiety may be either linear or branched, but is preferably linear. Specific examples of the non-substituted C1-C4 alkylcarbonylamino group include acetylamino, propanoylamino, butanoylamino, and the like. In the case where the C1-C4 alkylcarbonylamino group is substituted with a hydroxy group or a carboxy group, specific examples of the C1-C4 alkylcarbonylamino group include hydroxy-C1-C4 alkylcarbonylamino groups such as hydroxyethanoylamino, 2-hydroxypropanoylamino, 4-hydroxybutanoylamino, and the like; carboxy-C1-C4 alkylcarbonylamino groups such as 3-carboxypropanoylamino and the like; etc.

In the case where $R^2$ to $R^4$ in the general formula (1) are N'—C1-C4 alkylureide groups, they are more preferably substituted rather than non-substituted. In the case where the N'—C1-C4 alkylureide group is substituted with a hydroxy group, a sulfo group, or a carboxy group, specific examples thereof include N'-hydroxy-C1-C4 alkylureide groups such as N'-2-hydroxyethylureide, N'-3-hydroxyethylureide, and the like; N'-sulfo-C1-C4 alkylureide groups such as N'-2-sulfoethylureide, N'-3-sulfopropylureide, and the like; N'-carboxy-C1-C4 alkylureide groups such as N'-carboxymethylureide, N'-2-carboxyethylureide, N'-3-carboxypropylureide, N'-4-carboxybutylureide, and the like; etc.

In the case where $R^2$ to $R^4$ in the general formula (1) are phenylamino groups in which a benzene ring is substituted with a chlorine atom, a C1-C4 alkyl group, a nitro group, a sulfo group, or a carboxy group, specific examples thereof include non-substituted phenylamino; chlorine atom-substituted phenylamino groups such as 2-chlorophenylamino, 4-chlorophenylamino, 2,4-dichlorophenylamino, and the like; C1-C4 alkyl-substituted phenylamino groups such as 2-methylphenylamino, 4-methylphenylamino, 4-tert-butylphenylamino, and the like; nitro-substituted phenylamino groups such as 2-nitrophenylamino, 4-nitrophenylamino, and the like; sulfo-substituted phenylamino groups such as 3-sulfophenylamino, 4-sulfophenylamino, 2,4-disulfophenylamino, 3,5-disulfophenylamino, and the like; carboxy-substituted phenylamino groups such as 2-carboxyphenylamino, 4-carboxyphenylamino, 2,5-dicarboxyphenylamino, 3,5-dicarboxyphenylamino, and the like; etc.

In the case where $R^2$ to $R^4$ in the general formula (1) are a phenylamino group, a benzoylamino group, or a phenylsulfonylamino group, having a substituent, and the substituent included as a base in the benzene ring is a C1-C4 alkyl group, the alkyl group may be linear, branched, or cyclic, and is preferably linear or branched. Specific examples of the alkyl group include linear ones such as methyl, ethyl, n-propyl, n-butyl, and the like; and branched ones such as isopropyl, isobutyl, sec-butyl, tert-butyl, and the like.

In the case where $R^2$ to $R^4$ in the general formula (1) are benzoylamino groups in which a benzene ring is substituted with a chlorine atom, a C1-C4 alkyl group, a nitro group, a sulfo group, or a carboxy group, specific examples thereof include non-substituted benzoylamino; chlorine atom-substituted benzoylamino groups such as 2-chlorobenzoylamino, 4-chlorobenzoylamino, 2,4-dichlorophenylamino, and the like; C1-C4 alkyl-substituted benzoylamino groups such as 2-methylbenzoylamino, 3-methylbenzoylamino, 4-methylbenzoylamino, and the like; nitro-substituted benzoylamino groups such as 2-nitrobenzoylamino, 4-nitrobenzoylamino, 3,5-dinitrobenzoylamino, and the like; sulfo-substituted benzoylamino groups such as 2-sulfobenzoylamino, 4-sulfobenzoylamino, and the like; carboxy-substituted benzoylamino groups such as 2-carboxybenzoylamino, 4-carboxybenzoylamino, 3,5-dicarboxybenzoylamino, and the like; etc.

In the case where $R^2$ to $R^4$ in the general formula (1) are phenylsulfonylamino groups in which a benzene ring is substituted with a chlorine atom, a C1-C4 alkyl group, a nitro group, a sulfo group, or a carboxy group, specific examples thereof include non-substituted phenylsulfonylamino; chlorine atom-substituted phenylsulfonylamino groups such as 2-chlorophenylsulfonylamino, 4-chlorophenylsulfonylamino, and the like; C1-C4 alkyl-substituted phenylsulfonylamino groups such as 2-methylphenylsulfonylamino, 4-methylphenylsulfonylamino, 4-tert-butylphenylsulfonylamino, and the like; nitro-substituted phenylsulfonylamino groups such as 2-nitrophenylsulfonylamino, 3-nitrophenylsulfonylamino, 4-nitrophenylsulfonylamino, and the like; sulfo-substituted phenylsulfonylamino groups such as 3-sulfophenylsulfonylamino, 4-sulfophenylsulfonylamino, and the like; carboxy-substituted phenylsulfonylamino groups such as 3-carboxyphenylsulfonylamino, 4-carboxyphenylsulfonylamino, and the like; etc.

Specific examples of preferable $R^2$ to $R^4$ in the general formula (1) include a hydrogen atom, carboxy, sulfo, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylamino, ethylamino, 2-hydroxyethylamino, 2-sulfoethylamino, 3-sulfopropylamino, 2-carboxyethylamino, dimethylamino, diethylamino, 2,2'-dihydroxydiethylamino, 2,2'-dicarboxydiethylamino, 3,3'-disulfodipropylamino, acetylamino, 3-carboxypropanoylamino, 4-hydroxybutanoylamino, N'-carboxymethylureide, N'-2-sulfoethylureide, 4-sulfophenylamino, 2,4-disulfophenylamino, 2,5-dicarboxyphenylamino, benzoylamino, 3-sulfobenzoylamino, 2-carboxybenzoylamino, phenylsulfonylamino, 4-methylphenylsulfonylamino, 4-nitrophenylsulfonylamino, 3-sulfophenylsulfonylamino, 4-carboxyphenylsulfonylamino, and the like, more preferably, a hydrogen atom, sulfo, methyl, methoxy, 2-hydroxyethoxy, 2-sulfoethoxy, 3-sulfopropoxy, 4-sulfobutoxy, dimethylamino, 3,3'-disulfodipropylamino, acetylamino, 3-carboxypropanoylamino, N'-2-sulfoethylureide, 2,4-disulfophenylamino, benzoylamino, and 4-methylphenylsulfonylamino, and further more preferably a hydrogen atom, sulfo, methyl, methoxy, and 3-sulfopropoxy.

A preferable combination of preferable $R^2$ to $R^4$ in the general formula (1) is a combination in which $R^2$ is 3-sulfopropoxy or 4-sulfobutoxy, $R^3$ is a hydrogen atom, and $R^4$ is methyl.

In the case where $R^5$ in the general formula (2) is a C1-C4 alkylthio group, the C1-C4 alkyl moiety is preferably either linear or branched, and more preferably linear. Specific examples of the C1-C4 alkylthio group include methylthio, ethylthio, n-propylthio, isopropylthio, n-butylthio, sec-butylthio, tert-butylthio, and the like. Further, in the case where $R^5$ in the general formula (2) is a C1-C4 alkylthio group having a substituent, the substituent is preferably a hydroxy group, a sulfo group, or a carboxy group, and more preferably a sulfo group or a carboxy group. Specific examples of the C1-C4 alkylthio group having a substituent include hydroxy-C1-C4 alkylthio groups such as 2-hydroxyethylthio, 2-hydroxypropoxy, 3-hydroxypropoxythio, and the like; C1-C4 alkoxy-C1-C4 alkylthio groups such as methoxyethylthio, ethoxyethylthio, n-propoxyethylthio, isopropoxyethylthio, n-butoxyethylthio, methoxypropylthio, ethoxypropylthio, n-propoxypropylthio, isopropoxybutylthio, n-propoxypropylthio, and the like; hydroxy-C1-C4 alkoxy-C1-C4 alkylthio groups such as 2-hydroxyethoxyethylthio and the like; sulfo-C1-C4 alkylthio groups such as 3-sulfopropylthio, 4-sulfobutylthio, and the like; carboxy-C1-C4 alkylthio groups such as carboxymethylthio, 2-carboxyethylthio, 3-carboxypropylthio, and the like; etc.

Specific examples of preferable $R^5$ in the general formula (2) include mercapto (—SH), methylthio, ethylthio, 2-hydroxyethylthio, methoxyethylthio, ethoxyethylthio, 2-sulfoethylthio, 3-sulfopropylthio, 4-sulfobutylthio, carboxymethylthio, 2-carboxyethylthio, 3-carboxypropylthio, and the like, more preferably methylthio, 2-sulfopropylthio, carboxymethylthio, and 2-carboxyethylthio, and further more preferably 2-sulfopropylthio and 2-carboxyethylthio.

In the case where $R^6$ to $R^8$ in the general formula (3) are C1-C4 alkyl groups, the alkyl groups may be linear, branched, or cyclic, but are preferably linear or branched, and furthermore preferably linear. Specific examples of the C1-C4 alkyl group include linear ones such as methyl, ethyl, n-propyl, n-butyl, and the like; and branched ones such as isopropyl, isobutyl, sec-butyl, tert-butyl, and the like.

In the case where $R^6$ to $R^8$ in the general formula (3) are C1-C4 alkoxy groups which may be substituted with a hydroxy group, a C1-C4 alkoxy group, a sulfo group, or a carboxy group, the substituents, including their preferable examples, may be the same as in the case where $R^2$ to $R^4$ in the general formula (1) are C1-C4 alkoxy groups.

In the case where $R^6$ to $R^8$ in the general formula (3) are C1-C4 alkylsulfonyl groups which may be substituted with a hydroxy group, a sulfo group, or a carboxy group, specific examples of the C1-C4 alkylsulfonyl groups include linear or branched C1-C4 alkylsulfonyl groups such as methylsulfonyl, ethylsulfonyl, propylsulfonyl, isopropylsulfonyl, n-butylsulfonyl, sec-butylsulfonyl, tert-butylsulfonyl, and the like; hydroxy-C1-C4 alkylsulfonyl groups such as 2-hydroxyethylsulfonyl, 3-hydroxypropylsulfonyl, and the like; sulfo-C1-C4 alkylsulfonyl groups such as 2-sulfopropylsulfonyl, 3-sulfopropylsulfonyl, 4-sulfobutylsulfonyl, and the like; carboxy-C1-C4 alkylsulfonyl groups such as carboxymethylsulfonyl, 2-carboxyethylsulfonyl, 3-carboxypropylsulfonyl, and the like; etc.

In the case where $R^6$ to $R^8$ in the general formula (3) are phenylsulfonyl groups which may be substituted with a chlorine atom, a C1-C4 alkyl group, a nitro group, a sulfo group, or a carboxy group, specific examples thereof include non-substituted phenylsulfonyl; chlorine atom-substituted phenylsulfonyl groups such as 2-chlorophenylsulfonyl, 4-chlorophenylsulfonyl, and the like; C1-C4 alkyl-substituted phenylsulfonyl groups such as 2-methylphenylsulfonyl, 4-methylphenylsulfonyl, 2,4-dimethylphenylsulfonyl, 4-tert-butylphenylsulfonyl, and the like; nitro-substituted phenylsulfonyl groups such as 2-nitrophenylsulfonyl, 4-nitrophenylsulfonyl, and the like; sulfo-substituted phenylsulfonyl groups such as 3-sulfophenylsulfonyl, 4-sulfophenylsulfonyl, 3,5-disulfophenylsulfonyl, and the like; carboxy-substituted phenylsulfonyl groups such as 2-carboxyphenylsulfonyl, 4-carboxyphenylsulfonyl, 3,5-dicarboxyphenylsulfonyl, and the like; etc.

Specific examples of preferable $R^6$ to $R^8$ in the general formula (3) include a hydrogen atom, a chlorine atom, carboxy, sulfo, nitro, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylsulfonyl, ethylsulfonyl, tert-butylsulfonyl, 2-hydroxyethylsulfonyl, 3-sulfopropylsulfonyl, 2-carboxyethylsulfonyl, phenylsulfonyl, 4-chlorophenylsulfonyl, 4-methylphenylsulfonyl, 2,4-dimethylphenylsulfonyl, 4-nitrophenylsulfonyl, 4-sulfophenylsulfonyl, 2-carboxyphenylsulfonyl, 4-carboxyphenylsulfonyl, and the like, more preferably, a hydrogen atom, a chlorine atom, carboxy, sulfo, nitro, methyl, methoxy, methylsulfonyl, and 2-carboxyphenylsulfonyl, and further more preferably a hydrogen atom, sulfo, and methoxy. Further, among $R^6$ to $R^8$, at least one is preferably a hydrogen atom, and more preferably a substituent other than a hydrogen atom.

A preferable combination of $R^6$, $R^7$, and $R^8$ in the general formula (3) is a combination in which they are hydrogen atoms, methoxy, or sulfo, or in which one is sulfo and the other two are hydrogen atoms. In the case where one is sulfo and the others are hydrogen atoms, a case where a position at which the sulfo is substituted is a 6-position of a benzothiazole ring is more preferable.

In the general formula (1), Group B is a substituted phenyl group or naphthyl group, in the case where the Group B is a substituted phenyl group, it has a substituent selected from the group consisting of a hydroxy group; a sulfo group; a carboxy group; a C1-C4 alkyl group; a C1-C4 alkoxy group; an amino group; a mono- or di-C1-C4 alkylamino group; an acetylamino group; and a benzoylamino group in which a benzene ring may be substituted with a chlorine atom, a C1-C4 alkyl group, a nitro group, a sulfo group, or a carboxy group; and in the case where the Group B is a substituted naphthyl group, it has a substituent selected from the group consisting of a hydroxy group; a sulfo group; a C1-C4 alkoxy group; and a phenylsulfonyloxy group in which a benzene ring may be substituted with a methyl group, a nitro group, or a chlorine atom.

In the case where Group B in the general formula (1) is a phenyl group or naphthyl group having a substituent and the substituent is a C1-C4 alkoxy group, the alkoxy group, including preferable examples thereof, may be the same as in the case where $R^2$ to $R^4$ in the general formula (1) are non-substituted C1-C4 alkoxy groups.

In the case where Group B in the general formula (1) is a mono- or di-C1-C4 alkylamino group-substituted phenyl group, the mono- or di-C1-C4 alkylamino group, including preferable examples thereof, may be the same as in the case where $R^2$ to $R^4$ in the general formula (1) are non-substituted mono- or di-C1-C4 alkylamino groups.

In the case where Group B in the general formula (1) is a substituted naphthyl group and the substituent is a phenylsulfonyloxy group in which a benzene ring may be substituted with a methyl group, a nitro group, or a chlorine atom, specific examples thereof include non-substituted phenylsulfonyloxy; methyl-substituted phenylsulfonyloxy groups such as 4-methylphenylsulfonyloxy, 2,4-dimethylphenylsulfonyloxy, and the like; nitro-substituted phenylsulfonyloxy groups such as 2-nitrophenylsulfonyloxy, 4-nitrosulfonyloxy, and the like; chlorine atom-substituted phenylsulfonyloxy groups such as 4-chlorophenylsulfonyloxy, 2,4-dichlorophenylsulfonyloxy, 3,5-dichlorophenylsulfonyloxy, and the like; etc.

In the general formula (1), a case where n is 1 is preferable.

Specific examples of the preferred substituent in the case where Group B in the general formula (1) is a substituted phenyl group include a hydrogen atom, hydroxy, sulfo, carboxy, methyl, ethyl, methoxy, ethoxy, dimethylamino, acetylamino, benzoylamino, 4-sulfobenzoylamino, 4-carboxybenzoylamino, and the like, more preferably hydrogen atom, hydroxy, sulfo, carboxy, methyl, and acetylamino, and further more preferably a hydrogen atom, sulfo, and carboxy.

Specific examples of the preferred substituent in the case where Group B in the general formula (1) is a substituted naphthyl group include a hydrogen atom, hydroxy, sulfo, methoxy, ethoxy, phenylsulfonyloxy, 4-methylphenylsulfonyloxy, 2-nitrophenyl, and the like, more preferably, hydrogen atom, hydroxy, sulfo, and methoxy, and further more preferably a hydrogen atom and sulfo.

Specific examples of the preferred Group B in the general formula (1) include phenyl, 2-sulfophenyl, 4-sulfophenyl, 2,4-disulfophenyl, 3,5-disulfophenyl, 4-carboxyphenyl, 3,5-carboxyphenyl, 4-methylphenyl, 3-methylphenyl, 3-hydroxy-4-carboxyphenyl, 5-sulfo-3-carboxy 2-hydroxyphenyl, 4-methoxyphenyl, 4-acetylaminophenyl, naphthyl, naphth-2-yl, 6-sulfonaphthyl, 7-sulfonaphthyl, 4,7-disulfonaphthyl, 5,7-disulfonaphth-2-yl, 6,8-disulfonaphth-2-yl, 4,8-disulfonaphth-2-yl, 4,6,8-trisulfonaphth-2-yl, and the like, more preferably, phenyl, 4-sulfophenyl, 2,4-disulfophenyl, 4-carboxyphenyl, 3,5-carboxyphenyl, 5,7-disulfonaphth-2-yl, and 4,8-disulfonaphth-2-yl, and further more preferably phenyl, 4-sulfophenyl, 4-carboxyphenyl, and 3,5-carboxyphenyl.

A compound having a combination of the preferable same kinds described with respect to the substituent of the general formulae (1) to (6) is more preferred, and a compound having a combination of the more preferable same kinds is even more preferred. Further, this shall apply to a case where even more preferable same kinds are combined, or the like. In addition, as described above, n, $R^1$ to $R^4$, and Group A and Group B in the general formulae (4) to (6) have the same meanings as in the general formula (1).

The salt of the compound represented by the general formula (1) is an inorganic or organic cationic salt. Specific examples of the inorganic salt include alkali metal salts, alkaline earth metal salts, ammonium salts, and the like. Among these, examples of the preferred inorganic salt include salts of lithium, sodium, and potassium, and ammonium salts. Further, examples of the organic cationic salt include quaternary ammonium ions represented by the general formula (7), but are not limited thereto.

Furthermore, a free acid, a tautomer thereof, and various salts thereof of the first dye according to the present embodiment may be a mixture. For example, any combination of a mixture of a sodium salt of the first dye and an ammonium salt of the first dye, a mixture of a free acid of the first dye and a sodium salt of the first dye, a mixture of a lithium salt of the first dye, a sodium salt of the first dye, and an ammonium salt of the first dye, and the like may be used. Physical property values such as solubility and the like may vary depending on the kind of the salt, a mixture having intended physical properties can be obtained by appropriately selecting the kind of the salt according to necessity and by changing the ratio of salts in the case where a plurality of salts and the like are included.

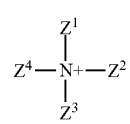

(7)

In the general formula (7), $Z^1$, $Z^2$, $Z^3$, and $Z^4$ each independently represent a group selected from the group consisting of a hydrogen atom, an alkyl group, a hydroxyalkyl group, and a hydroxyalkoxyalkyl group.

Specific examples of the alkyl group of $Z^1$, $Z^2$, $Z^3$, and $Z^4$ in the general formula (7) include methyl, ethyl, n-propyl, isopropyl, n-butyl, isobutyl, sec-butyl, tert-butyl, and the like. Further, specific examples of the hydroxyalkyl group include hydroxy-C1-C4 alkyl groups such as hydroxymethyl, hydroxyethyl, 3-hydroxypropyl, 2-hydroxypropyl, 4-hydroxybutyl, 3-hydroxybutyl, 2-hydroxybutyl, and the like. In addition, examples of the hydroxyalkoxyalkyl group include hydroxy-C1-C4 alkoxy-C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among these, a hydrogen atom, methyl, hydroxymethyl, hydroxyethyl, 3-hydroxypropyl, 2-hydroxypropyl, 4-hydroxybutyl, 3-hydroxybutyl, 2-hydroxybutyl, hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, 2-hydroxyethoxybutyl, or the like may be preferably used.

Specific examples of a preferable combination of $Z^1$, $Z^2$, $Z^3$, and $Z^4$ with respect to the quaternary ammonium ion represented by the formula (7) are shown in Table 1.

TABLE 1

| Compound No. | $Z^1$ | $Z^2$ | $Z^3$ | $Z^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | $-C_2H_4OH$ | $-C_2H_4OH$ | $-C_2H_4OH$ |
| 1-4 | $CH_3$ | $-C_2H_4OH$ | $-C_2H_4OH$ | $-C_2H_4OH$ |
| 1-5 | H | $-CH_2CH(OH)CH_3$ | $-CH_2CH(OH)CH_3$ | $-CH_2CH(OH)CH_3$ |
| 1-6 | $CH_3$ | $-CH_2CH(OH)CH_3$ | $-CH_2CH(OH)CH_3$ | $-CH_2CH(OH)CH_3$ |
| 1-7 | H | $-C_2H_4OH$ | H | $-C_2H_4OH$ |
| 1-8 | $CH_3$ | $-C_2H_4OH$ | H | $-C_2H_4OH$ |
| 1-9 | H | $-CH_2CH(OH)CH_3$ | H | $-CH_2CH(OH)CH_3$ |
| 1-10 | $CH_3$ | $-CH_2CH(OH)CH_3$ | H | $-CH_2CH(OH)CH_3$ |
| 1-11 | $CH_3$ | $-C_2H_4OH$ | $CH_3$ | $-C_2H_4OH$ |
| 1-12 | $CH_3$ | $-CH_2CH(OH)CH_3$ | $CH_3$ | $-CH_2CH(OH)CH_3$ |

Specific preferable examples of the first dye include, but are not particularly limited thereto, compounds represented by the structural formulae shown in Tables 2 to 7, and the like are shown. In the respective Tables, the functional groups such as a sulfo group, a carboxy group, and the like are shown in the form of a free acid, for convenience.

TABLE 2

| Compound No. | Structural Formula |
|---|---|
| 1 | (structural formula image) |
| 2 | (structural formula image) |
| 3 | (structural formula image) |

TABLE 2-continued

| Compound No. | Structural Formula |
|---|---|
| 4 | (structure) |
| 5 | (structure) |
| 6 | (structure) |

TABLE 3

| Compound No. | Structural Formula |
|---|---|
| 7 | (structure) |

TABLE 3-continued

| Compound No. | Structural Formula |
|---|---|
| 8 | |
| 9 | |
| 10 | |
| 11 | |

TABLE 3-continued

| Compound No. | Structural Formula |
|---|---|
| 12 | (structure) |

TABLE 4

| Compound No. | Structural Formula |
|---|---|
| 13 | (structure) |
| 14 | (structure) |
| 15 | (structure) |

TABLE 4-continued

| Compound No. | Structural Formula |
|---|---|
| 16 | |
| 17 | |
| 18 | |

TABLE 5

| Compound No. | Structural Formula |
|---|---|
| 19 | |

TABLE 5-continued

| Compound No. | Structural Formula |
| --- | --- |
| 20 | |
| 21 | |
| 22 | |
| 23 | |

TABLE 5-continued

| Compound No. | Structural Formula |
|---|---|
| 24 | (structure) |

TABLE 6

| Compound No. | Structural Formula |
|---|---|
| 25 | (structure) |
| 26 | (structure) |
| 27 | (structure) |

TABLE 6-continued

| Compound No. | Structural Formula |
|---|---|
| 28 | (structure) |
| 29 | (structure) |
| 30 | (structure) |

TABLE 7

| Compound No. | Structural Formula |
|---|---|
| 31 | (structure) |

TABLE 7-continued

| Compound No. | Structural Formula |
|---|---|
| 32 | |
| 33 | |
| 34 | |
| 35 | |

TABLE 7-continued

| Compound No. | Structural Formula |
|---|---|
| 36 | 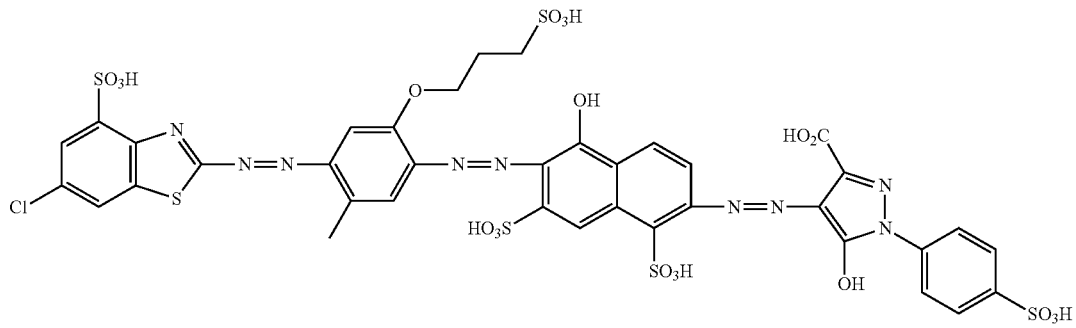 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2c(S(=O)(=O)O)cc(Cl)cc2s1] | b. Method for Synthesis of First Dye

The first dye can be synthesized by, for example, the following method. In this regard, the structural formula of the compound in each process is shown in the form of a free acid, for convenience.

First, a compound represented by the following general formula (10) is obtained by diazotizing a compound represented by the following general formula (8) by an ordinary method, and subjecting the product and a compound represented by the general formula (9) to a coupling reaction by an ordinary method. Next, a compound represented by the following general formula (12) is obtained by diazotizing the resulting compound of the general formula (10) by an ordinary method, and then subjecting the product and a compound represented by the following general formula (11) to a coupling reaction by an ordinary method. Then, the first dye represented by the general formula (1) according to the present embodiment can be obtained by diazotizing the resulting compound of the general formula (12) by an ordinary method, and then subjecting the product and a compound represented by the following general formula (13) to a coupling reaction by an ordinary method. In addition, the compound represented by the general formula (13) can be purchased as a commercially available product, or synthesized by a well-known method.

Diazotization of the compound represented by the following general formula (8) is carried out according to a well-known method. For example, diazotization of the compound represented by the following general formula (8) is carried out in sulfuric acid, acetic acid, or phosphoric acid, at a temperature of, for example −5° C. to 20° C., and preferably 5° C. to 10° C. using nitrosylsulfuric acid. Further, a coupling reaction of the diazotized product of the compound represented by the following general formula (8) with the compound represented by the general formula (9) is also carried out under a well-known reaction condition. For example, a coupling reaction of the diazotized product of the compound represented by the following general formula (8) with the compound represented by the general formula (9) is specifically carried out in water or an aqueous organic medium, at a temperature of, for example, −5° C. to 30° C., and preferably 10° C. to 30° C. The compound represented by the general formula (8) and the compound represented by the general formula (9) can be used in approximately stoichiometric amounts.

Diazotization of the compound represented by the general formula (10) is also carried out according to a well-known method. Specifically, diazotization of the compound represented by the general formula (10) is carried out in the presence of an inorganic acid such as hydrochloric acid or sulfuric acid in water or an aqueous organic medium, at a temperature of, for example, −5 to 40° C., and preferably 5° C. to 30° C. using a nitrite salt, for example, an alkali metal salt of nitrous acid such as sodium nitrite and the like. Further, a coupling reaction of the diazotized product of the compound represented by the general formula (10) with the compound represented by the general formula (11) is also carried out under a well-known reaction condition. For example, a coupling reaction of the diazotized product of the compound represented by the general formula (10) with the compound represented by the general formula (11) is preferably carried out in water or an aqueous organic medium, at a temperature of, for example, −5° C. to 50° C., and preferably 10° C. to 30° C., and at a pH value of from weakly acidic to alkaline. Coupling of the diazotized product of the compound represented by the general formula (10) with the compound represented by the general formula (11) is more preferably carried out at a pH value of from weakly acidic to weakly alkaline, for example, at pH 6 to pH 10. Since the diazotization reaction liquid is acidic and the reaction system is further acidified as the coupling reaction proceeds, adjustment to the pH value is preferably conducted by the addition of a base. As the base, for example, an alkali metal hydroxide such as lithium hydroxide or sodium hydroxide, an alkali metal carbonate such as lithium carbonate, sodium carbonate, potassium carbonate, and the like, an acetic acid salt such as sodium acetate and the like, ammonia, an organic amine or the like may be used. The compound represented by the general formula (10) and the compound represented by the general formula (11) can be used in approximately stoichiometric amounts.

Diazotization of the compound represented by the general formula (12) is also carried out according to a well-known method. Specifically, diazotization of the compound represented by the general formula (12) is carried out in the presence of an inorganic acid such as hydrochloric acid or sulfuric acid in water or an aqueous organic medium (mixture of water with a water soluble organic solvent, and the like), at a temperature of, for example, −5° C. to 40° C., and preferably 10° C. to 30° C. using a nitrite salt, for example, an alkali metal salt of nitrous acid such as sodium nitrite and the like. Coupling of the diazotized product of the compound represented by the general formula (12) with the compound represented by the general formula (13) is also carried out under a well-known reaction condition. For example, a coupling reaction of the diazotized product of the compound represented by the general formula (12) with the compound represented by the general formula (13) is preferably carried out in water or an aqueous organic medium, at a temperature of, for example, −5° C. to 50° C., and preferably 10° C. to 30° C., and at a pH value of from weakly acidic to alkaline. Coupling of the diazotized product of the compound represented by the general formula (12) with the compound represented by the general formula (13) is more preferably carried out at a pH value of from weakly acidic to weakly alkaline, for example, at pH 6 to pH 10, and adjustment of the pH value is preferably conducted by the addition of a base. As the base, the same base used for coupling of the compound represented by the general formula (10) and the compound represented by the general formula (11) may be used. The compound represented by the general formula (12) and the compound represented by the general formula (13) can be used in approximately stoichiometric amounts.

In order to produce a desired salt of the compound represented by the general formula (1), after the coupling reaction, salting-out may be carried out by adding a desired inorganic salt or organic cationic salt to the reaction liquid. Alternatively, a mineral acid such as hydrochloric acid is added to isolate the compound in the form of a free acid, which is washed with water, acidic water, an aqueous organic medium, or the like as needed to remove the inorganic salt, and thereafter the free acid is neutralized with a desired inorganic or organic base in an aqueous medium, thereby yielding a solution of the corresponding salt.

By way of an example, a method in which the compound of the general formula (1) is used in the form of its lithium salt will be described below. A sodium salt of the compound of the general formula (1) is obtained by subjecting the compound of the general formula (12) and the compound of the general formula (13) to a coupling reaction, followed by addition of sodium chloride, and then salting-out and separation and collection by filtration. Next, a free acid of the compound of the general formula (1) is obtained by adding water and hydrochloric acid to the sodium salt to carry out acid-out, and separation and collection by filtration. Further, a lithium salt of the compound of the general formula (1) can be obtained by adding water and lithium hydroxide to the free acid. In addition, examples of other methods to give a lithium salt include a salt exchange reaction using a sodium salt of the compound of the general formula (1) and lithium chloride.

Furthermore, the acidic water as used herein refers to for example, that prepared by dissolving a mineral acid such as sulfuric acid, hydrochloric acid, and the like, or an organic acid such as acetic acid in water to be acidic. In addition, the aqueous organic medium as used herein refers to an organic substance containing water and being miscible with water, as well as a so-called organic solvent that is miscible with water, and the like. Specific examples of the aqueous organic medium include a water-soluble organic solvent and the like, but even an organic substance that is not usually classified as a solvent miscible with water can also be used, if necessary.

Examples of the water-soluble organic solvent include C1-C4 alkanols such as methanol, ethanol, propanol, isopropanol, butanol, isobutanol, secondary butanol, tertiary butanol, and the like; carboxylic acid amides such as N,N-dimethylformamide, N,N-dimethylacetoamide, and the like; lactams such as 2-pyrrolidone, N-methyl-2-pyrrolidone, N-methylpyrrolidin-2-one, and the like; cyclic ureas such as 1,3-dimethylimidazolidin-2-one, 1,3-dimethylhexahydropyrimid-2-one, and the like; ketones or ketoalcohols such as acetone, methyl ethyl ketone, 2-methyl-2-hydroxypentan-4-one, and the like; cyclic ethers such as tetrahydrofuran, dioxane, and the like; mono-, oligo-, or poly-alkylene glycols or thioglycols having a C2 to C6 alkylene unit such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, dithiodiglycol, and the like; polyols (triols) such as glycerin, hexane-1,2,6-triol, and the like; C1-C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether, and the like; γ-butyrolactone; dimethylsulfoxide; etc.

Furthermore, examples of organic substance that is generally not classified as a solvent include urea, sugars, and the like. Examples of the inorganic salt include alkali metal salts such as lithium chloride, sodium chloride, potassium chloride, and the like; ammonium salts such as ammonium chloride, ammonium bromide, and the like; etc. Further, examples of the organic cationic salt include halogen salts of organic amine and the like; etc. Examples of the inorganic base include alkali metal hydroxides such as lithium hydroxide, sodium hydroxide, potassium hydroxide, and the like; ammonium hydroxide; alkali metal carbonates such as lithium carbonate, sodium carbonate, potassium carbonate, and the like; etc. Further, examples of the organic base include organic amines, for example, quaternary ammoniums represented by the general formula (7), such as diethanolamine, triethanolamine, and the like, but are not limited thereto.

$$A\text{-}NH_2 \tag{8}$$

In the general formula (8), Group A has the same meaning as in the formula (2) and the formula (3).

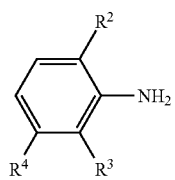
(9)

In the general formula (9), $R^2$, $R^3$, and $R^4$ have the same meanings as in the formula (1).

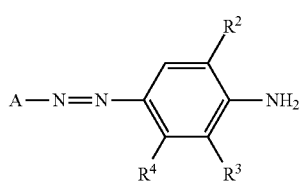
(10)

In the general formula (10), Group A, $R^2$, $R^3$, and $R^4$ have the same meanings as in the formulae (1) to (3).

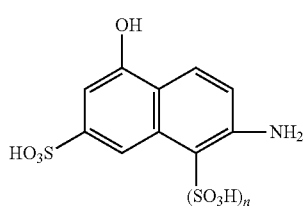
(11)

In the general formula (11), n has the same meaning as in the formula (1).

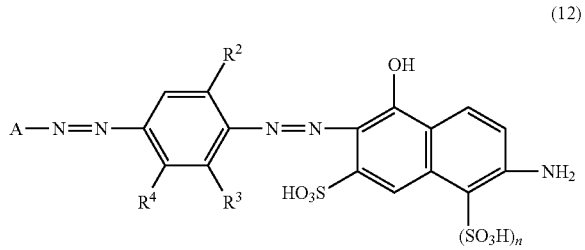

In the general formula (12), $R^2$, $R^3$ and $R^4$ have the same meanings as in the formula (1).

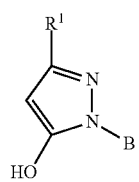

In the general formula (13), $R^1$ and Group B have the same meanings as in the formula (1).

For the ink composition of the present embodiment, among the compounds shown in Tables 2 to 7, a compound represented by the following general formula (14), which is a mixture of a compound represented by Compound No. 14 or a salt thereof, a compound represented by Compound No. 22 or a salt thereof, or a salt thereof can be preferably used.

embodiment can express an excellent black color to the naked eye, by the compensatory action between the first dye and the second dye. In the present specification, the excellent black color means a color in which the a* value of the image is in the range from −3 to 3, and simultaneously, the b* value is in the range from −3 to 3. The a* value and the b* value are defined by CIE (International Commission on Illumination) as an L*a*b* color system.

Furthermore, when the second dye is included in combination with the first dye in the ink composition, an image having an excellent color developability can be obtained. Particularly, even in the case where recording of an image is carried out with a high duty value using an ink composition including the first dye and the second dye, a bronzing phenomenon does not easily occur. The bronzing phenomenon refers to a phenomenon that easily occurs in the case where recording of an image is carried out with a high duty value, and that colors other than the original color are expressed or a metal gloss is expressed, and thus, color developability or the color are damaged.

Further, the "duty value" refers to a value calculated by "Duty(%)=Actual ejection frequency/(vertical resolution× horizontal resolution)×100 (wherein the "actual ejection frequency" is an actual ejection frequency per unit area, and each of the "vertical resolution" and the "horizontal resolution" is a resolution per unit area)".

Furthermore, the second dye has a tendency to be not easily decomposed in the ink composition, which is similar to the first dye. For this reason, the ink composition according to the present embodiment has excellent storage stability. Further, the second dye has a tendency to be not easily decomposed even by irradiation with light or exposure to a gas in the atmosphere (particularly, ozone), which is similar to the first dye. Accordingly, the image formed using the ink composition according to the present embodiment has excellent light

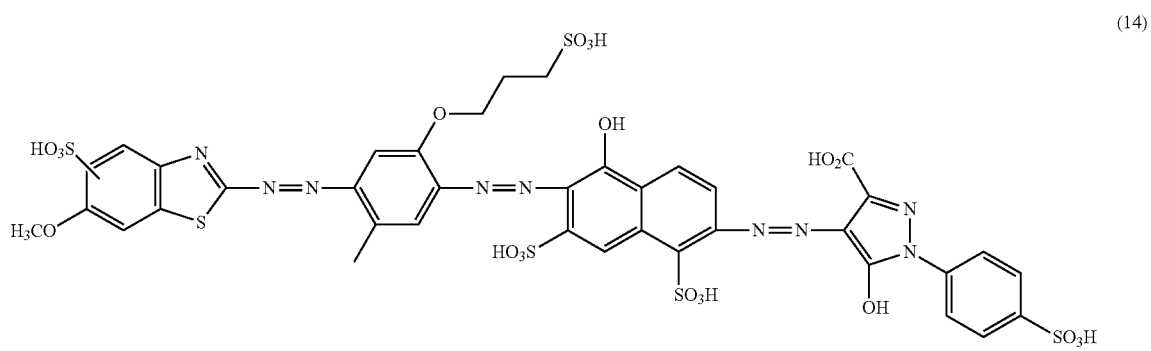

1.2. Second Dye
a. Second Dye

The ink composition according to the present embodiment includes a second dye. The second dye is a compound represented by the following general formula (21) or a salt thereof, as described above. The second dye is a dye which serves as a coloring material of the ink composition.

The second dye is a dye for color correction of the first dye. Accordingly, by adjusting the contents of the first dye and the second dye in the ink composition, or the content ratios of these dyes, the color of an image formed using the ink composition according to the present embodiment can be easily close to achromatic color. That is, the color of an image recorded using the ink composition according to the present resistance and gas resistance (particularly, ozone resistance), and is thus not easily faded or discolored by the effect of light or the atmosphere. In addition, since the first dye and the second dye have a synergic action in the ink composition, they further improve the storage stability of the ink composition, or further improve the color developing density, light resistance, ozone resistance, and the like of the recorded image, using the ink composition.

In the ink composition in the present embodiment, the ratio (MB/MA) of the content of the first dye [MA (% by mass)] and the content of the second dye [MB (% by mass)] is preferably equal to or more than 0.2 and equal to or less than 1, and more preferably equal to or more than 0.4 and equal to or less than 1. If the ratio of the contents of the first dye and the second dye is in the above-described range, an image expressing good black color (close to achromatic color) can be obtained, the color developing density of the recorded image can be improved, or the light resistance and gas resistance can be improved.

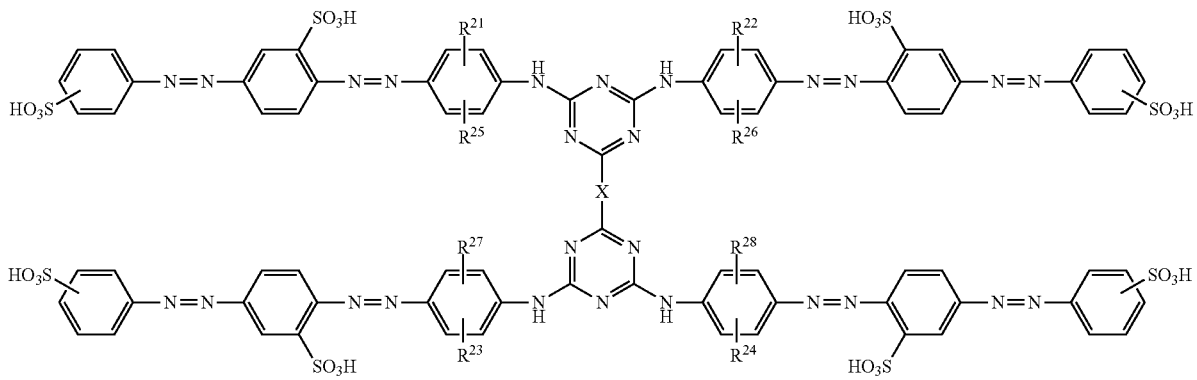

(21)

In the general formula (21), $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group, and a carboxy group as a substituent; a C1-C4 alkylcarbonylamino group; a C1-C4 alkylcarbonylamino group substituted with a carboxy group; a ureide group; a mono-C1-C4 alkylureide group; a di-C1-C4 alkylureide group; a mono-C1-C4 alkylureide group substituted with at least one group selected from the group consisting of a hydroxy group, a sulfo group, and a carboxy group as a substituent; a di-C1-C4 alkylureide group substituted with at least one group selected from the group consisting of a hydroxy group, a sulfo group, and a carboxy group as a substituent; a benzoylamino group; a benzoylamino group in which a benzene ring is substituted with at least one group selected from the group consisting of a halogen atom, a C1-C4 alkyl group, a nitro group, a sulfo group, and a carboxy group; a benzenesulfonylamino group; or a phenylsulfonylamino group in which a benzene ring is substituted with at least one group selected from the group consisting of a halogen atom, a C1-C4 alkyl group, a nitro group, a sulfo group, and a carboxy group.

Furthermore, X represents a divalent crosslinking group.

In the general formula (21), examples of the halogen atom in $R^{21}$ to $R^{28}$ include a fluorine atom, a chlorine atom, a bromine atom, and an iodine atom. Among these, a fluorine atom, a chlorine atom, and a bromine atom are preferable, and a chlorine atom is particularly preferable.

Examples of the C1-C4 alkyl group in $R^{21}$ to $R^{28}$ include linear ones or branched ones, and linear ones are preferred. Examples of the C1-C4 alkyl group include linear ones such as methyl, ethyl, n-propyl, and n-butyl; and branched ones such as isopropyl, isobutyl, sec-butyl, and t-butyl. Specific examples of the preferable C1-C4 alkyl group include methyl and ethyl, and particularly preferably methyl.

Examples of the C1-C4 alkoxy group in $R^{21}$ to $R^{28}$ include linear ones or branched ones. Specific examples of the C1-C4 alkoxy group include linear ones such as methoxy, ethoxy, n-propoxy, and n-butoxy; branched ones such as isopropoxy, isobutoxy, sec-butoxy, and t-butoxy; etc. Specific examples of the preferable C1-C4 alkoxy group include methoxy and ethoxy, and particularly preferably methoxy.

In $R^{21}$ to $R^{28}$, examples of the C1-C4 alkoxy group substituted with at least one group selected from the group consisting of a hydroxy group, a C1-C4 alkoxy group, a hydroxy-C1-C4 alkoxy group, a sulfo group, and a carboxy group as a substituent include ones having the substituent at any carbon atom in a C1-C4 alkoxy group. The number of the substituents is usually 1 or 2, and preferably 1. The position of the substituent is not particularly limited, but it is preferable that two or more oxygen atoms be not substituted at the same carbon atom. Specific examples of the C1-C4 alkoxy group substituted with at least one group selected from the group consisting of a hydroxy group, a C1-C4 alkoxy group, a hydroxy-C1-C4 alkoxy group, a sulfo group, and a carboxy group as a substituent include hydroxy-C1-C4 alkoxy groups such as 2-hydroxyethoxy, 2-hydroxypropoxy, 3-hydroxypropoxy, and the like; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, and the like; hydroxy-C1-C4 alkoxy-C1-C4 alkoxy groups such as 2-hydroxyethoxyethoxy and the like; carboxy-C1-C4 alkoxy groups such as carboxymethoxy, 2-carboxyethoxy, 3-carboxypropoxy, and the like; sulfo-C1-C4 alkoxy groups such as 2-sulfoethoxy, 3-sulfopropoxy, 4-sulfobutoxy, and the like; etc.

Examples of the C1-C4 alkylcarbonylamino group in $R^{21}$ to $R^{28}$ include linear ones or branched ones, and linear ones are preferred. Specific examples of the C1-C4 alkylcarbonylamino group include linear ones such as acetylamino(methylcarbonylamino), ethylcarbonylamino, propylcarbonylamino, butylcarbonylamino, and the like; branched ones such as isopropylcarbonylamino, t-butylcarbonylamino, and the like; etc.

In $R^{21}$ to $R^{28}$, specific examples of the C1-C4 alkylcarbonylamino group substituted with a carboxy group include carboxy-C1-C4 alkylcarbonylamino groups such as 2-carboxyethylcarbonylamino, 3-carboxypropylcarbonylamino, and the like; etc. The number of the carboxy group substituted is usually 1 or 2, and preferably 1.

Examples of the mono-C1-C4 alkylureide group in $R^{21}$ to $R^{28}$ include ones in which an alkyl moiety is linear or branched. The position of the C1-C4 alkyl to be substituted is not particularly limited, but is preferably at "N'". In the present specification, the "mono-C1-C4 alkylureide group" means a "C1-C4 alkylNH—CO—NH—" group or a "H₂N—CO—N(C1-C4 alkyl)-" group, and in the benzene ring to which $R^{21}$ to $R^{28}$ are bonded, the nitrogen atom which is directly bonded to the benzene ring is denoted as "N" and the nitrogen atom which is bonded to the benzene ring via the above-described nitrogen atom and a carbonyl(CO) group is denoted as "N'". Accordingly, the position of the C1-C4 alkyl to be substituted is "N'" in the former case or "N" in the latter case. Specific examples of the mono-C1-C4 alkylureide groups include linear ones such as N'-ethylureide, N'-propylureide, N'-butylureide, and the like; branched ones such as N'-isopropylureide, N'-isobutylureide, N'-t-butylureide, and the like; etc.

Examples of the di-C1-C4 alkylureide group in $R^{21}$ to $R^{28}$ include linear ones or branched ones. The position of the C1-C4 alkyl to be substituted is not particularly limited, and according to the position for substitution in the "mono-C1-C4 alkylureide group", one may be substituted at "N" and "N'", respectively, or two may be substituted at "N'", but the latter case is preferred. Further, the two C1-C4 alkyl groups may be the same as or different from each other, but they are preferably the same as each other. Specific examples of the di-C1-C4 alkylureide group include linear ones such as N',N'-dimethylureide, N',N'-diethylureide, N',N'-dipropylureide, N',N'-dibutylureide, and the like; branched ones such as N',N'-diisopropylureide, N',N'-diisobutylureide, and the like; etc.

In $R^{21}$ to $R^{28}$, examples of the mono-C1-C4 alkylureide group substituted with at least one group selected from the group consisting of a hydroxy group, a sulfo group, and a carboxy group as a substituent include ones which have the substituent at any carbon atom in the mono-C1-C4 alkylureide group. The number of the substituents is usually 1 or 2, and preferably 1. The position of the substituent is not particularly limited, but it is preferable that a nitrogen atom and a hydroxy group be not substituted at the same carbon atom. Specific examples of the mono-C1-C4 alkylureide group include N'-mono(hydroxy-C1-C4 alkyl)ureide groups such as N'-2-hydroxyethylureide, N'-3-hydroxypropylureide, and the like; N'-mono(sulfo-C1-C4 alkyl)ureide groups such as N'-2-sulfoethylureide, N'-3-sulfopropylureide, and the like; N'-mono(carboxy-C1-C4 alkyl)ureide group such as N'-carboxymethylureide, N'-2-carboxyethylureide, N'-3-carboxypropylureide, N'-4-carboxybutylureide, and the like; etc.

In $R^{21}$ to $R^{28}$, examples of the di-C1-C4 alkylureide group substituted with at least one group selected from the group consisting of a hydroxy group, a sulfo group, and a carboxy group as a substituent include ones which have the substituent at any carbon atom in the di-C1-C4 alkylureide group. The number of the substituents is usually 1 or 2, and preferably 2. The position of the substituent is not particularly limited, but it is preferable that a nitrogen atom and a hydroxy group be not substituted at the same carbon atom. Further, when there are a plurality of substituents, the kinds thereof may be the same as or different from each other, but they are preferably the same as each other. Specific examples of the di-C1-C4 alkylureide group substituted with at least one group selected from the group consisting of a hydroxy group, a sulfo group, and a carboxy group as a substituent include N',N'-di(hydroxy-C1-C4 alkyl)ureide groups such as N',N'-di(2-hydroxyethyl)ureide, N',N'-di(2-hydroxypropyl)ureide, N',N'-di(3-hydroxypropyl)ureide, and the like; N',N'-di(sulfo-C1-C4 alkyl)ureide groups such as N',N'-di(3-sulfopropyl)ureide and the like; N',N'-di(carboxy-C1-C4 alkyl)ureide groups such as N',N'-di(carboxymethyl)ureide, and the like; etc.

In $R^{21}$ to $R^{28}$, examples of the benzoylamino group in which a benzene ring is substituted with at least one group selected from the group consisting of a halogen atom (including a fluorine atom, a chlorine atom, a bromine atom, and an iodine atom, and particularly preferably a chlorine atom), a C1-C4 alkyl group, a nitro group, a sulfo group, and a carboxy group as a substituent include ones in which the number of the substituents is 1 to 3, and preferably 1 or 2. When there are a plurality of substituents, the kinds thereof may be the same as or different from each other but they are preferably the same as each other. Specific examples of the benzoylamino group in which a benzene ring is substituted with at least one group selected from the group consisting of a halogen atom (including a fluorine atom, a chlorine atom, a bromine atom, and an iodine atom, and particularly preferably a chlorine atom), a C1-C4 alkyl group, a nitro group, a sulfo group, and a carboxy group as a substituent include halogen atom-substituted benzoylamino groups such as 2-chlorobenzoylamino, 4-chlorobenzoylamino, 2,4-dichlorobenzoylamino, and the like; C1-C4 alkyl-substituted benzoylamino groups such as 2-methylbenzoylamino, 3-methylbenzoylamino, 4-methylbenzoylamino, and the like; nitro-substituted benzoylamino groups such as 2-nitrobenzoylamino, 4-nitrobenzoylamino, 3,5-dinitrobenzoylamino, and the like; sulfo-substituted benzoylamino groups such as 2-sulfobenzoylamino, 4-sulfobenzoylamino, and the like; carboxy-substituted benzoylamino groups such as 2-carboxybenzoylamino, 4-carboxybenzoylamino, 3,5-dicarboxybenzoylamino, and the like; etc.

In $R^{21}$ to $R^{28}$, examples of the phenylsulfonylamino group in which a benzene ring is substituted with at least one group selected from the group consisting of a halogen atom, a C1-C4 alkyl group, a nitro group, a sulfo group, and a carboxy group as a substituent include ones in which the number of the substituents is 1 to 3, preferably 1 or 2, and further more preferably 1. When there are a plurality of substituents, the kinds thereof may be the same as or different from each. Specific examples of the phenylsulfonylamino group in which a benzene ring is substituted with at least one group selected from the group consisting of a halogen atom, a C1-C4 alkyl group, a nitro group, a sulfo group, and a carboxy group as a substituent include halogen atom-substituted phenylsulfonylamino groups such as 2-chlorophenylsulfonylamino, 4-chlorophenylsulfonylamino, and the like; C1-C4 alkyl-substituted phenylsulfonylamino groups such as 2-methylphenylsulfonylamino, 4-methylphenylsulfonylamino, 4-t-butylphenylsulfonylamino, and the like; nitro-substituted phenylsulfonylamino groups such as 2-nitrophenylsulfonylamino, 3-nitrophenylsulfonylamino, 4-nitrophenylsulfonylamino, and the like; sulfo-substituted phenylsulfonylamino groups such as 3-sulfophenylsulfonylamino, 4-sulfophenylsulfonylamino, and the like; carboxy-substituted phenylsulfonylamino groups such as 3-carboxyphenylsulfonylamino, 4-carboxyphenylsulfonylamino, and the like; etc.

Among these, as $R^{21}$ to $R^{28}$, a hydrogen atom; a halogen atom; a C1-C4 alkyl group; a C1-C4 alkoxy group; a C1-C4 alkoxy group substituted with a sulfo group or a carboxy group; and a C1-C4 alkylcarbonylamino group are preferable. Among these, a hydrogen atom, methyl, ethyl, t-butyl, 2-carboxyethoxy, 3-carboxypropoxy, 2-sulfoethoxy, 3-sulfopropoxy, and 4-sulfobutoxy are more preferable, and among these, a hydrogen atom, methyl, and 3-sulfopropoxy are particularly preferable.

In the general formula (21), it is preferable that at least one of $R^{21}$ to $R^{28}$ be a C1-C4 alkoxy group substituted with a sulfo group. Further, it is more preferable that $R^{21}$ to $R^{24}$ be each independently a hydrogen atom, a C1-C4 alkyl group, or a C1-C4 alkoxy group substituted with a sulfo group, and at the same time, at least one of $R^{21}$ to $R^{24}$ be a C1-C4 alkoxy group substituted with a sulfo group, and $R^{25}$ to $R^{28}$ be each independently a hydrogen atom or a C1-C4 alkyl group. Further, it is further more preferable that at least one of $R^{21}$ and $R^{22}$ be a sulfopropoxy group, at least one of $R^{23}$ and $R^{24}$ be a sulfopropoxy group, and $R^{25}$ to $R^{28}$ be C1-C4 alkyl groups.

The position of $R^{21}$ to $R^{28}$ to be substituted is not particularly limited, but it is preferable that in each benzene ring to be substituted with this, the position of the nitrogen atom bonding to the triazine ring be the 1-position, the position of the azo group to be substituted be the 4-position, and the position of $R^{21}$ to $R^{24}$ to be substituted be the 2-position, and the position of $R^{25}$ to $R^{28}$ to be substituted be the 5-position.

In the general formula (21), the crosslinking group represented by X is not particularly limited so long as it is a divalent group within a range where a compound represented by the general formula (21) shows solubility in water. Herein, as for the solubility of the compound represented by the general formula (21) in water, the compound represented by the general formula (21) may be dissolved in the amount of usually 5 g or more, preferably 10 g or more, more preferably 25 g or more, even more preferably 50 g or more, and particularly preferably 100 g or more, respectively, with respect to 1 liter of water. Specific examples of the crosslinking group include divalent atoms (preferably divalent hetero atoms) such as a nitrogen atom, an oxygen atom, a sulfur atom, and the like; a C1-C8 alkylenediamino group, a C1-C8 alkylenedioxy group, or a C1-C8 alkylenedithio group; an N,N'-hydrazinediyl group; an aminoalkoxyalkylamino group, in which two alkylamino groups are substituted at oxygen atoms; ones in which each one of an amino group and an alkylamino group is substituted at a terminal of an alkylene oxide chain including one or more ether bonds, such as an amino alkoxyalkoxyalkylamino group and the like; etc. The divalent crosslinking group represented by X may contain a group selected from the group consisting of a hydroxy group, a carboxy group, and an alkoxy group, as a substituent at a carbon atom; and an alkyl group in which an alkyl moiety may be substituted with a hydroxy group or a carboxy group as a substituent at a nitrogen atom, respectively.

As the divalent crosslinking group represented by X, any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which an alkyl moiety is substituted with a hydroxy group or a carboxy group; an amino-C1-C6 alkoxy-C1-C6 alkylamino group; an amino-C1-C4 alkoxy-C1-C4 alkoxy-C1-C4 alkylamino group; a xylenediamino group; a piperazine-1,4-diyl group; a piperazine-1,4-diyl group substituted with a C1-C4 alkyl group or C1-C4 alkoxy group; or a phenylenediamino group is preferable. Further, any of these divalent crosslinking groups is a "diamino" group having two amino groups. Accordingly, the "diamino" includes both of one having crosslinking with any one of a nitrogen atom (that is, N,N-diyl), except for some groups, such as piperazine-1,4-diyl and the like, or one having crosslinking with two other nitrogen atoms (that is, N,N'-diyl). Among these, the latter, that is, "N,N'-diyl", is particularly preferable.

Examples of the C1-C8 alkylenediamino group in X include linear ones or branched ones, and linear ones are preferred. The range of the number of carbon atoms is usually C1-C8, preferably C2-C8, more preferably C2-C6, and even more preferably C2-C4. Specific examples of the C1-C8 alkylenediamino group include linear ones such as ethylenediamino, 1,3-propylenediamino, 1,4-butylenediamino, 1,5-pentylenediamino, 1,6-hexylenediamino, 1,7-heptylenediamino, and 1,8-octylenediamino; branched ones such as 2-methyl-1,3-propylenediamino, 3-methyl-1,4-butylenediamino, 4-methyl-1,6-hexylenediamino, and the like; etc.

Examples of the C1-C8 alkylenediamino group substituted with a hydroxy group or a carboxy group in X include ones having the substituent at any carbon atom in the C1-C8 alkylenediamino group. The number of the substituents is usually 1 or 2, and preferably 1. Further, when there are a plurality of substituents, the kinds thereof may be the same as or different from each other but they are preferably the same as each other. Specific examples of the C1-C8 alkylenediamino group substituted with a hydroxy group or a carboxy group include hydroxy-substituted C1-C8 alkylenediamino groups such as 2-hydroxy-1,3-propylenediamino, 2-hydroxy-1,4-butylenediamino, 3-hydroxy-1,6-hexylenediamino, and the like; carboxy-substituted C1-C8 alkylenediamino groups such as 1-carboxyethylenediamino, 1-carboxy-1,3-propylenediamino, 1-carboxy-1,4-butylenediamino, 1-carboxy-1,5-pentylenediamino, 1,5-dicarboxy-1,5-pentylenediamino, and the like; etc.

The N—C1-C4 alkyl-C1-C6 alkylenediamino group in X means one in which a nitrogen atom which is on one side of a C1-C6 alkylenediamino group is substituted with a C1-C4 alkyl group. In the present specification, the nitrogen atom which is substituted with a C1-C4 alkyl group in the diamino group is denoted as "N" and the nitrogen atom which is on the other side is denoted as "N'", as desired. The range of the number of carbon atoms in the alkylene moiety is usually C1-C6, preferably C2-C4, and particularly preferably C2 or C3. Examples of the C1-C4 alkyl group include linear ones or branched ones, and linear ones are preferred. Specific examples of the N—C1-C4 alkyl-C1-C6 alkylenediamino group include N-linear C1-C4 alkyl-C1-C6 alkylenediamino groups such as an N-methylethylenediamino group, an N-ethylethylenediamino group, an N-propylethylenediamino group, and an N-butylethylenediamino group; N-branched C1-C4 alkyl-C1-C6 alkylenediamino groups such as an N-isopropylethylenediamino group, an N-isobutylethylenediamino group, an N-sec-butylethylenediamino group, and an N-tert-butylethylenediamino group; etc.

In X, examples of the N—C1-C4 alkyl-C1-C6 alkylenediamino group in which an alkyl moiety is substituted with a hydroxy group or a carboxy group include the N—C1-C4 alkyl-C1-C6 alkylenediamino group, which has the substituent at any carbon atom of the alkyl moiety of the N—C1-C4 alkyl group. The position of the substituent is not particularly limited, but it is preferable that a nitrogen atom and a hydroxy group be not substituted at the same carbon atom. The range of the number of carbon atoms in the alkylene moiety, including preferable examples thereof, is the same as that of the N—C1-C4 alkyl-C1-C6 alkylenediamino group. Further, the range of the number of carbon atoms in the alkyl moiety is usually C1-C4, preferably C2-C4, and more preferably C2-C3. The number of the substituents is usually 1 or 2, and preferably 1. Further, when there are a plurality of substituents, the kinds thereof may be the same as or different from each other but they are preferably the same as each other. Specific examples of the N—C1-C4 alkyl-C1-C6 alkylenediamino group in which an alkyl moiety is substituted with a hydroxy group or a carboxy group include N-hydroxy-substituted C1-C4 alkyl-C1-C6 alkylenediamino groups such as an N-(2-hydroxyethyl)ethylenediamino group, an N-(3-hydroxypropyl)ethylenediamino group, an N-(2-hydroxypropyl)ethylenediamino group, an N-(4-hydroxybutyl)ethylenediamino group, and the like; N-carboxy-substituted C1-C4 alkyl-C1-C6 alkylenediamino groups such as an N-(carboxymethyl)ethylenediamino group, an N-(2-carboxyethyl)ethylenediamino group, an N-(3-carboxypropyl)ethylenediamino group, an N-(4-carboxybutyl)ethylenediamino group, and the like; etc.

Examples of the amino-C1-C6 alkoxy-C1-C6 alkylamino group in X include linear ones or branched ones, and linear ones are preferred. Further, among the amino-C1-C6 alkoxy-C1-C6 alkylamino groups, ones having a preferable range of the number of carbon atoms include amino-C2-C4 alkoxy-C2-C4 alkylamino groups, and ones having a particularly preferable range of the number of carbon atoms include amino-C2-C3 alkoxy-C2-C3 alkylamino groups. Specific examples of the amino-C1-C6 alkoxy-C1-C6 alkylamino group include aminoethoxyethylamino, aminoethoxypropylamino, aminopropoxypropylamino, aminoethoxypentylamino, and the like.

Examples of the amino-C1-C4 alkoxy-C1-C4 alkoxy-C1-C4 alkylamino group in X include linear ones or branched ones, and linear ones are preferred. Further, among the amino-C1-C4 alkoxy-C1-C4 alkoxy-C1-C4 alkylamino groups, ones having a preferable range of the number of carbon atoms include amino-C2-C4 alkoxy-C2-C4 alkoxy-C2-C4 alkylamino groups, and ones having a particularly preferable range of the number of carbon atoms include amino-C2-C3 alkoxy-C2-C3 alkoxy-C2-C3 alkylamino groups. Specific examples of the amino-C1-C4 alkoxy-C1-C4 alkoxy-C1-C4 alkylamino group include linear ones such as aminoethoxyethoxyethylamino, aminoethoxypropoxyethylamino, aminoethoxybutoxyethylamino, and the like; branched ones such as aminoethoxy(2-methylethoxy)ethylamino, aminoethoxy(2-methylpropoxy)ethylamino, and the like; etc.

Examples of the xylenediamino group in X include an o-xylenediamino group, an m-xylenediamino group, and a p-xylenediamino group, and an m-xylenediamino group or a p-xylenediamino group is preferred.

Examples of the piperazine-1,4-diyl group substituted with a C1-C4 alkyl group or a C1-C4 alkoxy group in X include ones which have a substituent at any carbon atom of a ring-constituting atom of a piperazine ring. The number of the substituents is usually 1 or 2, and preferably 1. Further, when there are a plurality of substituents, the kinds thereof may be the same as or different from each other but preferably the same as each other. Specific examples of the piperazine-1,4-diyl group substituted with a C1-C4 alkyl group or a C1-C4 alkoxy group include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, a 2-methyl-5-ethylpiperazine-1,4-diyl group; etc.

Examples of the phenylenediamino group in X include o-, m-, and p-phenylenediamino groups, and an m- or p-phenylenediamino group is preferred.

Among these, X is preferably a C1-C8 alkylenediamino group; a C1-C8 alkylenediamino group substituted with a carboxy group; an N—C1-C4 alkyl-C1-C6 alkylenediamino group in which an alkyl moiety is substituted with hydroxy; an amino-C1-C4 alkoxy-C1-C4 alkoxy-C1-C4 alkoxyamino group; a xylenediamino group; or piperazine-1,4-diyl group. Among these, X is more preferably a C1-C8 alkylenediamino group; a xylenediamino group; or a piperazine-1,4-diyl group. Among these, preferred specific examples thereof include 1,2-ethylenediamino; 1,3-propylenediamino; 1,4-butylenediamino; 1-carboxypentylene-1,5-diamino; N-2-hydroxyethyl-ethylenediamino; aminoethbxyethoxyethylamino; m-xylenediamino; or piperazine-1,4-diyl.

In the general formula (21), the substitution position of four sulfo groups, in which the substitution position is not specified, is not particularly limited. The sulfo group which is substituted at a benzene ring having one azo bond may be substituted at the 2-, 3-, or 4-position, and preferably at the 4-position, with the substitution position of the azo bond being the 1 position.

The second dye represented by the general formula (21) is preferably a compound represented by the following general formula (22), and more preferably a compound represented by the following general formula (23).

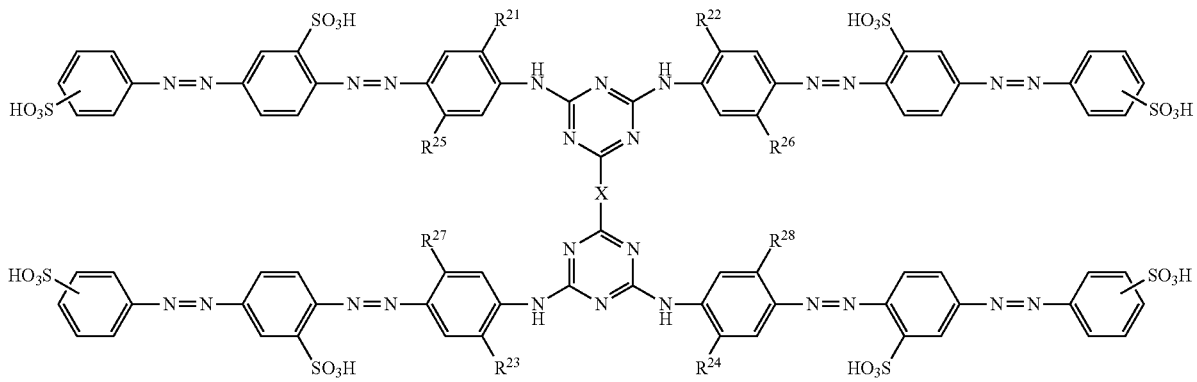

(22)

In the general formula (22), $R^{21}$ to $R^{28}$, and X have the same meanings as in the formula (21).

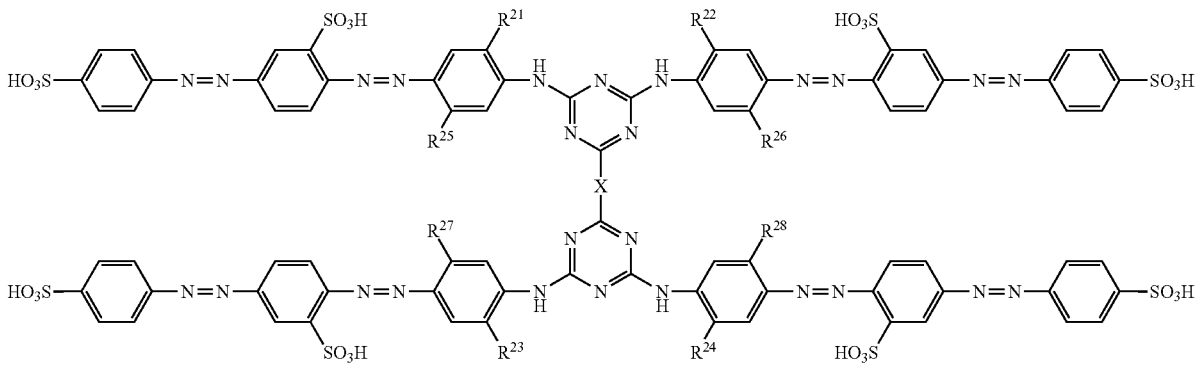

(23)

In the general formula (23), $R^{21}$ to $R^{28}$, and X have the same meanings as in the formula (21).

As for $R^{21}$ to $R^{28}$ in the general formulae (21) to (23), the substitution positions of $R^{21}$ to $R^{28}$ in the general formula (21), and the substitution positions of the sulfo groups, in which the substitution position is not specified in the general formulae (21) and (22), and the like, a compound formed with a combination of the preferable same kinds is more preferred, and a compound formed with a combination of the more preferable same kinds is even more preferred. This shall also apply to the more preferable same kinds, the combination of the preferable ones and the more preferable ones, and the like.

A salt of a compound represented by the general formula (21) may be an inorganic or organic cationic salt. Examples of the inorganic salt include an alkali metal salt, an alkaline earth metal salt, and an ammonium salt. Among these, the preferable inorganic salt is a salt of an alkali metal such as lithium, sodium, potassium, and the like, or an ammonium salt. In addition, examples of the organic cationic salt include a quaternary ammonium ion represented by the general formula (7), but are not limited thereto.

Furthermore, a free acid of the second dye according to the present embodiment, and various salts thereof may be a mixture. For example, any combination of a mixture of a sodium salt of the second dye and an ammonium salt of the second dye, a mixture of a free acid of the second dye and a sodium salt of the second dye, a mixture of a lithium salt of the second dye, a sodium salt of the second dye, and an ammonium salt of the second dye, or the like may be used. Physical properties such as solubility and the like may vary depending on the kind of the salt, a mixture having intended physical properties can be obtained by appropriately selecting the kind of the salt according to necessity and by changing the ratio of salts in the case where a plurality of salts and the like are included.

Preferred specific examples of the second dye include, but are not particularly limited thereto, the compounds represented by the structural formulae shown in Tables 8 to 29, and the like. In each of the Tables, the functional groups such as a sulfo group, a carboxy group, and the like are shown in the form of a free acid, for convenience.

TABLE 8

| Compound No. | Structural Formula |
|---|---|
| 37 | |

TABLE 8-continued

| Compound No. | Structural Formula |
|---|---|
| 38 | (structure) |
| 39 | (structure) |

TABLE 9
| Compound No. | Structural Formula |
|---|---|
| 40 | 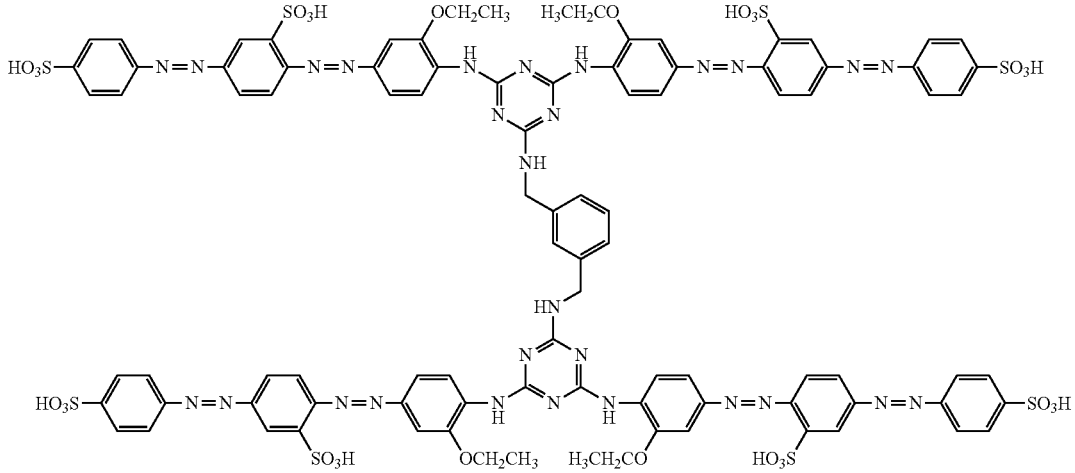 |
| 41 | 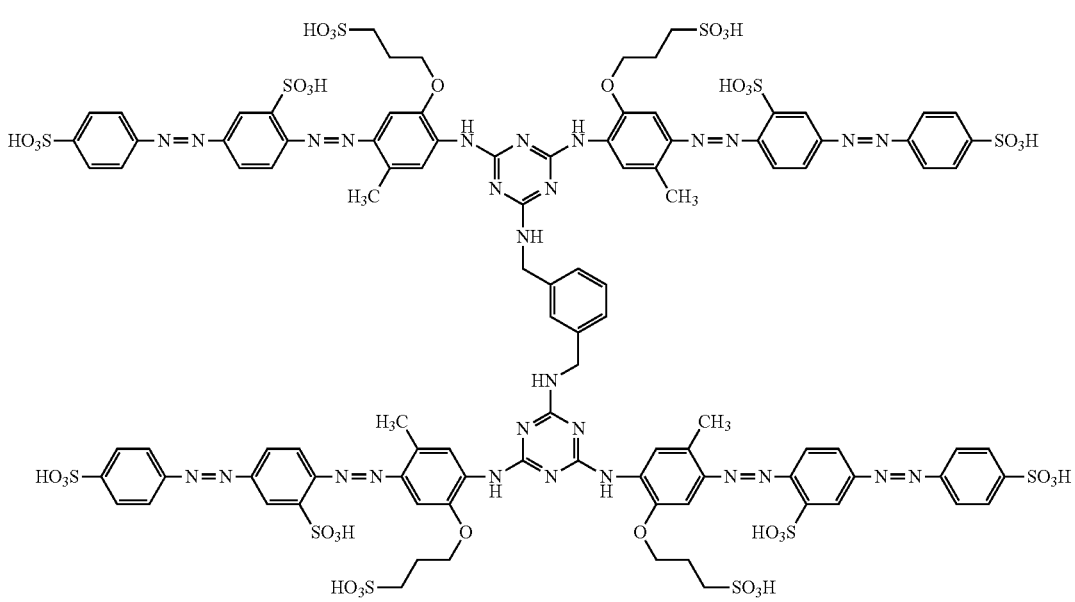 [SMILES: Cc1cc(Nc2nc(NCc3cccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 42 | 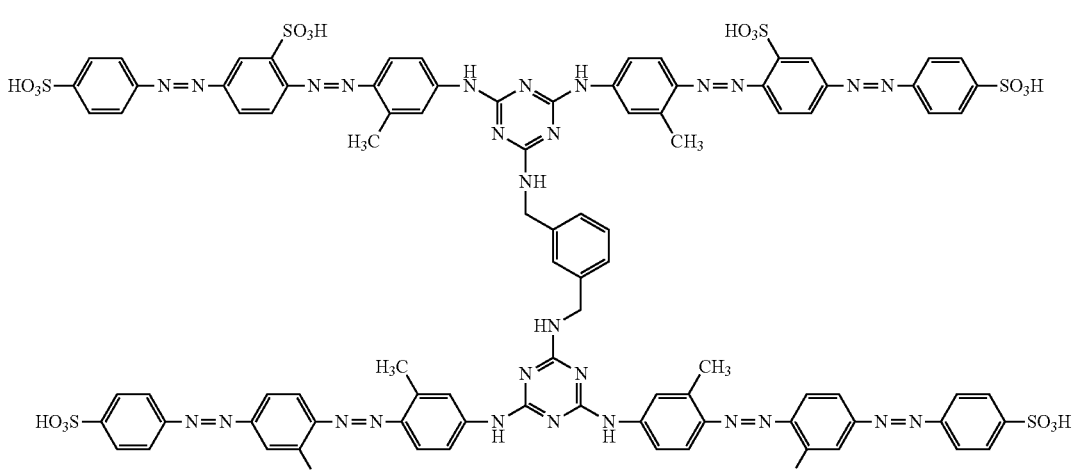 |

TABLE 10
| Compound No. | Structural Formula |
|---|---|
| 43 | 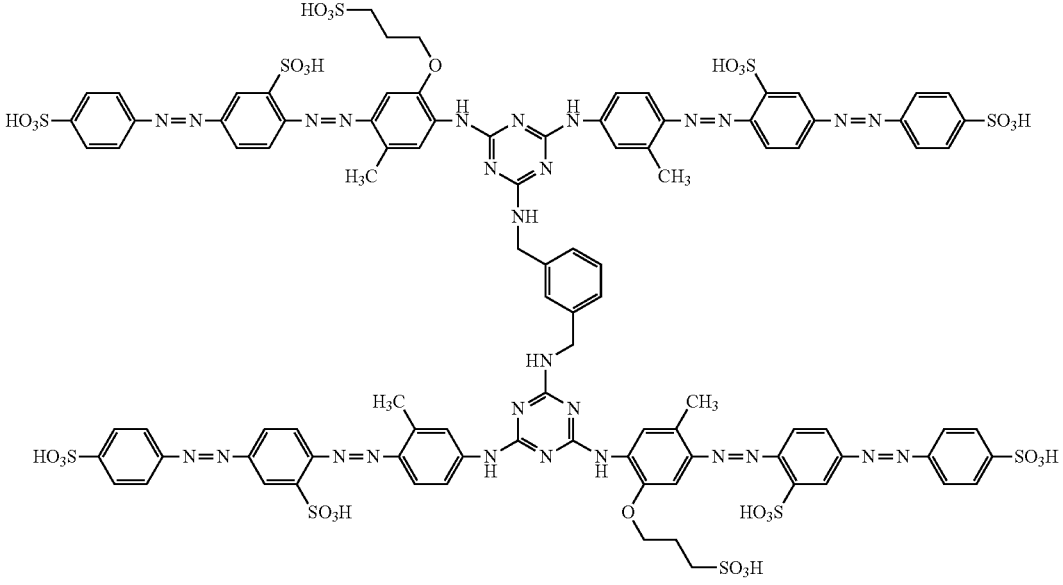 [SMILES: Cc1cc(Nc2nc(NCc3cccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 44 | 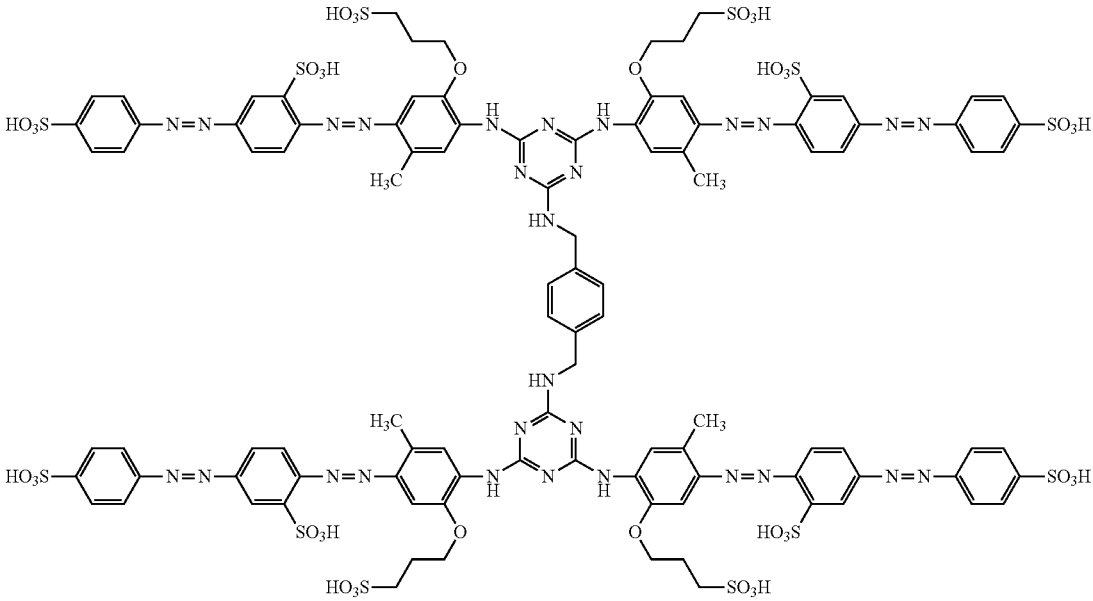 [SMILES: Cc1cc(Nc2nc(NCc3ccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 10-continued
| Compound No. | Structural Formula |
|---|---|
| 45 | 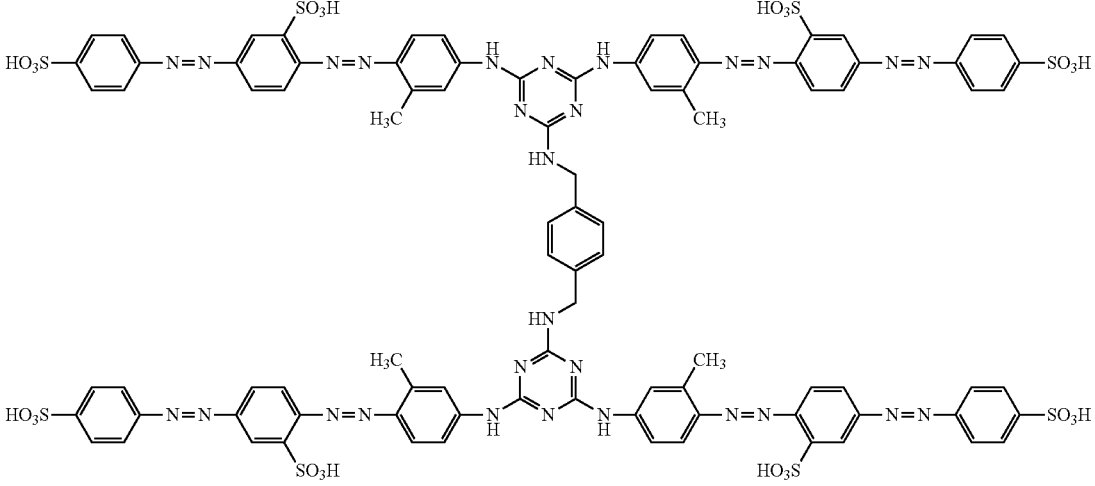 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 11
| Compound No. | Structural Formula |
|---|---|
| 46 | 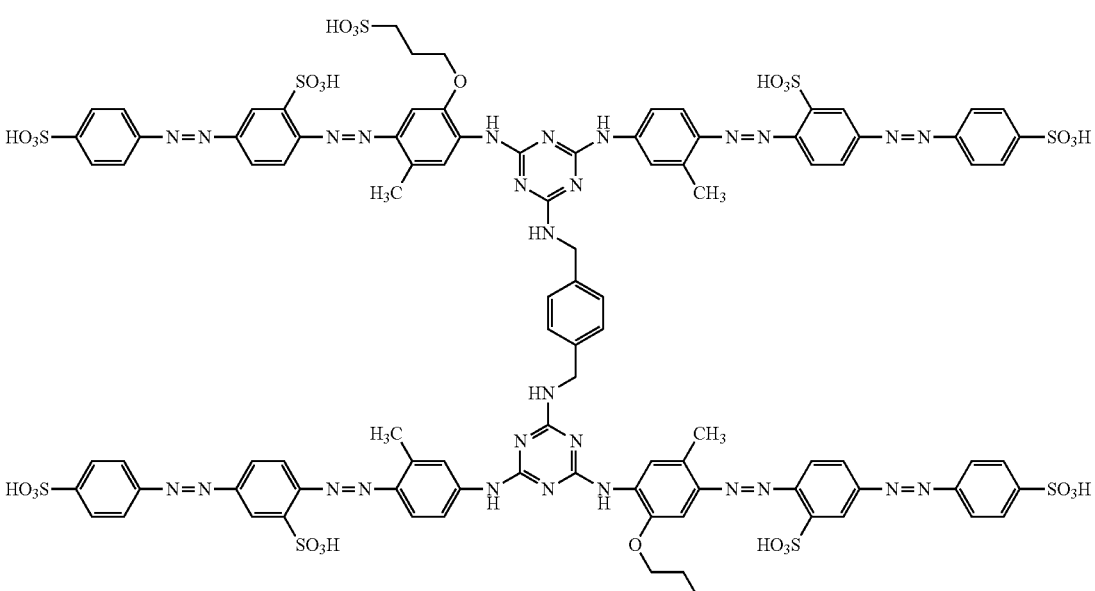 |

TABLE 11-continued

| Compound No. | Structural Formula |
|---|---|
| 47 | (structure) |
| 48 | (structure) |

TABLE 12
| Compound No. | Structural Formula |
|---|---|
| 49 | 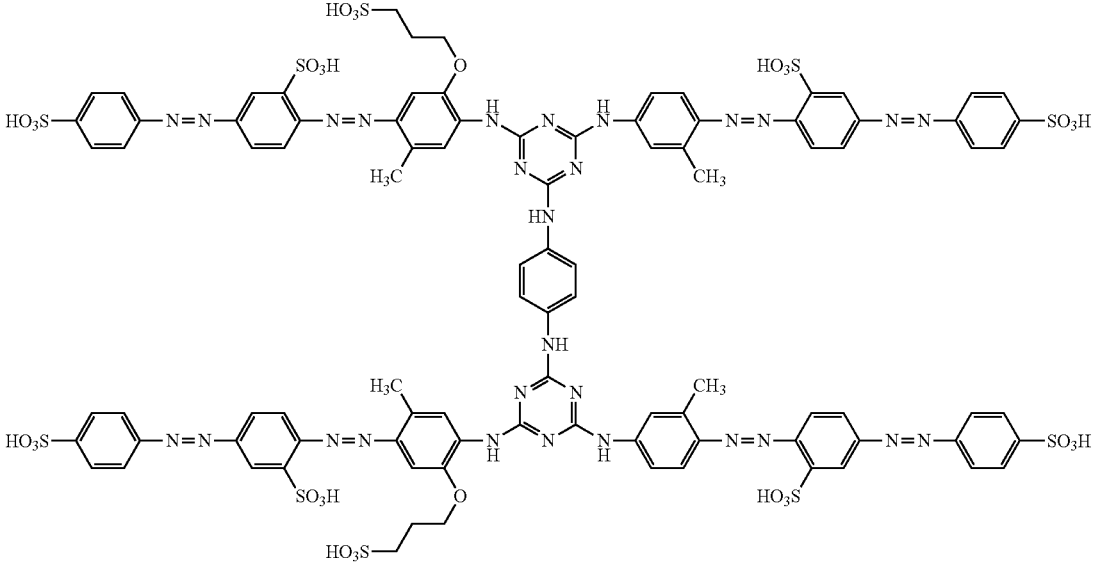 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 50 | 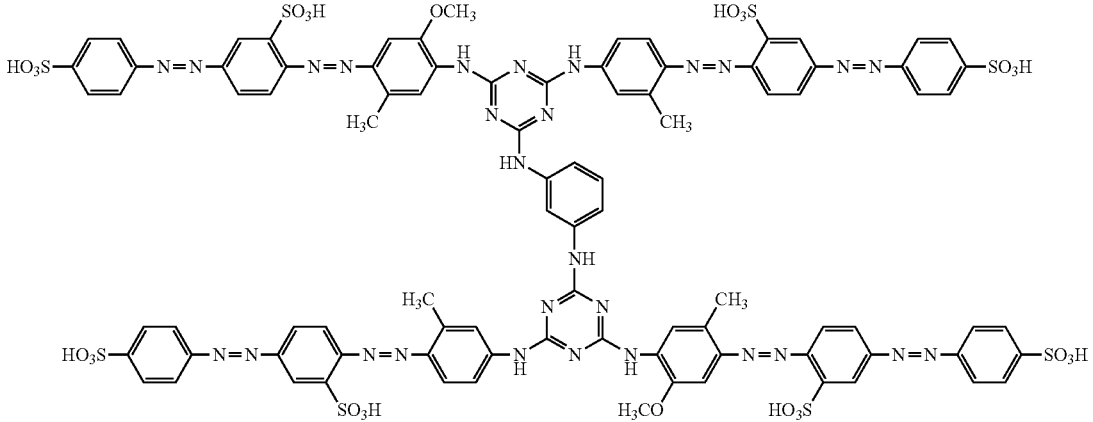 [SMILES: COc1cc(N=Nc2ccc(N=Nc3ccc(S(=O)(=O)O)cc3)cc2S(=O)(=O)O)c(C)cc1Nc1nc(Nc2cccc(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)c2)nc(Nc2ccc(N=Nc3ccc(N=Nc4ccc(S(=O)(=O)O)cc4)cc3S(=O)(=O)O)c(C)c2)n1] |
| 51 | 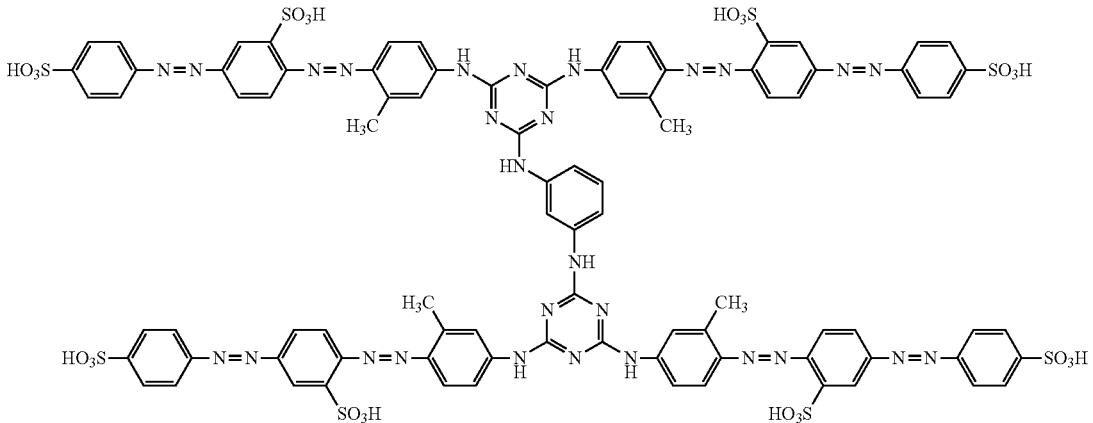 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 12-continued
| Compound No. | Structural Formula |
| --- | --- |
| 52 | 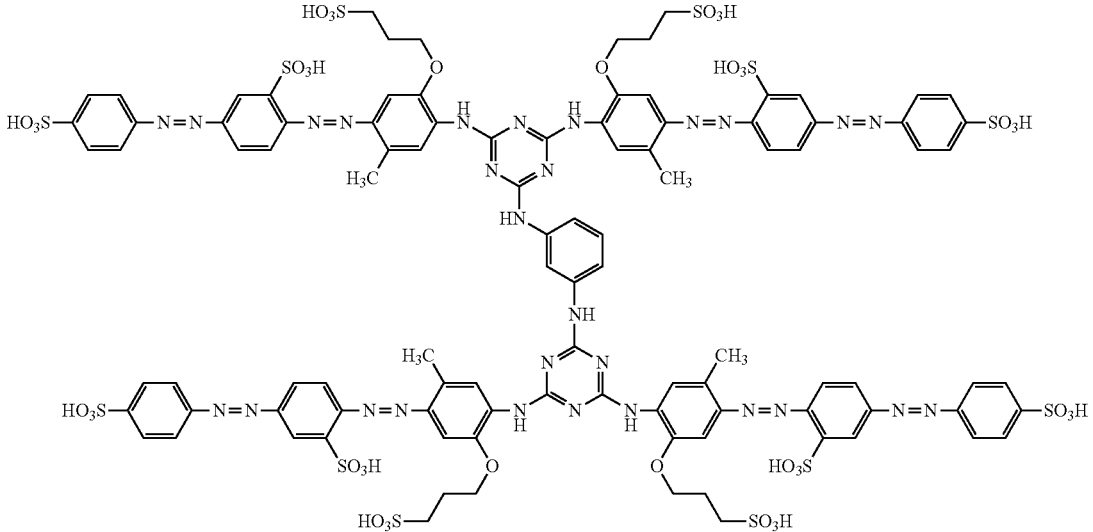 [SMILES: Cc1cc(Nc2nc(Nc3cccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 13
| Compound No. | Structural Formula |
| --- | --- |
| 53 | 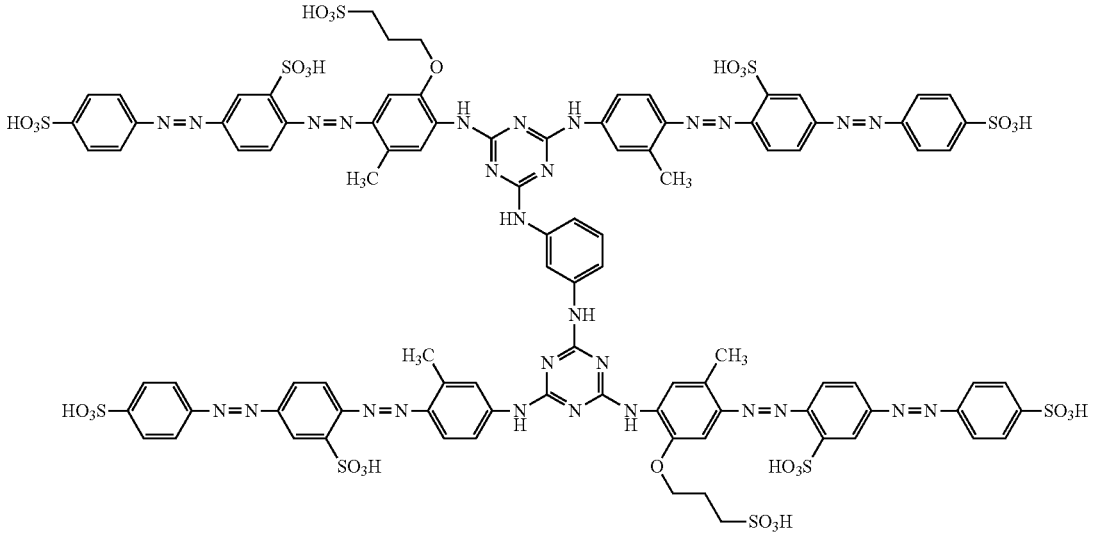 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 13-continued
| Compound No. | Structural Formula |
|---|---|
| 54 | 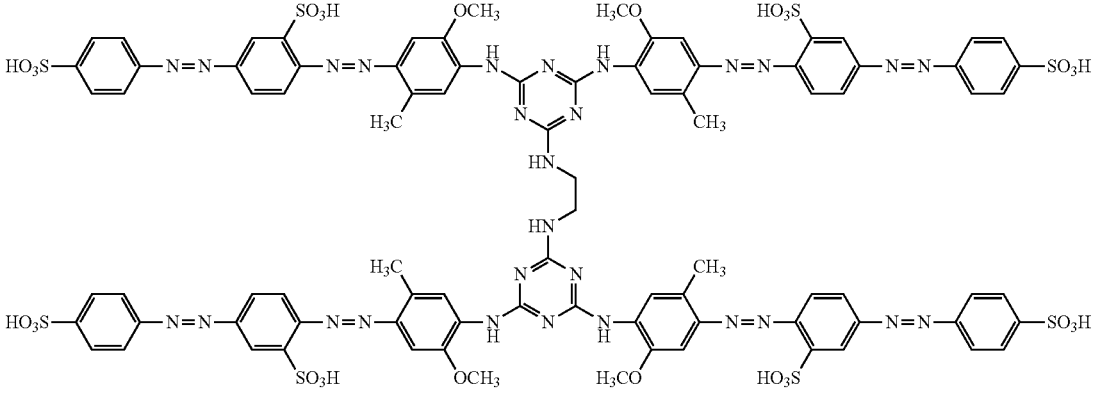 [SMILES: COc1cc(N=Nc2ccc(N=Nc3ccc(S(=O)(=O)O)cc3)cc2S(=O)(=O)O)c(C)cc1Nc1nc(NCCNc2nc(Nc3cc(C)c(N=Nc4ccc(N=Nc5ccc(S(=O)(=O)O)cc5)cc4S(=O)(=O)O)cc3OC)nc(Nc3cc(C)c(N=Nc4ccc(N=Nc5ccc(S(=O)(=O)O)cc5)cc4S(=O)(=O)O)cc3OC)n2)nc(Nc2cc(C)c(N=Nc3ccc(N=Nc4ccc(S(=O)(=O)O)cc4)cc3S(=O)(=O)O)cc2OC)n1] |
| 55 | 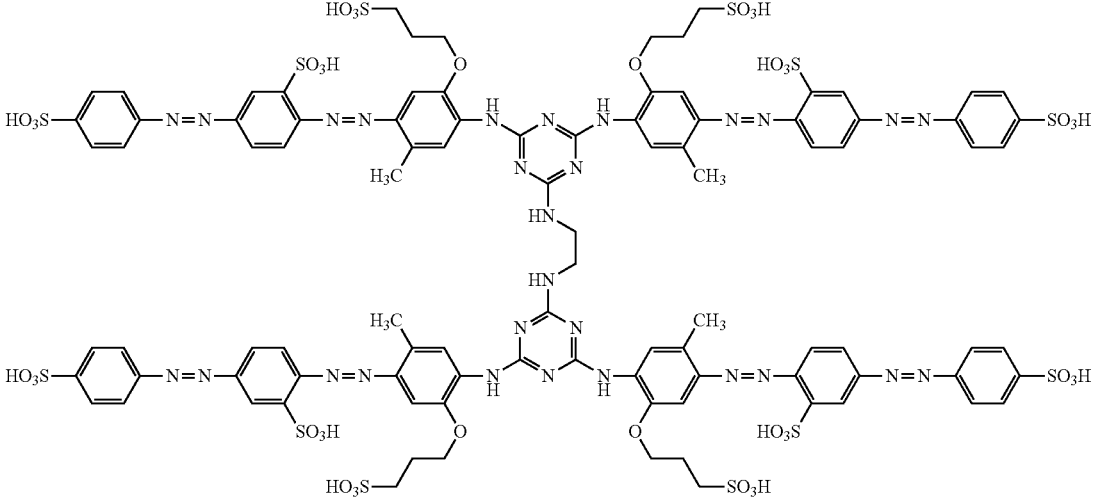 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 56 | 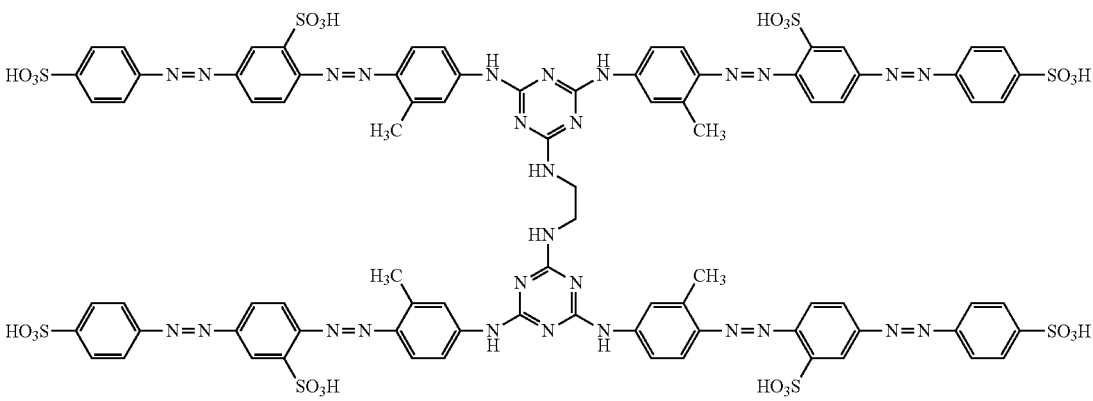 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 14
| Compound No. | Structural Formula |
|---|---|
| 57 | 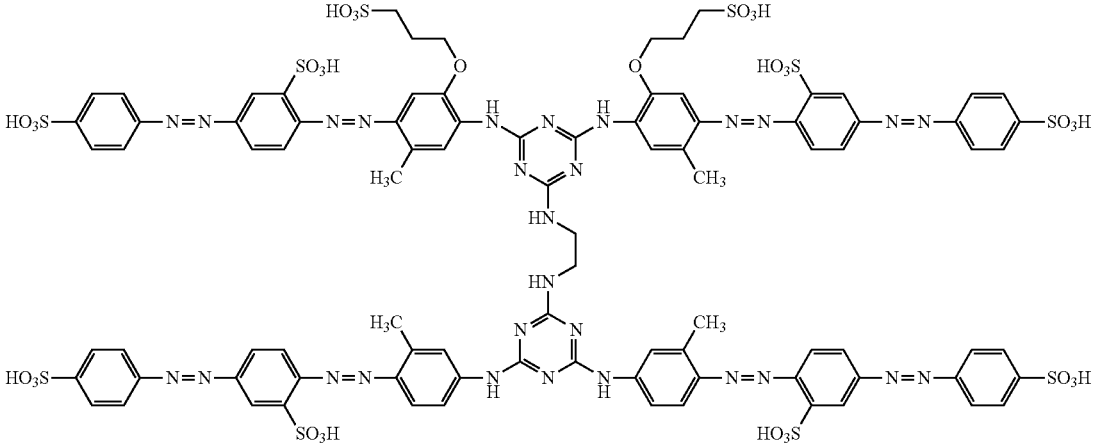 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 58 | 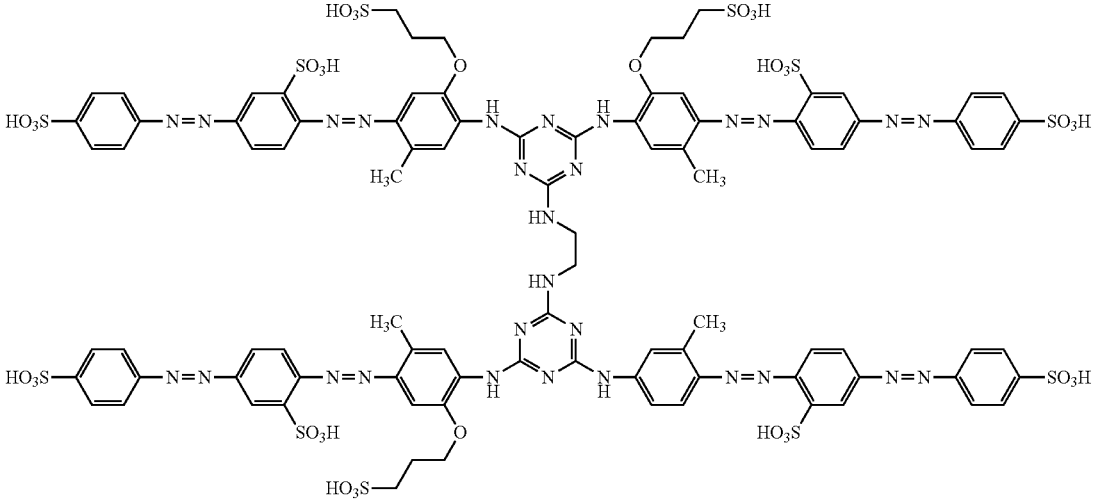 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 59 | 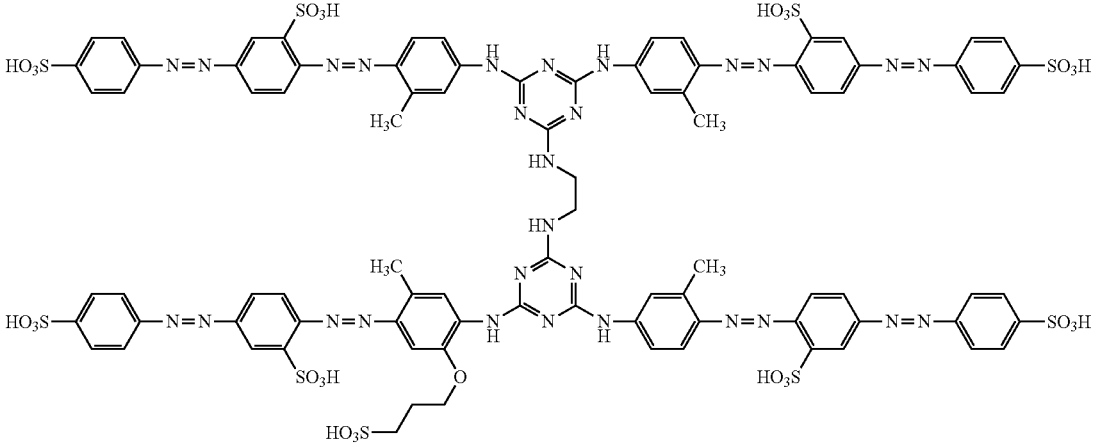 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 14-continued
| Compound No. | Structural Formula |
|---|---|
| 60 | 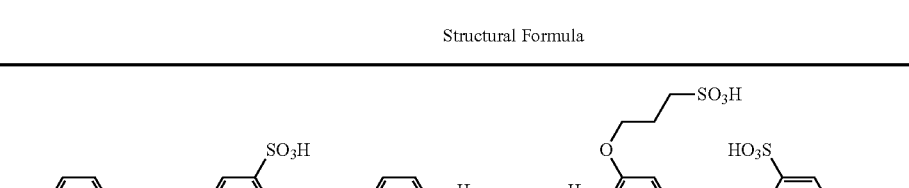 |
TABLE 15
| Compound No. | Structural Formula |
|---|---|
| 61 | |

TABLE 15-continued
| Compound No. | Structural Formula |
|---|---|
| 62 | 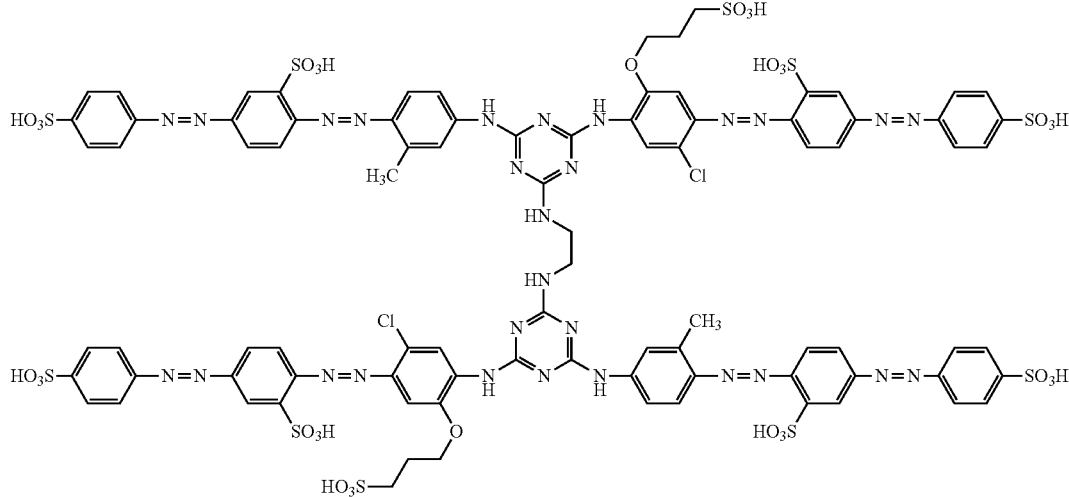 |
| 63 | 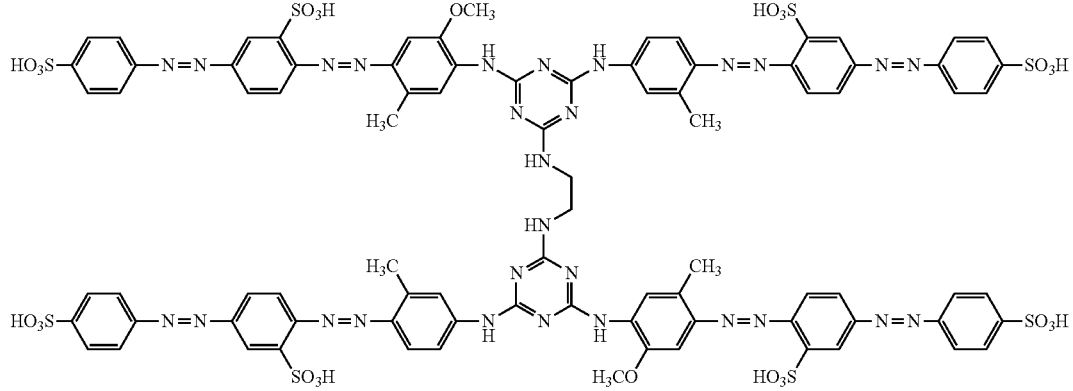 [SMILES: COc1cc(N=Nc2ccc(N=Nc3ccc(S(=O)(=O)O)cc3)cc2S(=O)(=O)O)c(C)cc1Nc1nc(NCCNc2nc(Nc3ccc(N=Nc4ccc(N=Nc5ccc(S(=O)(=O)O)cc5)cc4S(=O)(=O)O)c(C)c3)nc(Nc3cc(C)c(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |
| 64 | 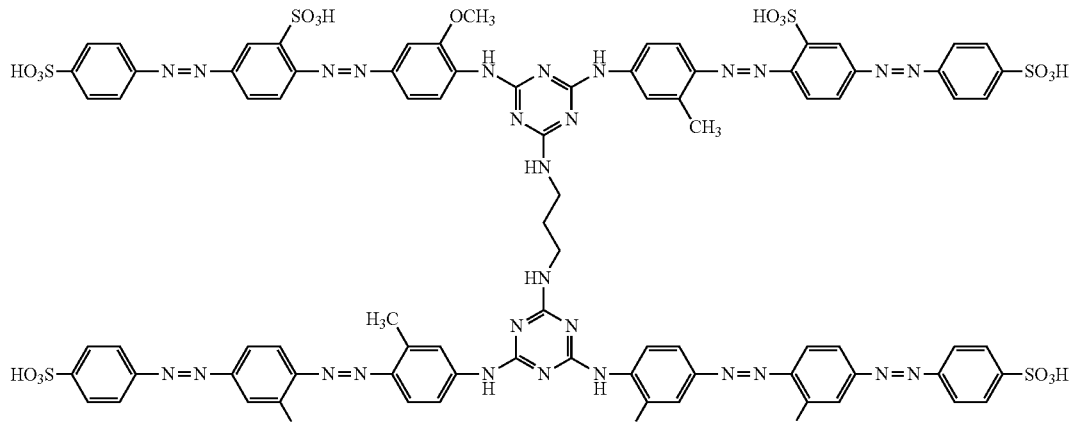 |

TABLE 16

| Compound No. | Structural Formula |
|---|---|
| 65 | |
| 66 | |
| 67 | |

TABLE 16-continued
| Compound No. | Structural Formula |
| --- | --- |
| 68 | 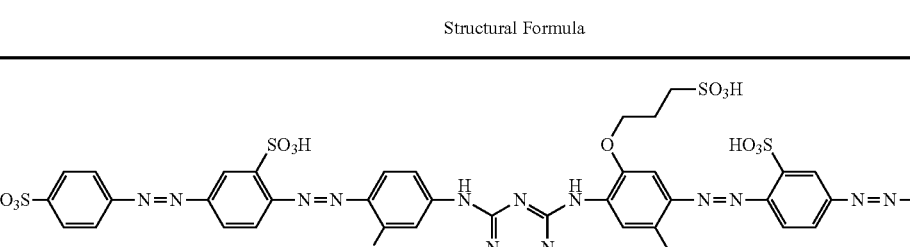 |
TABLE 17
| Compound No. | Structural Formula |
| --- | --- |
| 69 | |

TABLE 17-continued
| Compound No. | Structural Formula |
|---|---|
| 70 | 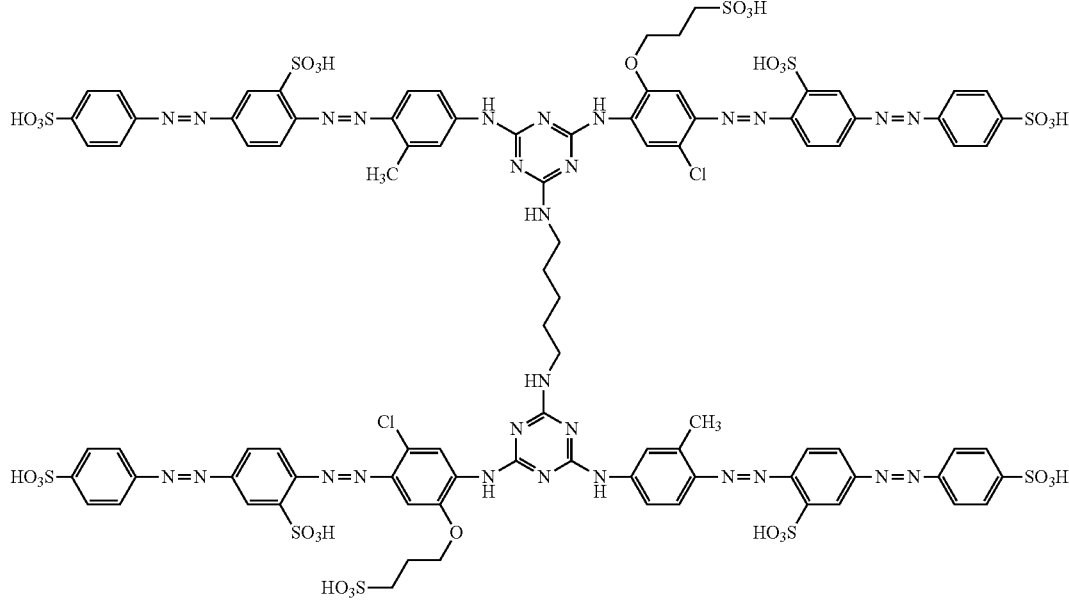 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4cc(Cl)c(N=Nc5ccc(N=Nc6ccc(S(=O)(=O)O)cc6)cc5S(=O)(=O)O)cc4OCCCS(=O)(=O)O)n3)nc(Nc3cc(Cl)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 71 | 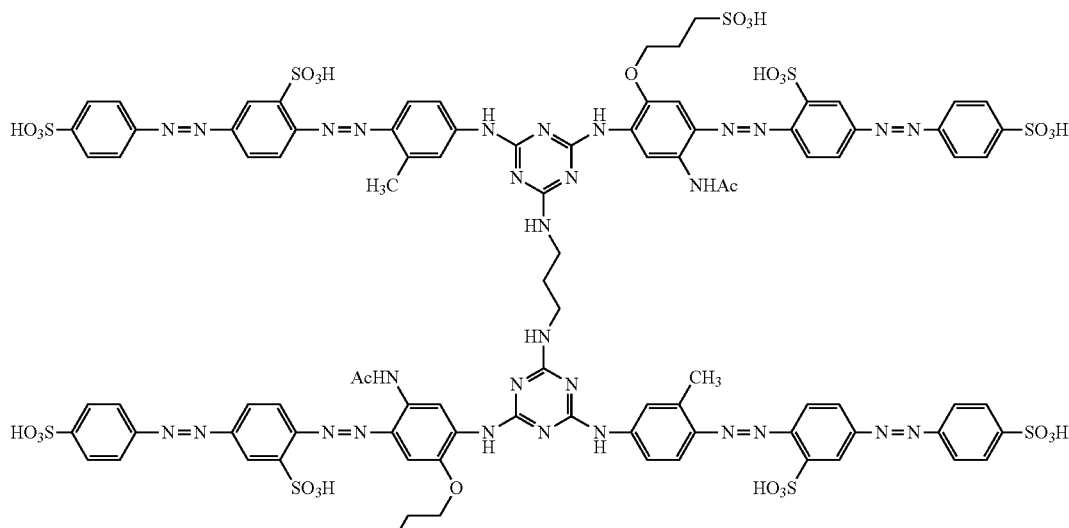 |

TABLE 18
| Compound No. | Structural Formula |
| --- | --- |
| 72 | 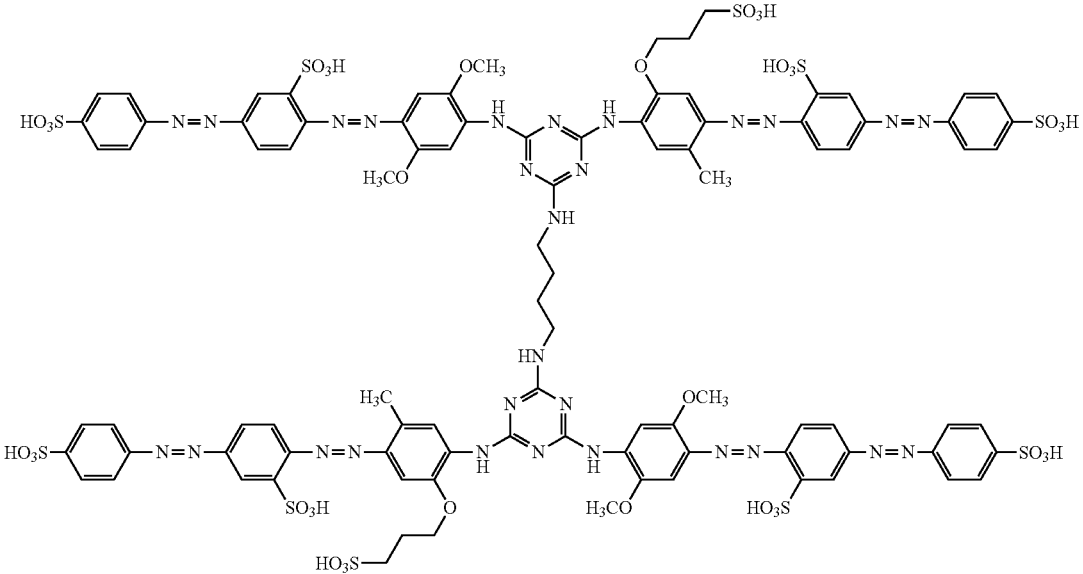 [SMILES: COc1cc(Nc2nc(NCCCCNc3nc(Nc4cc(OC)c(N=Nc5ccc(N=Nc6ccc(S(=O)(=O)O)cc6)cc5S(=O)(=O)O)cc4OC)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OC)cc1N=Nc1ccc(N=Nc2ccc(S(=O)(=O)O)cc2)cc1S(=O)(=O)O] |
| 73 | 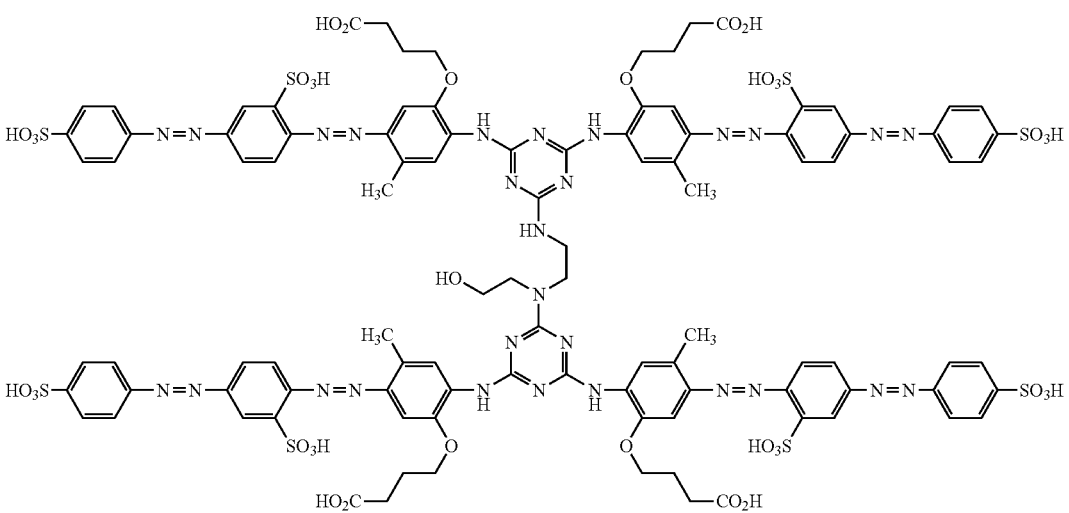 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCCC(=O)O)nc(Nc4cc(C)c(N=Nc5ccc(N=Nc6ccc(S(=O)(=O)O)cc6)cc5S(=O)(=O)O)cc4OCCCC(=O)O)n3)nc(Nc3cc(C)c(N=Nc4ccc(N=Nc5ccc(S(=O)(=O)O)cc5)cc4S(=O)(=O)O)cc3OCCCC(=O)O)n2)c(OCCCC(=O)O)cc1N=Nc1ccc(N=Nc2ccc(S(=O)(=O)O)cc2)cc1S(=O)(=O)O] |

TABLE 18-continued
| Compound No. | Structural Formula |
|---|---|
| 74 | 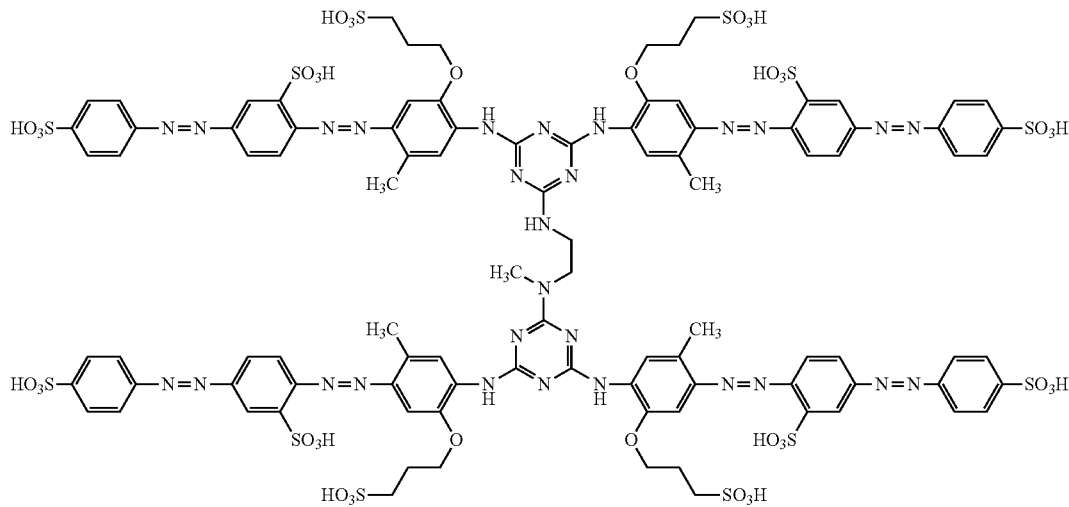 [SMILES: Cc1cc(Nc2nc(NCCN(C)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 19
| Compound No. | Structural Formula |
|---|---|
| 75 | 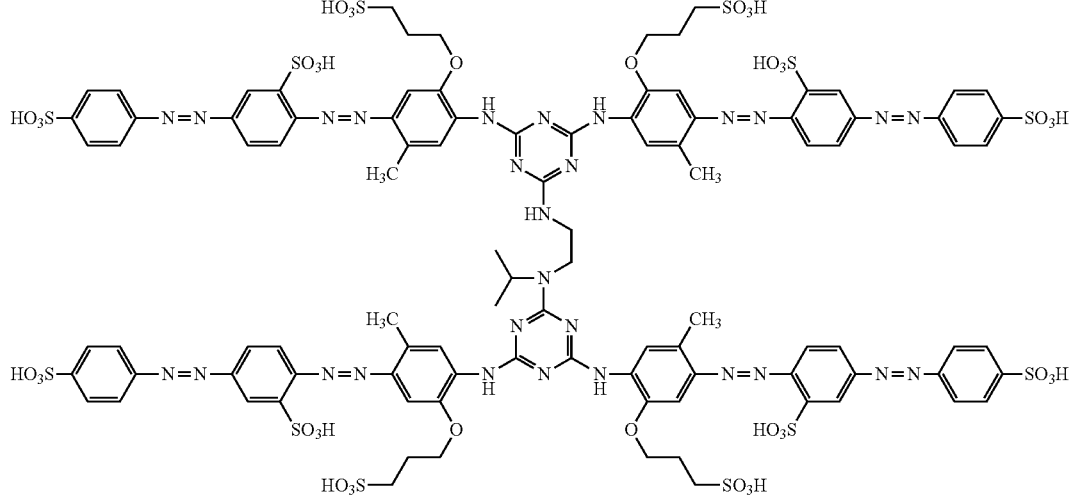 [SMILES: Cc1cc(Nc2nc(NCCN(c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)C(C)C)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 19-continued

| Compound No. | Structural Formula |
|---|---|
| 76 | |
| 77 | |

TABLE 20
| Compound No. | Structural Formula |
|---|---|
| 78 | 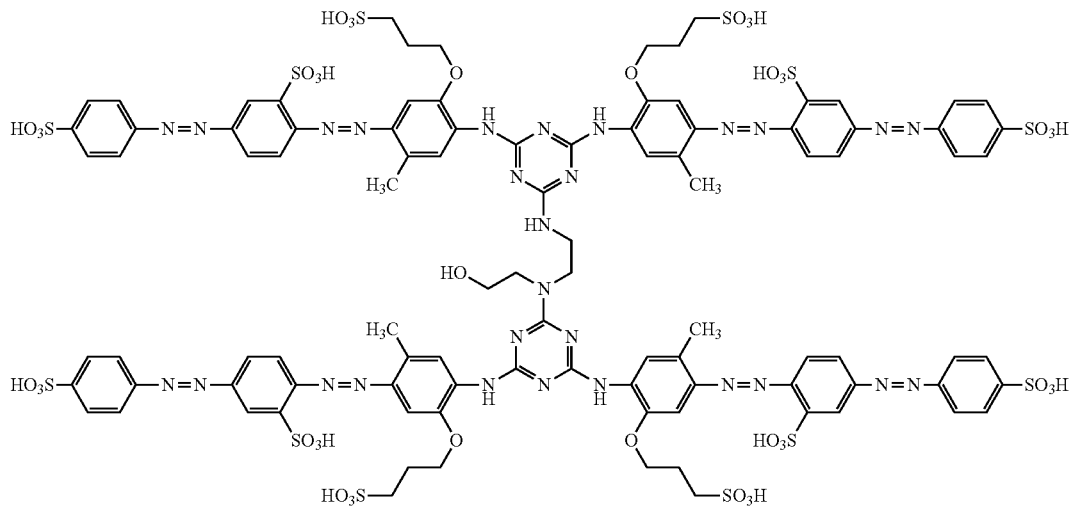 |
| 79 | 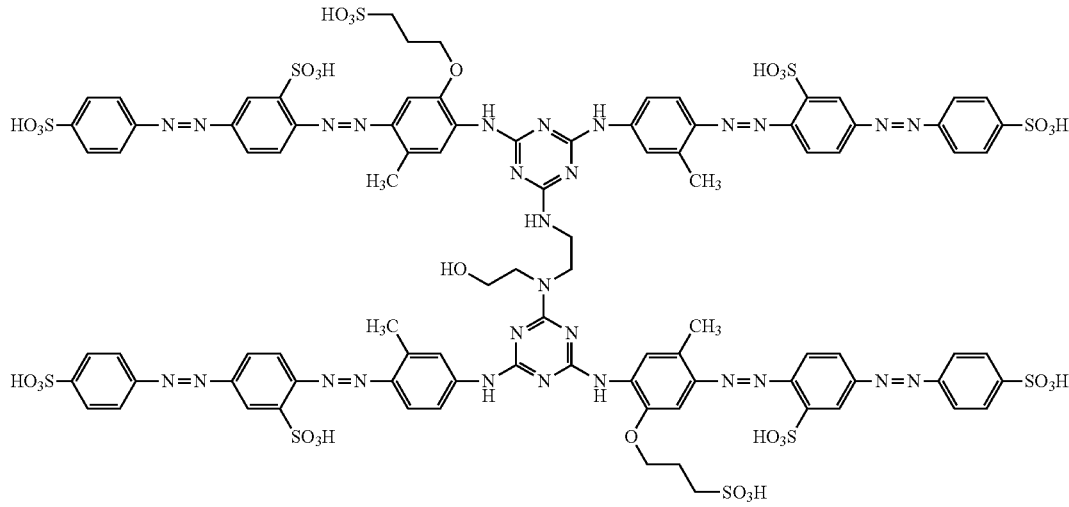 [SMILES: Cc1cc(Nc2nc(NCCN(CCO)c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 80 | 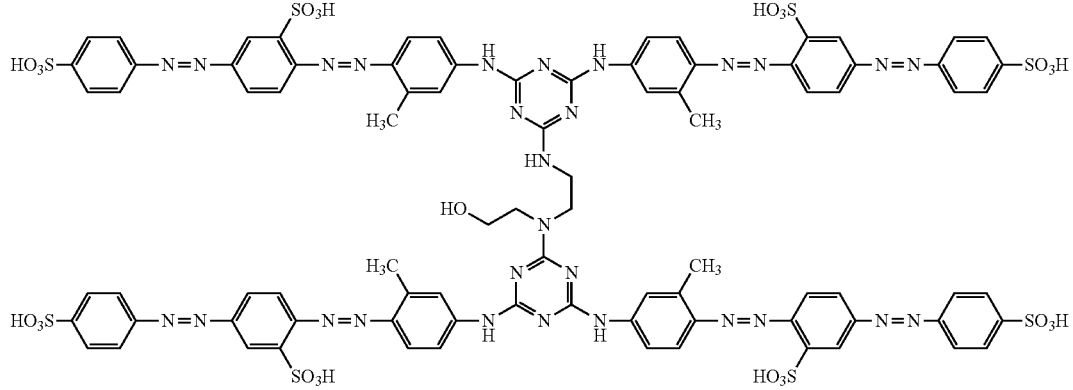 [SMILES: Cc1cc(Nc2nc(NCCN(CCO)c3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 20-continued
| Compound No. | Structural Formula |
|---|---|
| 81 | 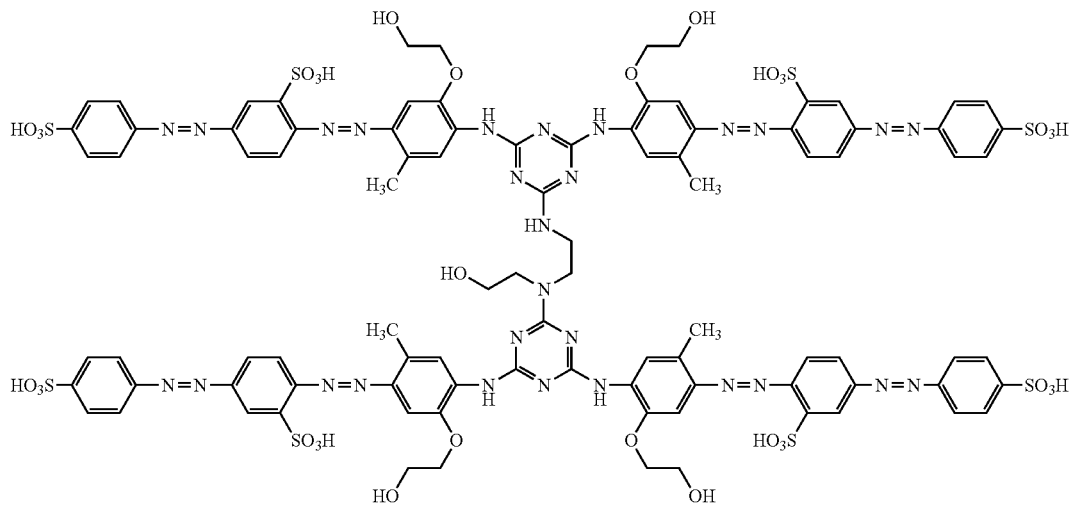 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCO)nc(Nc4cc(C)c(N=Nc5ccc(N=Nc6ccc(S(=O)(=O)O)cc6)cc5S(=O)(=O)O)cc4OCCO)n3)nc(Nc3cc(C)c(N=Nc4ccc(N=Nc5ccc(S(=O)(=O)O)cc5)cc4S(=O)(=O)O)cc3OCCO)n2)c(OCCO)cc1N=Nc1ccc(N=Nc2ccc(S(=O)(=O)O)cc2)cc1S(=O)(=O)O] |
TABLE 21
| Compound No. | Structural Formula |
|---|---|
| 82 | 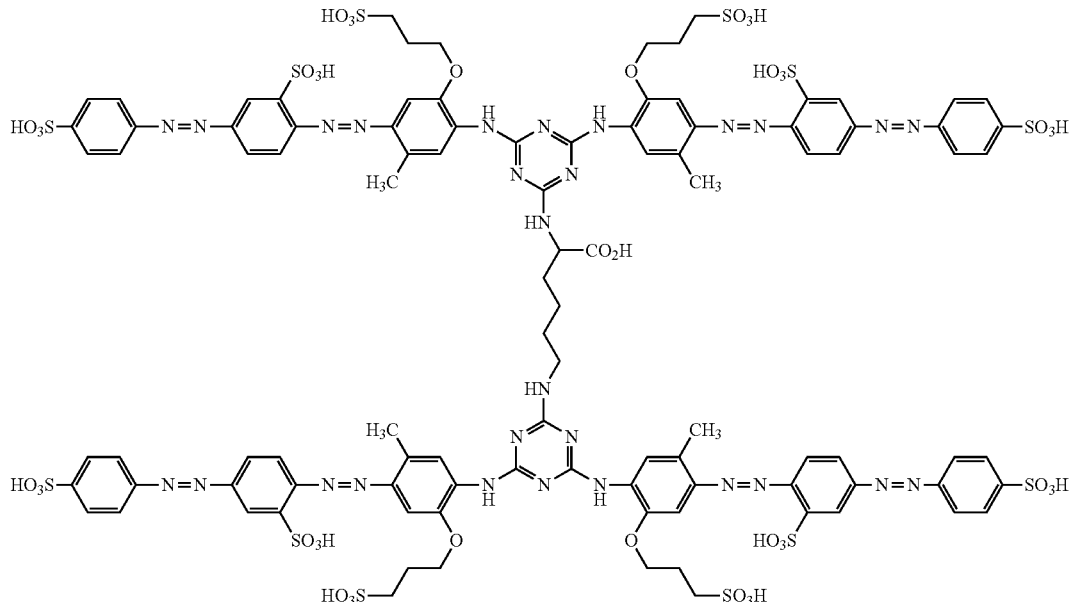 [SMILES: Cc1cc(Nc2nc(NCCCCC(Nc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 21-continued

| Compound No. | Structural Formula |
|---|---|
| 83 | |
| 84 | |

TABLE 22

| Compound No. | Structural Formula |
|---|---|
| 85 | |
| 86 | |

TABLE 22-continued
| Compound No. | Structural Formula |
|---|---|
| 87 | 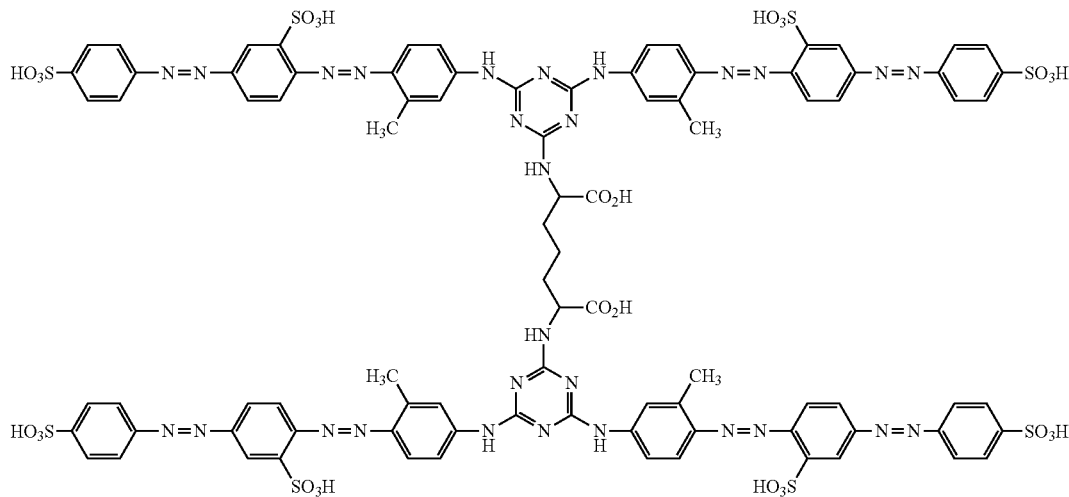 [SMILES: Cc1cc(Nc2nc(Nc3ccc(N=Nc4ccc(N=Nc5ccc(S(=O)(=O)O)cc5)cc4S(=O)(=O)O)c(C)c3)nc(NC(CCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)C(=O)O)n2)ccc1N=Nc1ccc(N=Nc2ccc(S(=O)(=O)O)cc2)cc1S(=O)(=O)O] |
TABLE 23
| Compound No. | Structural Formula |
|---|---|
| 88 | 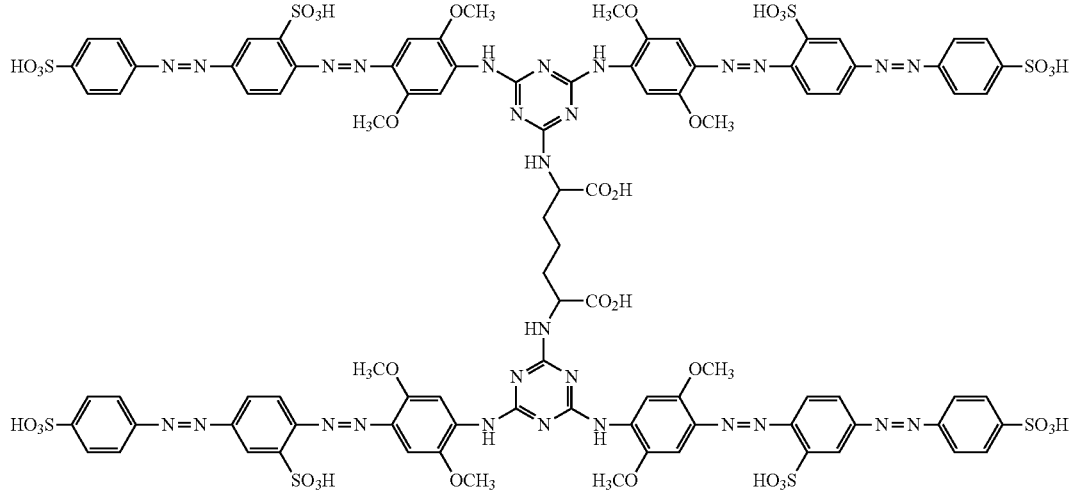 [SMILES: COc1cc(Nc2nc(Nc3cc(OC)c(N=Nc4ccc(N=Nc5ccc(S(=O)(=O)O)cc5)cc4S(=O)(=O)O)cc3OC)nc(NC(CCCC(Nc3nc(Nc4cc(OC)c(N=Nc5ccc(N=Nc6ccc(S(=O)(=O)O)cc6)cc5S(=O)(=O)O)cc4OC)nc(Nc4cc(OC)c(N=Nc5ccc(N=Nc6ccc(S(=O)(=O)O)cc6)cc5S(=O)(=O)O)cc4OC)n3)C(=O)O)C(=O)O)n2)c(OC)cc1N=Nc1ccc(N=Nc2ccc(S(=O)(=O)O)cc2)cc1S(=O)(=O)O] |

TABLE 23-continued

| Compound No. | Structural Formula |
|---|---|
| 89 | (structure) |
| 90 | (structure) |

TABLE 24
| Compound No. | Structural Formula |
|---|---|
| 91 | 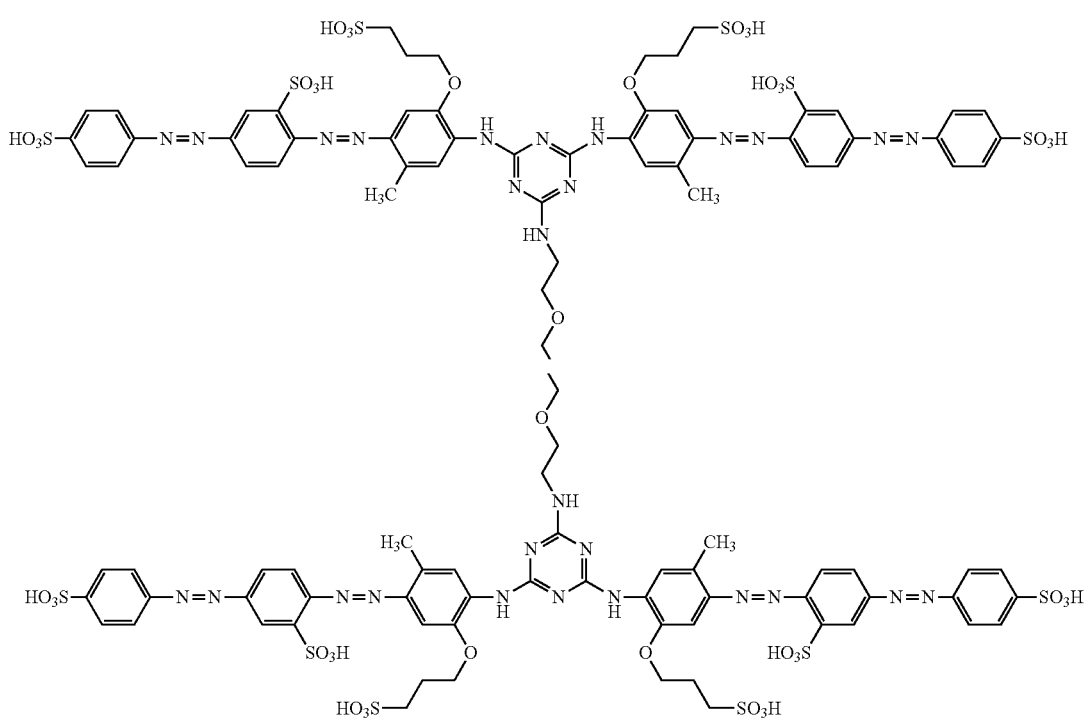 [SMILES: Cc1cc(Nc2nc(NCCOCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 92 | 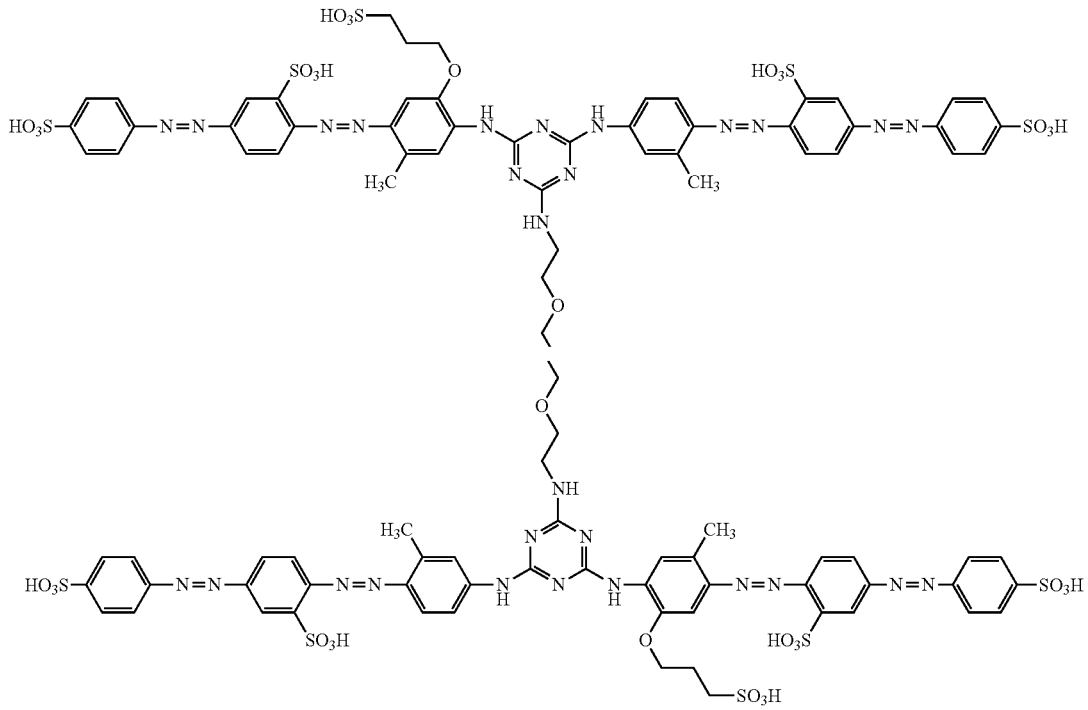 [SMILES: Cc1cc(Nc2nc(NCCOCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 24-continued

| Compound No. | Structural Formula |
|---|---|
| 93 | (structure) |

TABLE 25

| Compound No. | Structural Formula |
|---|---|
| 94 | (structure) |

TABLE 25-continued
| Compound No. | Structural Formula |
|---|---|
| 95 | 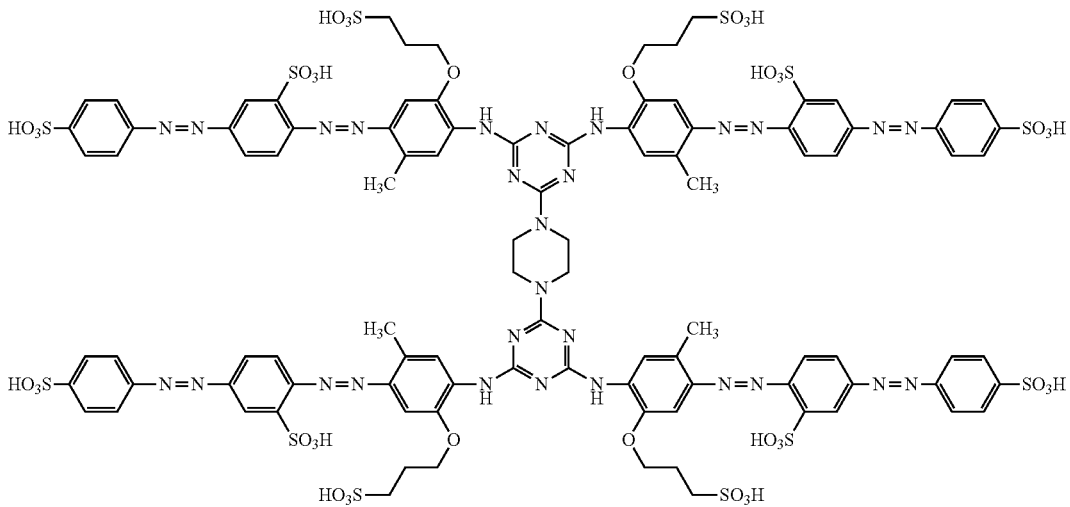 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |
| 96 | 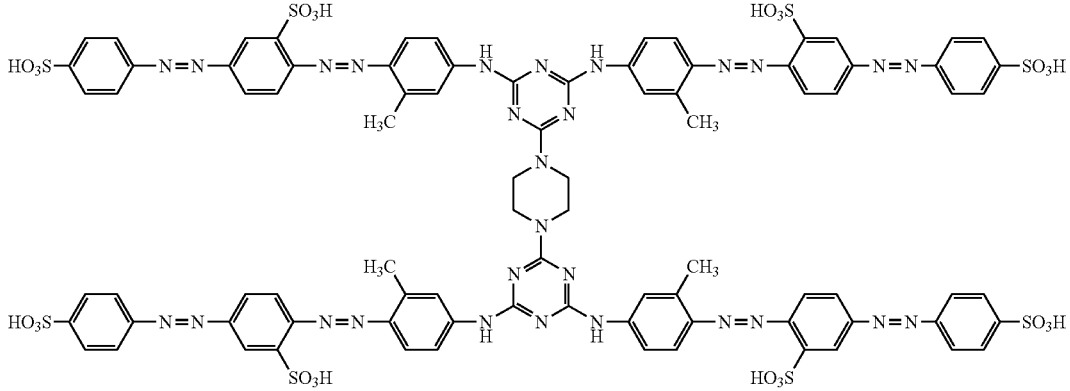 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3)n2)ccc1N=Nc1ccc(N=Nc2ccc(S(=O)(=O)O)cc2)cc1S(=O)(=O)O] |
| 97 | 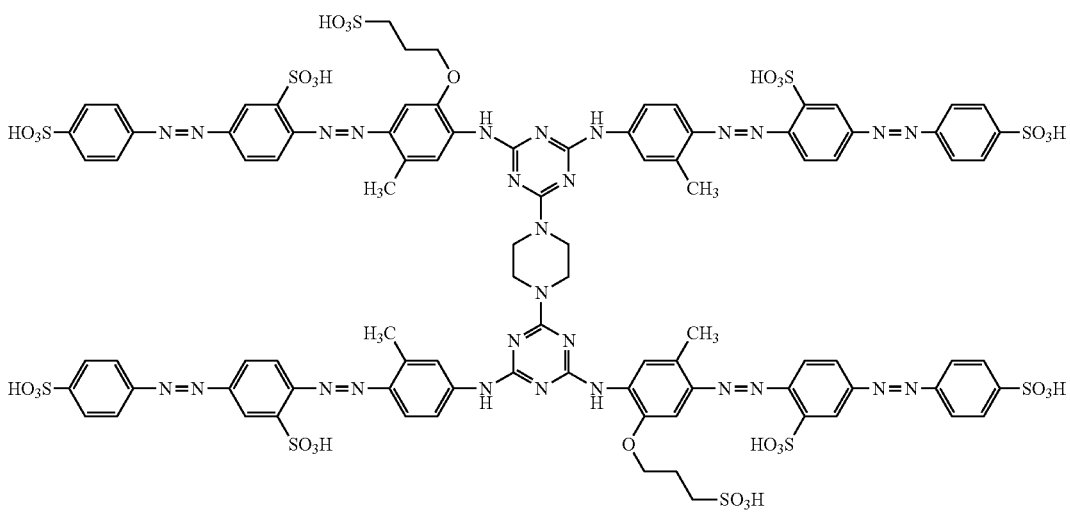 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 26

| Compound No. | Structural Formula |
|---|---|
| 98 | |
| 99 | |
| 100 | |

TABLE 26-continued
| Compound No. | Structural Formula |
|---|---|
| 101 | 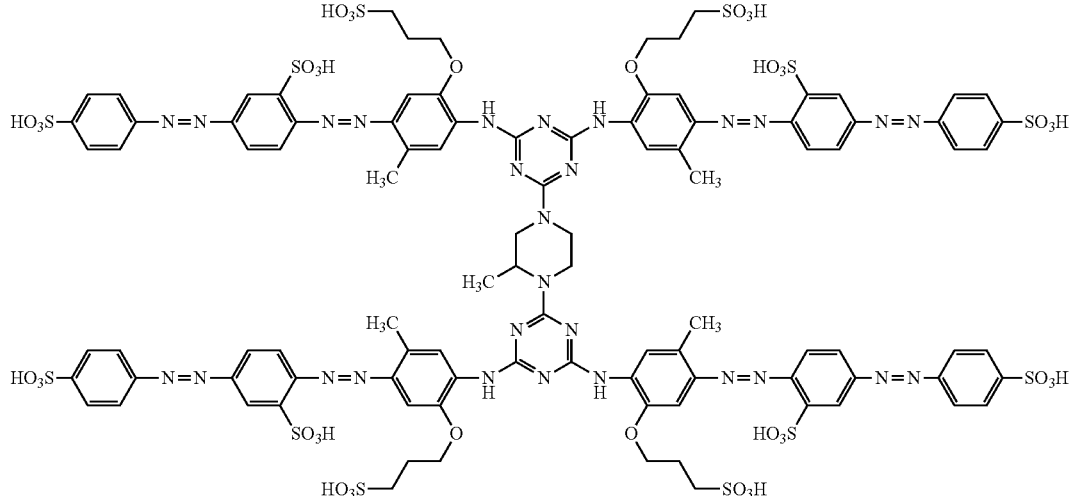 |
TABLE 27
| Compound No. | Structural Formula |
|---|---|
| 102 | 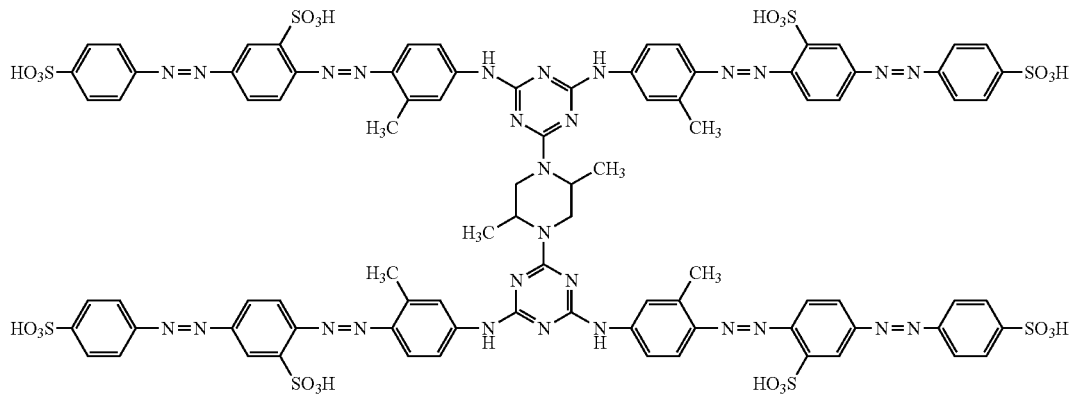 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CC(C)N(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3C)n2)ccc1N=Nc1ccc(N=Nc2ccc(S(=O)(=O)O)cc2)cc1S(=O)(=O)O] |
| 103 | 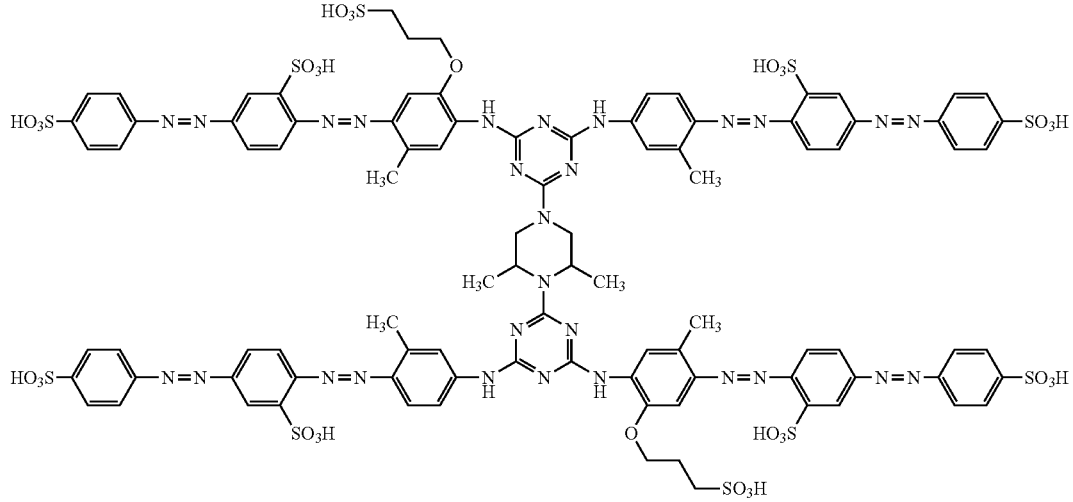 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)C(C)C3)n2)ccc1N=Nc1ccc(N=Nc2ccc(S(=O)(=O)O)cc2)cc1S(=O)(=O)O] |

TABLE 27-continued
| Compound No. | Structural Formula |
|---|---|
| 104 | 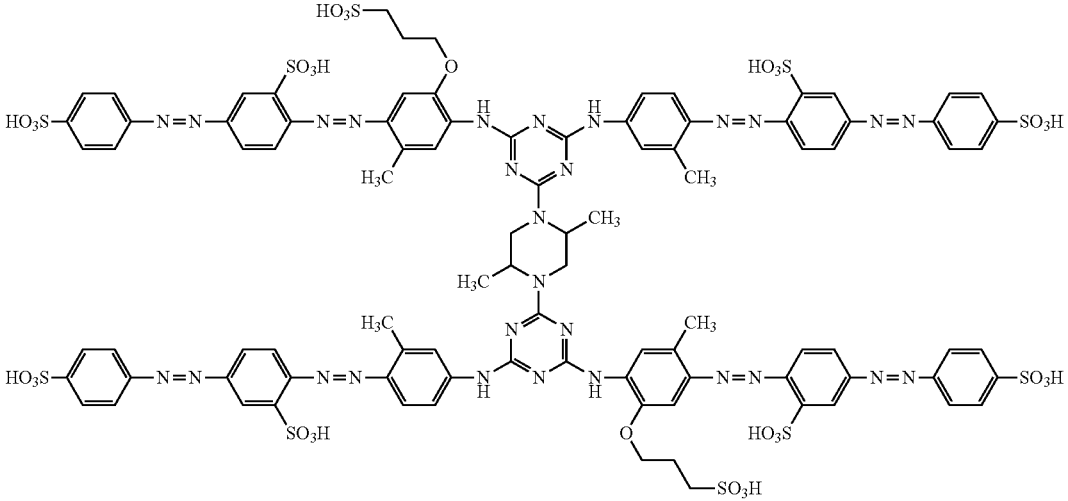 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3C)n2)ccc1N=Nc1ccc(N=Nc2ccc(S(=O)(=O)O)cc2)cc1S(=O)(=O)O] |
| 105 | 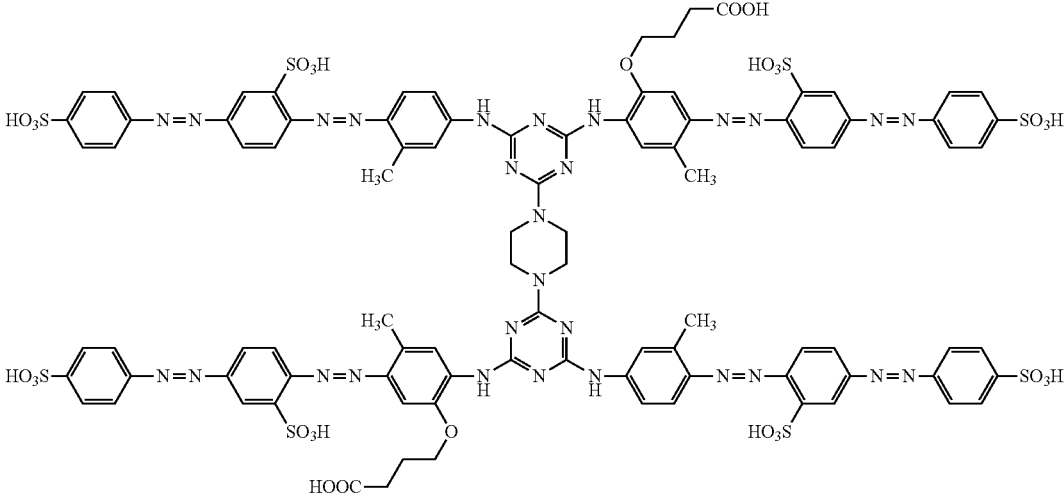 [SMILES: Cc1cc(Nc2nc(Nc3cc(C)c(N=Nc4ccc(N=Nc5ccc(S(=O)(=O)O)cc5)cc4S(=O)(=O)O)cc3OCCCC(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCC(=O)O)n4)CC3)n2)ccc1N=Nc1ccc(N=Nc2ccc(S(=O)(=O)O)cc2)cc1S(=O)(=O)O] |

TABLE 28
| Compound No. | Structural Formula |
|---|---|
| 106 | 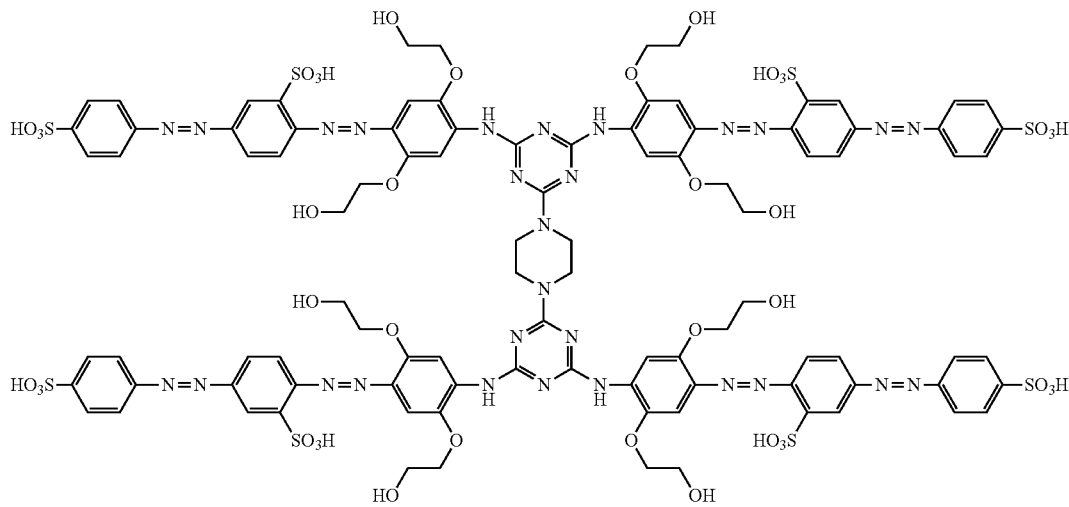 [SMILES: O=S(=O)(O)c1ccc(N=Nc2ccc(N=Nc3cc(OCCO)c(Nc4nc(Nc5cc(OCCO)c(N=Nc6ccc(N=Nc7ccc(S(=O)(=O)O)cc7)cc6S(=O)(=O)O)cc5OCCO)nc(N5CCN(c6nc(Nc7cc(OCCO)c(N=Nc8ccc(N=Nc9ccc(S(=O)(=O)O)cc9)cc8S(=O)(=O)O)cc7OCCO)nc(Nc7cc(OCCO)c(N=Nc8ccc(N=Nc9ccc(S(=O)(=O)O)cc9)cc8S(=O)(=O)O)cc7OCCO)n6)CC5)n4)cc3OCCO)c(S(=O)(=O)O)c2)cc1] |
| 107 | 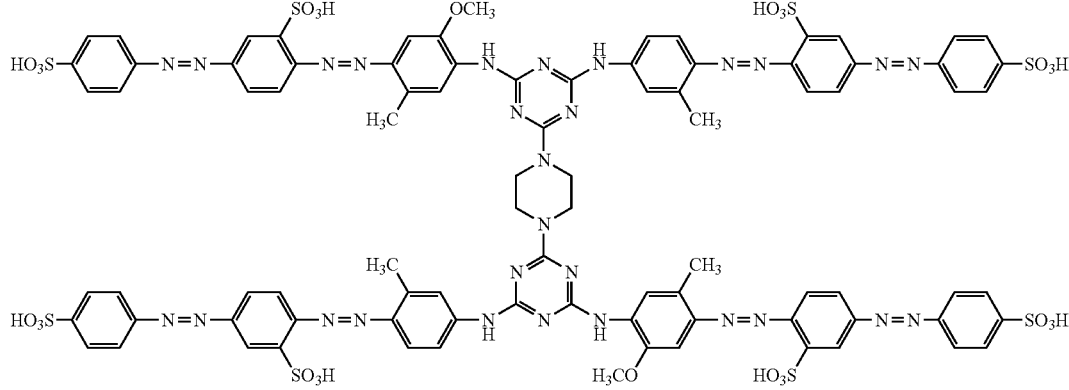 [SMILES: COc1cc(N=Nc2ccc(N=Nc3ccc(S(=O)(=O)O)cc3)cc2S(=O)(=O)O)c(C)cc1Nc1nc(Nc2ccc(N=Nc3ccc(N=Nc4ccc(S(=O)(=O)O)cc4)cc3S(=O)(=O)O)c(C)c2)nc(N2CCN(c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)CC2)n1] |
| 108 | 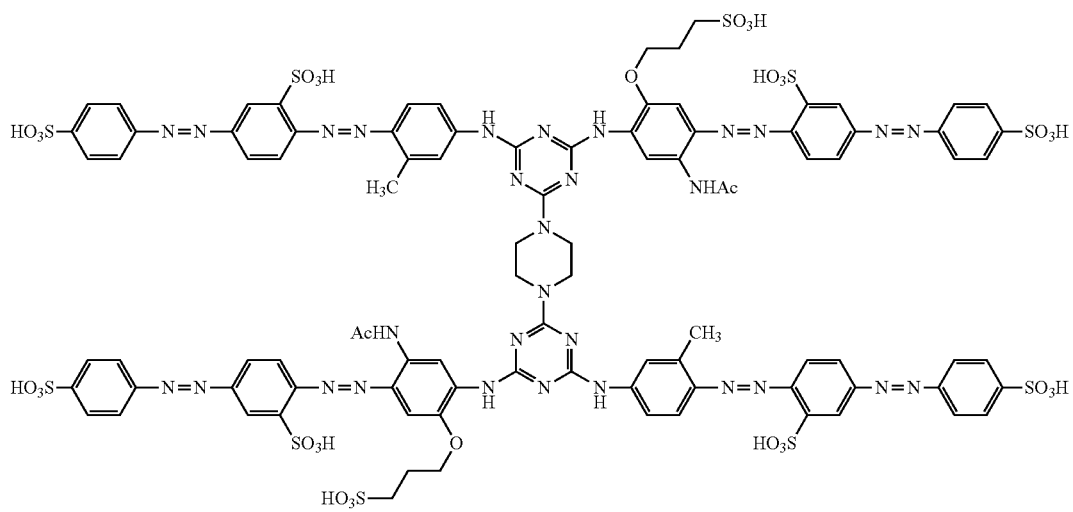 [SMILES: CC(=O)Nc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |

TABLE 28-continued
| Compound No. | Structural Formula |
|---|---|
| 109 | 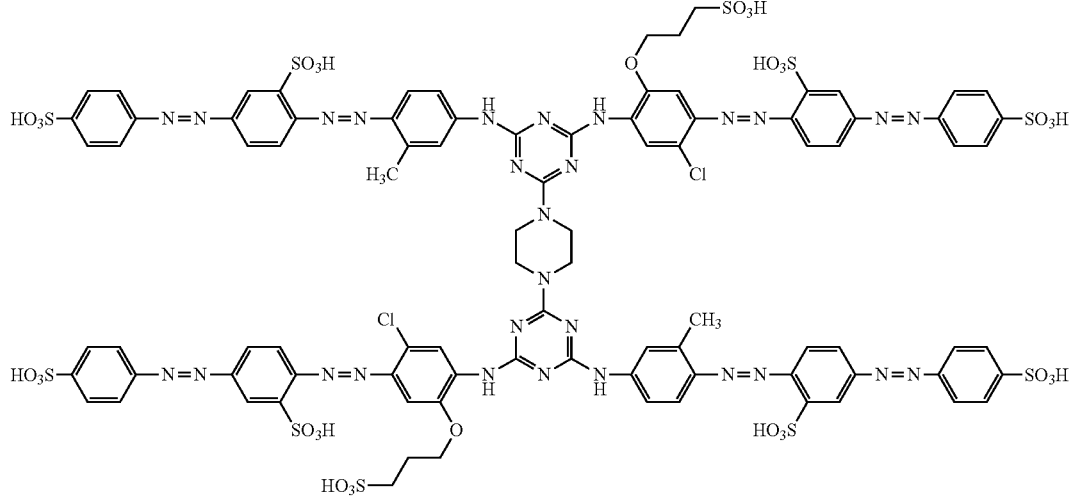 [SMILES: Cc1cc(Nc2nc(Nc3cc(Cl)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(Cl)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
TABLE 29
| Compound No. | Structural Formula |
|---|---|
| 110 | 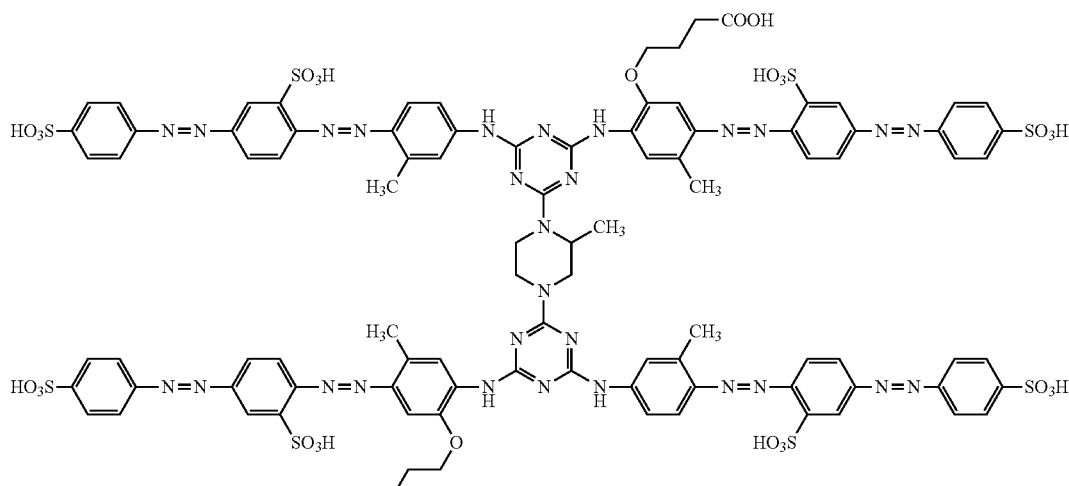 |

TABLE 29-continued
| Compound No. | Structural Formula |
|---|---|
| 111 | 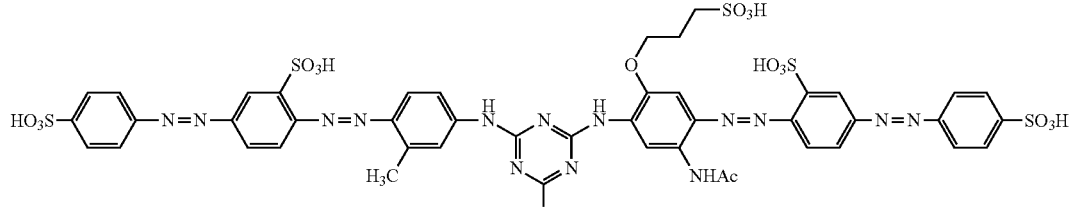 |
| 112 | 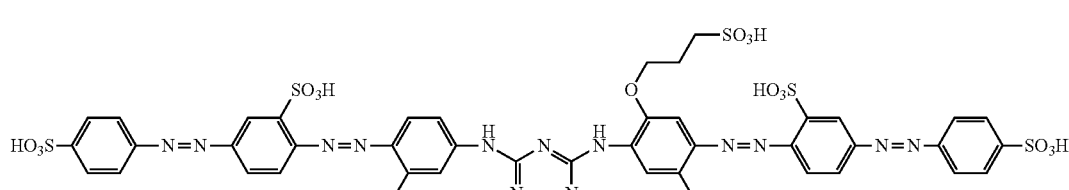 |
| 113 | 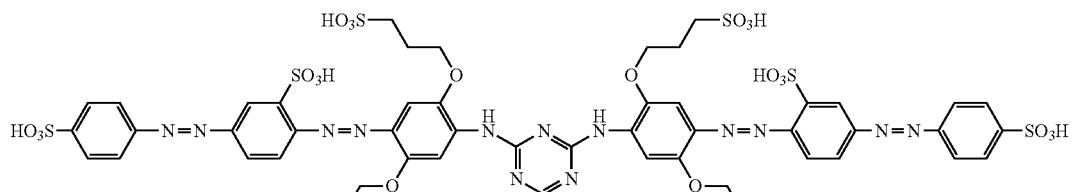 | b. Method for Synthesis of Second Dye

Azo compounds represented by the general formulae (21) to (23) can be synthesized by, for example, the following method. Further, the structural formula of the compound in each process is represented in the form of a free acid, and $R^{21}$ to $R^{28}$ and X, that are appropriately used in the following general formulae (24) to (30) each have the same meanings as in the general formula (21).

First, a compound represented by the following general formula (26) is obtained by diazotizing a compound represented by the following general formula (24) by an ordinary method, and subjecting the product and a compound represented by the general formula (25) to a coupling reaction by an ordinary method.

Further, examples of the other method for synthesizing the compound represented by the general formula (26) include the following methods. Specifically, a compound represented by the following general formula (27) is obtained by diazotizing the resulting compound represented by the general formula (24) by an ordinary method, and then subjecting the product and a methyl-ω-sulfonic acid derivative of aniline to a coupling reaction by an ordinary method, followed by hydrolysis under the alkaline condition. The compound represented by the general formula (26) can be obtained by treating the resulting compound represented by the general formula (27) with fumed sulfuric acid or the like to sulfonate. In addition, the compound represented by the general formula (26) includes a commercially available product (for example, C. I. Acid Yellow 9).

Next, a compound represented by the following general formula (29) is obtained by diazotizing the resulting compound represented by the general formula (26) by an ordinary method, and then subjecting the product and a compound represented by the following general formula (28) to a coupling reaction by an ordinary method.

On the other hand, a compound represented by the following general formula (31) is obtained by diazotizing the resulting compound represented by the general formula (26) by an ordinary method, and then subjecting the product and a compound represented by the following general formula (30) to a coupling reaction by an ordinary method. Similarly, a compound represented by the following general formula (33) is obtained by diazotizing the resulting compound represented by the general formula (26) by an ordinary method, and then subjecting the product and a compound represented by the following general formula (32) to a coupling reaction by an ordinary method. Similarly, a compound represented by the following general formula (35) is obtained by diazotizing the resulting compound represented by the general formula (26) by an ordinary method, and then subjecting the product and a compound represented by the following general formula (34) to a coupling reaction by an ordinary method.

Next, a compound represented by the following general formula (36) is obtained by subjecting the resulting compound represented by the general formula (29) and a cyanuric halide (for example, cyanuric chloride) to a condensation reaction by an ordinary method.

Then, a compound represented by the following general formula (37) is obtained by subjecting the resulting compound represented by the general formula (36) and the compound represented by the general formula (31) to a condensation reaction by an ordinary method. Similarly, a compound represented by the following general formula (38) is obtained by subjecting the resulting compound represented by the general formula (33) and cyanuric halide (for example, cyanuric chloride) to a condensation reaction by an ordinary method.

Next, a compound represented by the following general formula (39) is obtained by subjecting the resulting compound represented by the general formula (38) and the compound represented by the general formula (35) to a condensation reaction by an ordinary method.

Then, the second dye represented by the general formula (21) can be obtained by subjecting the resulting compound represented by the general formula (37), the compound represented by the general formula (39), and a compound corresponding to a crosslinking group X represented by the following general formula (40) to a condensation reaction by an ordinary method.

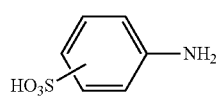

(24)

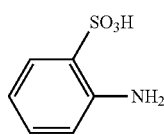

(25)

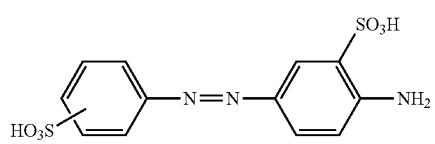

(26)

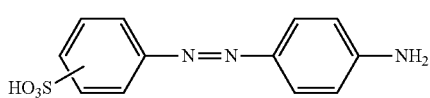

(27)

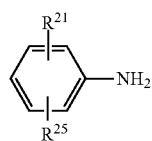

(28)

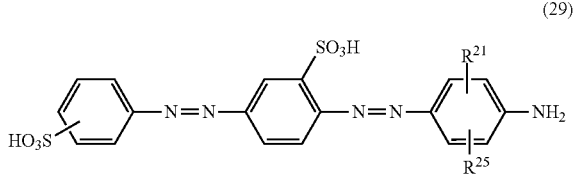

(29)

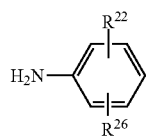

(30)

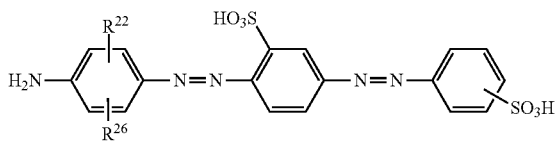

(31)

-continued

(32)
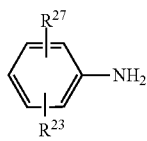

(33)
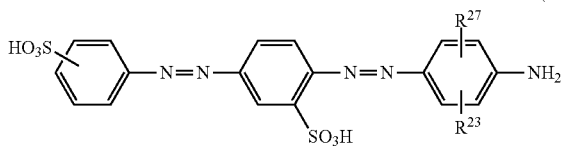

(34)
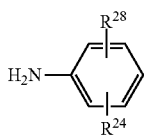

(35)
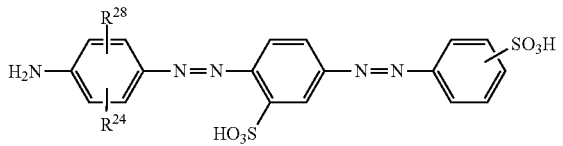

(36)
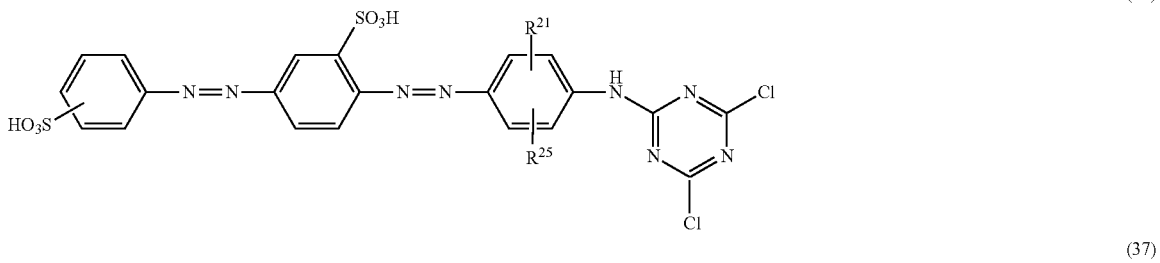

(37)
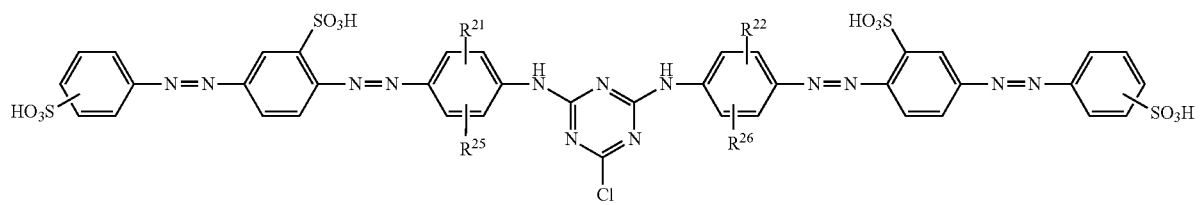

(38)
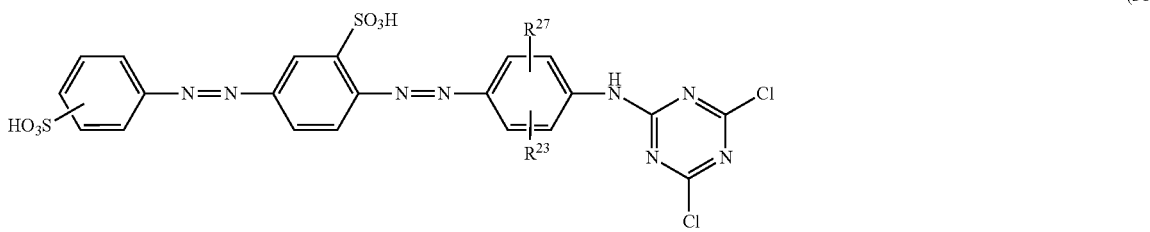

(39)
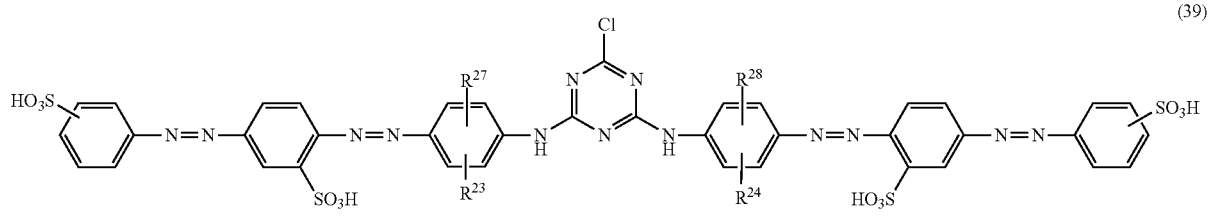

(40)
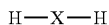

Diazotization of the compound represented by the general formula (24) is also carried out according to a well-known method. For example, diazotization is carried out in an inorganic acid medium at a temperature of, for example, −5 to 30° C., and preferably 0 to 20° C. using a nitrite salt (for example, an alkali metal salt of nitrous acid such as sodium nitrite and the like). Further, a coupling reaction of the diazotized product of the compound represented by the general formula (24) with the compound represented by the general formula (25) is also carried out under a well-known reaction condition. For example, the coupling reaction is preferably carried out in water or an aqueous organic medium, at a temperature of, for example, 0 to 30° C. (preferably 5 to 25° C.), and at a pH value of from acidic to weakly acidic (for example, pH 1 to pH 6).

Since the diazotization reaction liquid is acidic and the reaction system is further acidified as the coupling reaction proceeds, adjustment to the pH value is preferably conducted by the addition of a base. As the base, for example, an alkali metal hydroxide such as lithium hydroxide or sodium hydroxide, an alkali metal carbonate such as lithium carbonate, sodium carbonate, potassium carbonate, and the like; an acetic acid salt such as sodium acetate and the like; ammonia or an organic amine; or the like may be used. The compound represented by the general formula (24) and the compound represented by the formula (25) are used in approximately stoichiometric amounts.

Diazotization of the compound represented by the general formula (26) is also carried out according to a well-known method. For example, diazotization is carried out in an inorganic acid medium at a temperature of, for example, −5 to 30° C., and preferably 0 to 25° C. using a nitrite salt (for example, an alkali metal salt of nitrous acid such as sodium nitrite and the like). Further, a coupling reaction of the diazotized product of the compound represented by the general formula (26) with the compound represented by the general formula (28), the general formula (30), the general formula (32), or the general formula (34) is also carried out under a well-known reaction condition. For example, the coupling reaction is preferably carried out in water or an aqueous organic medium, at a temperature of, for example, 0 to 30° C., and preferably 5 to 25° C., and at a pH value of from acidic to weakly acidic (for example, pH 1 to pH 6). Since the diazotization reaction liquid is acidic and the reaction system is further acidified as the coupling reaction proceeds, adjustment to the pH value is preferably conducted by the addition of a base. As the base, the same as described above may be used. The compound represented by the general formula (26), or the compound represented by the general formula (28), the general formula (30), the general formula (32), or the general formula (34) is used in approximately stoichiometric amounts.

The condensation reaction of the compound represented by the general formula (29) or the general formula (33) with cyanuric halide (for example, cyanuric chloride) is carried out by a well-known method. For example, the reaction is preferably carried out in water or an aqueous organic medium, at a temperature of, for example, 0° C. to 30° C., and preferably 5° C. to 25° C., and at a pH value of from weakly acidic to neutral (for example, pH 3 to pH 8). Since the reaction system is acidified as the reaction proceeds, adjustment to the pH value is preferably conducted by the addition of a base. As the base, the same as described above may be used. The compound represented by the general formula (29) or the general formula (33) and cyanuric halide can be used in approximately stoichiometric amounts.

The condensation reaction of the compound represented by the general formula (31) with the compound represented by the general formula (36), or the condensation reaction of the compound represented by the general formula (35) with the compound represented by the general formula (38) is carried out by a well-known method. For example, the reaction is preferably carried out in water or an aqueous organic medium, at a temperature of, for example, 10° C. to 80° C., and preferably 25° C. to 70° C., and at a pH value of from weakly acidic to weakly alkaline (for example, pH 5 to pH 9). Adjustment to the pH value is preferably conducted by the addition of a base. As the base, the same as described above may be used. The compound represented by the general formula (31) and the compound represented by the general formula (36), or the compound represented by the general formula (35) and the compound represented by the general formula (38) can be used in approximately stoichiometric amounts.

The condensation reaction of the compound represented by the general formula (37), the compound represented by the general formula (39), and the compound represented by the general formula (40) is carried out by a well-known method. Specifically, the reaction is preferably carried out in water or an aqueous organic medium, at a temperature of, for example, 50° C. to 100° C., and preferably 60° C. to 95° C., and at a pH value of from neutral to weakly alkaline (for example, pH 7 to pH 10). Adjustment to the pH value is preferably conducted by the addition of a base. As the base, the same as described above may be used. 0.4 equivalents to 0.6 equivalents, and preferably 0.5 equivalents of the compound represented by the general formula (40) is used, with respect to 1 equivalent of the compound represented by the general formula (37) and 1 equivalent of the compound represented by the general formula (39).

In order to obtain a desired salt of the compound of the general formula (21), the same method as the method for yielding a desired salt of the compound of the general formula (1) may be carried out after completion of the final process in the synthesis reaction for the compound represented by the general formula (21).

For the ink composition of the present embodiment, among the compounds shown in Tables 8 to 29 above, a compound of the following formula (41), represented by Compound No. 95, or a salt thereof can be preferably used.

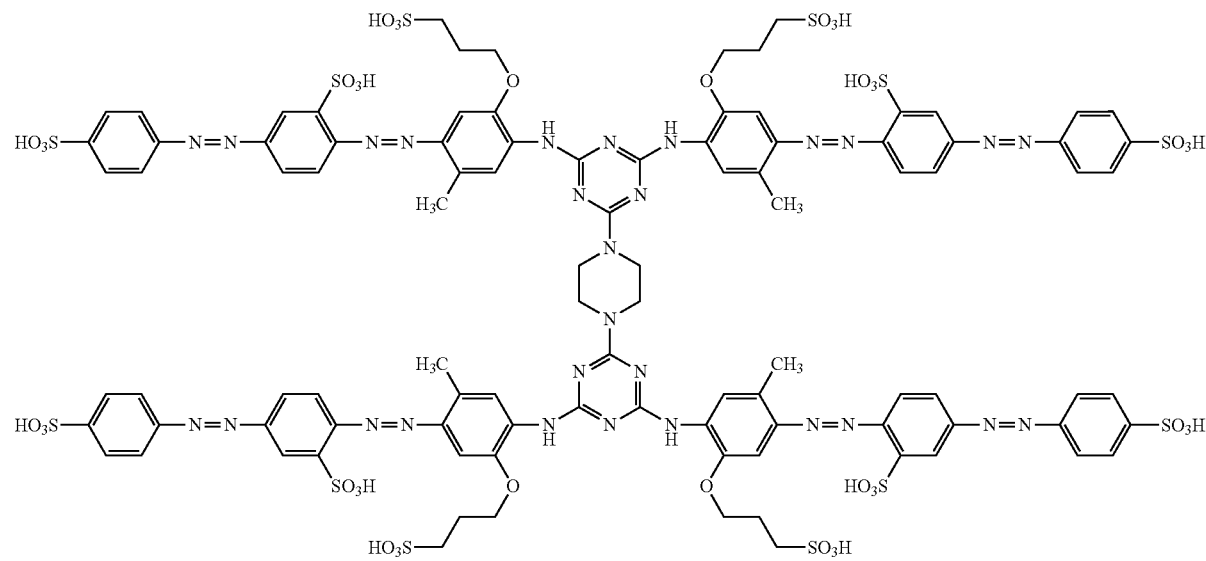

(41)

1.3. Other Coloring Materials

The ink composition according to the present embodiment may include other coloring materials, in addition to the first dye and the second dye. The coloring materials other than the first dye and the second dye are not particularly limited, but examples thereof include a compound represented by the following general formula (51) (which is also referred to as a "third dye").

By the third dye, the color of the ink composition can be more easily adjusted. Specifically, if the ink composition according to the present embodiment includes the third dye, the color of the formed image can be more easily made close to achromatic color by the synergic action of the first dye, the second dye, and the third dye included in the ink composition.

In the case where the ink composition according to the present embodiment include's the third dye, the ratio (MC/MA) of the content of the first dye [MA (% by mass)] and the content of the third dye [MC (% by mass)] is preferably equal to or more than 0.5 and equal to or less than 1.5, and more preferably equal to or more than 0.7 and equal to or less than 1.3. If the ratio of contents of the first dye and the third dye is in the above-described range, an image expressing good black color (close to achromatic color) can be more easily obtained, the color developing density of the recorded image can be improved, or the light resistance can be improved.

(51)

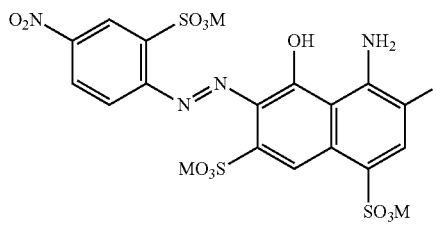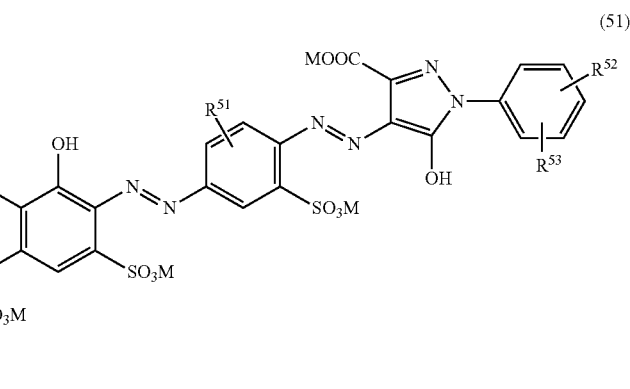

In the general formula (51), $R^{51}$ represents a halogen atom; a hydrogen atom; $SO_3M$; or COOM. Further, $R^{52}$ and $R^{53}$ each independently represent a hydrogen atom; $SO_3M$; or COOM. Further, M's each independently represent at least one of Li and Na, provided that there is no case where all of $R^{52}$ and $R^{53}$ in the general formula (51) are hydrogen atom.

Examples of the compound represented by the general formula (51) include a compound represented by the following general formula (52), a compound represented by the following general formula (53), and a compound represented by the following general formula (54). Further, the compounds represented by the general formulae (52) to (54) may be used singly or in a mixture of two or more kinds thereof, but it is preferable that the compound represented by the general formula (52) be used singly.

(52)

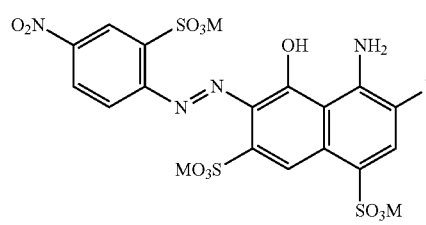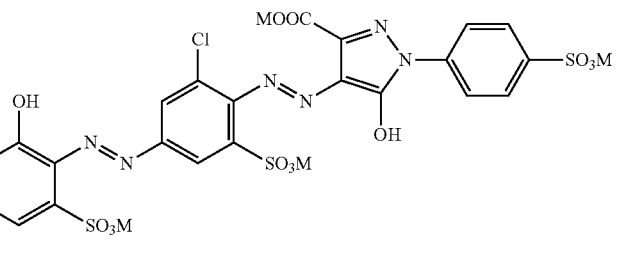

In the general formula (52), M's each independently represent at least one of Li and Na.

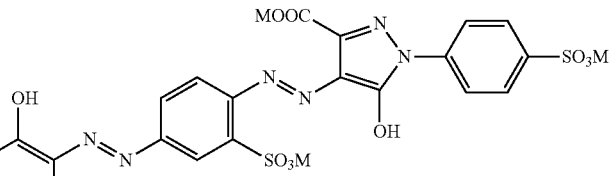

(53)

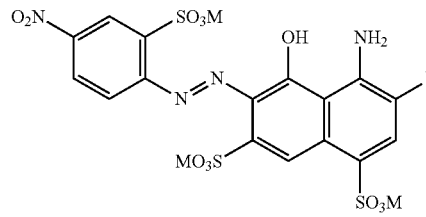

In the general formula (53), M's each independently represent at least one of Li and Na.

(54)

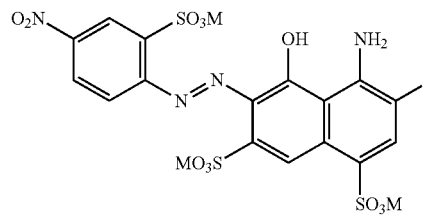

In the general formula (54), M's each independently represent at least one of Li and Na.

1.4. Water

The ink composition according to the present embodiment includes water. The water serves as a main solvent for dispersing or dissolving the coloring materials as described above in the ink composition.

The water is preferably water from which ionic impurities are removed as much as possible, such as pure water, for example, ion-exchanged water, ultrafiltration water, reverse osmosis water, distilled water, and the like, or ultrapure water. Further, use of water that has been sterilized by ultraviolet irradiation, addition of hydrogen peroxide, or the like can prevent occurrence of molds or bacteria, and is therefore preferred when a pigment dispersion and an aqueous ink composition containing the same are stored for a long time.

The amount of the water included in the ink composition according to the present embodiment is preferably equal to or more than 50% by mass with respect to the total mass of the ink composition.

1.5. Other Components

The ink composition according to the present embodiment can include a surfactant. Examples of the surfactant include non-ionic surfactants, cationic surfactants, anionic surfactants, amphoteric surfactants, and the like. The surfactant may be used singly or in combination of two or more kinds thereof.

Among these, the non-ionic surfactant can improve the permeation property and fixing property of the ink composition onto a recording medium, and simultaneously, provide more circular liquid droplets of the ink composition adhered to the recording medium according to the ink jet recording method, and therefore, the non-ionic surfactant can be preferably used.

Furthermore, among the non-ionic surfactants, an acetylene glycol-based surfactant has an excellent ability to maintain the surface tension and interfacial tension appropriately, and at the same time, has substantially no foaming property, and therefore, it can be more preferably used. Examples of the acetylene glycol-based surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol, and the like. Further, as the acetylene glycol-based surfactant, commercially available products can be used, and examples thereof include Surfinol 104, 104 E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (trade names, all manufactured by Air Products and Chemicals., Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names, all manufactured by Nisshin Chemical Industry Co., Ltd.), Acetylenol E00, E00P, E40, and E100 (trade names, all manufactured by Kawaken Fine Chemicals Co., Ltd.), and the like.

In the case where the surfactant is included, the content thereof is preferably equal to or more than 0.1% by mass and equal to or less than 5% by mass, with respect to the total mass of the ink composition.

The ink composition according to the present embodiment may include a permeation accelerator. The permeation accelerator has an action that further improves a wetting property of the ink composition on the recording medium, thus leading to uniform coating. By this, the uneven density and bleeding of the ink of the formed image can be further reduced, and thus, the color developing density of the image can be improved. The permeation accelerator can be used singly or in a mixture of two or more kinds thereof.

Examples of the permeation accelerator include glycol ethers. The glycol ethers particularly have an excellent effect as a permeation accelerator. Examples of the glycol ethers include ethylene glycol monobutyl ether, diethylene glycol monobutyl ether, triethylene glycol monoethyl ether, triethylene glycol monobutyl ether, propylene glycol monomethyl ether, dipropylene glycol monoethyl ether, propylene glycol monobutyl ether, dipropylene glycol monobutyl ether, and the like. Among these, from the viewpoint of excellent compatibility with the components included in the ink composition according to the present embodiment, triethylene glycol monobutyl ether can be preferably used.

In the case where the permeation accelerator is included, the content thereof is preferably equal to or more than 5% by mass and equal to or less than 15% by mass, with respect to the total mass of the ink composition.

The ink composition according to the present embodiment may include a moisturizer. Examples of the moisturizer include 1,2-alkanediols, polyhydric alcohols, pyrrolidone derivatives, ureas, and the like. The moisturizer may be used singly or in a mixture of two or more kinds thereof.

The 1,2-alkanediols increase the wetting property of the ink composition on the recording medium, and thus, have an excellent action of uniformly wetting, and thus, can form an excellent image on the recording medium. Examples of the 1,2-alkanediols include 1,2-propanediol, 1,2-butanediol, 1,2-pentanediol, 1,2-hexanediol, 1,2-octanediol, and the like. In the case where the 1,2-alkanediols are included, the content thereof is preferably equal to or more than 1% by mass and equal to or less than 20% by mass, with respect to the total mass of the ink composition.

From the viewpoint that the polyhydric alcohols inhibit the ink from being dried and solidified on the surface of nozzles of a head when the ink composition is used in an ink jet recording device, and thus, can decrease clogging, ejection failure, or the like, the polyhydric alcohols can be preferably used. Examples of the polyhydric alcohols include ethylene glycol, diethylene glycol, triethylene glycol, propylene glycol, dipropylene glycol, 1,3-propanediol, 1,4-butanediol, 1,6-hexanediol, glycerin, and the like. In the case where the polyhydric alcohols are included, the content thereof is preferably equal to or more than 1% by mass and equal to or less than 20% by mass, with respect to the total mass of the ink composition.

From the viewpoint that the pyrrolidone derivative inhibits the ink from being dried and solidified on the surface of nozzles of a head, and thus, can decrease clogging, ejection failure, or the like, the pyrrolidone derivative can be preferably used. Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. In the case where the pyrrolidone derivatives are included, the content thereof is preferably equal to or more than 1% by mass and equal to or less than 20% by mass, with respect to the total mass of the ink composition.

From the viewpoint that the ureas inhibit the ink from being dried and solidified on the surface of nozzles of a head, and thus, can decrease clogging, ejection failure, or the like, the ureas can be preferably used. Examples of the ureas include urea, thiourea, ethylene urea, 1,3-dimethylimidazolidinones, and the like. In the case where the ureas are included, the content thereof is preferably equal to or more than 1% by mass and equal to or less than. 20% by mass, with respect to the total mass of the ink composition.

The ink composition according to the present embodiment may include a pH adjuster. The pH adjuster can easily adjust the pH value of the ink composition. The pH adjuster may be used singly or in a mixture of two or more kinds thereof.

Examples of the pH adjuster include inorganic acids (for example, sulfuric acid, hydrochloric acid, acetic acid, and the like), inorganic bases (for example, lithium hydroxide, sodium hydroxide, potassium hydroxide, ammonia, and the like), organic bases (triethanolamine, diethanolamine, monoethanolamine, and tri-iso-propanolamine), organic acids (for example, adipic acid, citric acid, succinic acid, and the like), etc.

As the pH adjuster, at least one of the organic acids and the organic bases among those above is preferably used. Particularly, in the case of using a combination of the organic acid and the organic base, a combination of the inorganic acid and the inorganic base, a combination of the inorganic acid and the organic base, or a combination of the organic acid and the inorganic base has a higher pH buffering ability. For this reason, in the case of using a combination of the organic acid and the organic base, an effect of inhibiting variance of the pH value is further enhanced, and an effect of easily setting a desired pH can be attained.

The ink composition according to the present embodiment may further include an antiseptic/antifungal agent, an anticorrosive, a chelating agent, or the like. If the ink composition according to the present embodiment includes these compounds, its characteristics may be further improved in some cases.

Examples of the antiseptic/antifungal agent include sodium benzoate, sodium pentachlorophenol, sodium 2-pyridinethiol-1-oxide, sodium sorbate, sodium dehydroacetate, 1,2-dibenzothiazoline-3-one, and the like. Commercially available products of the antiseptic/antifungal agent include Proxel XL2 and Proxel GXL (trade names, all manufactured by Avecia), Denicide CSA and NS-500W (trade names, all manufactured by Nagase Chemtex), and the like.

Examples of the anticorrosive include benzotriazole and the like.

Examples of the chelating agent include ethylenediaminetetraacetic acid and salts thereof (sodium dihydrogen ethylenediaminetetraacetate and the like), etc.

1.6. Physical Properties

In the case where the ink composition according to the present embodiment is used in an ink jet recording device, the ink composition preferably has a viscosity of equal to or more than 2 mPa·s and equal to or less than 10 mPa·s, and preferably equal to or more than 3 mPa·s and equal to or less than 6 mPa·s, at 20° C. When the ink composition has a viscosity in the above-described range at 20° C., nozzles can eject an appropriate amount of the ink composition, and the deviation or scattering of droplets can be further reduced. Thus, such an ink composition can be suitably used in an ink jet recording device. The viscosity of the ink composition can be measured with a vibration viscometer VM-100AL (manufactured by Yamaichi Electronics) while the ink composition is kept at 20° C.

The pH of the ink composition according to the present embodiment is preferably equal to or more than 7 and equal to or less than 9, preferably equal to or more than 7 and equal to or less than 8, and particularly preferably equal to or more than 7 and equal to or less than 7.5, at 20° C. If the pH of the ink composition at 20° C. is in the above-described range, the storage stability can be further improved or corrosion of the nozzle surface of the ink jet recording device can be reduced. Particularly, as the pH of ink composition is close to 7 from the alkaline side, the storage stability becomes more excellent. The pH of the ink composition can be measured by, for example, a desktop type pH meter (product number "F-50", manufactured by Horiba, Ltd.) while the ink composition is kept at 20° C.

2. Ink Jet Recording Method

The ink jet recording method according to the present embodiment includes ejecting the droplets of the ink composition. The ink jet recording method according to the present embodiment can be carried out using an ink jet recording device known in the related art.

The ink jet recording method using an ink jet recording device can be carried out, for example, as follows. Specifically, an image can be formed by ejecting the ink composition in the form of liquid droplets onto a recording medium to adhere the liquid droplets of the ink composition onto the recording medium. As the ink jet ejecting method, any of methods known in the related art may be used, and in particular, excellent image recording can be carried out using a method for ejecting liquid droplets using vibration of a piezoelectric element (a recording method using an ink jet head for forming ink droplets by mechanical deformation of an electrostrictive element).

The recording medium is not particularly limited, but examples thereof include paper, cardboard, fibrous products, sheets, films, plastics, glass, ceramics, metals, and the like.

3. Examples

Hereinbelow, the invention will be described in more detail with reference to Examples and Comparative Examples, but these are not intended to limit the invention.

3.1. Synthesis of Dyes

Preparation Example 1

By Processes 1 to 3 below, a compound represented by the following formula (41) was synthesized.

Process 1

To 200 parts of water was added 35.7 parts of a monoazo compound represented by the following formula (42), and adjusted to pH 6 by the addition of sodium hydroxide, followed by addition of 7.2 parts of sodium nitrite, to give a solution. This solution was added dropwise to an aqueous solution formed by diluting 31.3 parts of 35% hydrochloric acid in 200 parts of water over 30 minutes with temperature kept at 0 to 10° C., followed by stirring at 20° C. or lower for 1 hour, and a diazotization reaction was carried out. To the resulting reaction liquid was added 0.4 parts of sulfamic acid, followed by stirring for 5 minutes, to give a final diazo reaction liquid.

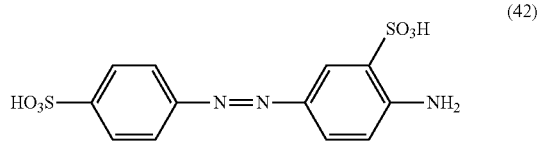

(42)

On the other hand, 24.0 parts of a compound represented by the following formula (43) and a 25% aqueous sodium hydroxide solution to adjust the solution to pH 5 to 6 were added to 300 parts of water at 40 to 50° C., thereby obtaining an aqueous solution. While keeping this aqueous solution at 15 to 25° C., the diazo reaction liquid above was added dropwise thereto over 30 minutes. During the dropwise addition, an aqueous sodium carbonate solution was added to the solution to maintain pH at 5 to 6. Next, after stirring at 15 to 25° C. and pH 5 to 6 for 2 hours, 35% hydrochloric acid was added to the solution to adjust to pH 0 to 1. The resulting liquid was kept while heating at 65° C., and stirred for 2 hours, and then cooled to 25° C., and the precipitate was separated and collected by filtration to obtain 130 parts of a wet cake including a compound represented by the following formula (44).

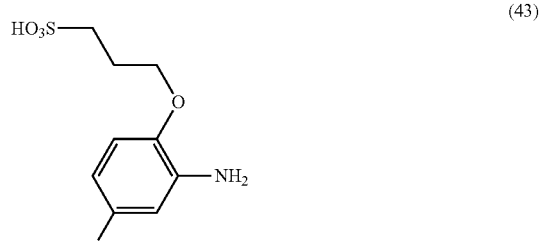

(43)

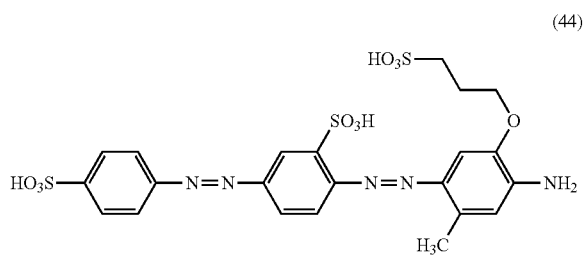

(44)

Process 2

To 250 parts of water were added 65 parts of the wet cake obtained in the Process 1 above and a 25% aqueous sodium hydroxide solution to give a solution. Further, the solution was adjusted to pH 7 to 8. To this solution was added 0.1 parts of Leocol TD-90 (surfactant, manufactured by Lion Corporation), and then, 3.8 parts of cyanuric chloride was added thereto at 15 to 25° C. Next, the mixture was kept at pH 5 to 6 by the addition of an aqueous sodium carbonate solution while stirring at 15 to 25° C. for 2 hours. Then, this reaction liquid was heated to 60 to 65° C., and stirred for 5 hours while keeping the mixture at pH 6 to 7 by the addition of an aqueous sodium carbonate solution.

Next, 0.89 parts of piperazine was added thereto, and the mixture was heated to 90 to 95° C., and stirred for 16 hours while keeping the mixture at pH 8 to 9 by the addition of an aqueous sodium carbonate solution. The resulting reaction liquid was cooled to 25° C., sodium chloride was added thereto, and the precipitated solid was separated and collected by filtration to obtain a wet cake. To this wet cake was added 400 parts of water to give a solution. To this solution were added 50 parts of methanol and 800 parts of 2-propanol, the precipitated solid was separated and collected by filtration, and dried to obtain a sodium salt of a compound represented by the following formula (41).

(41)

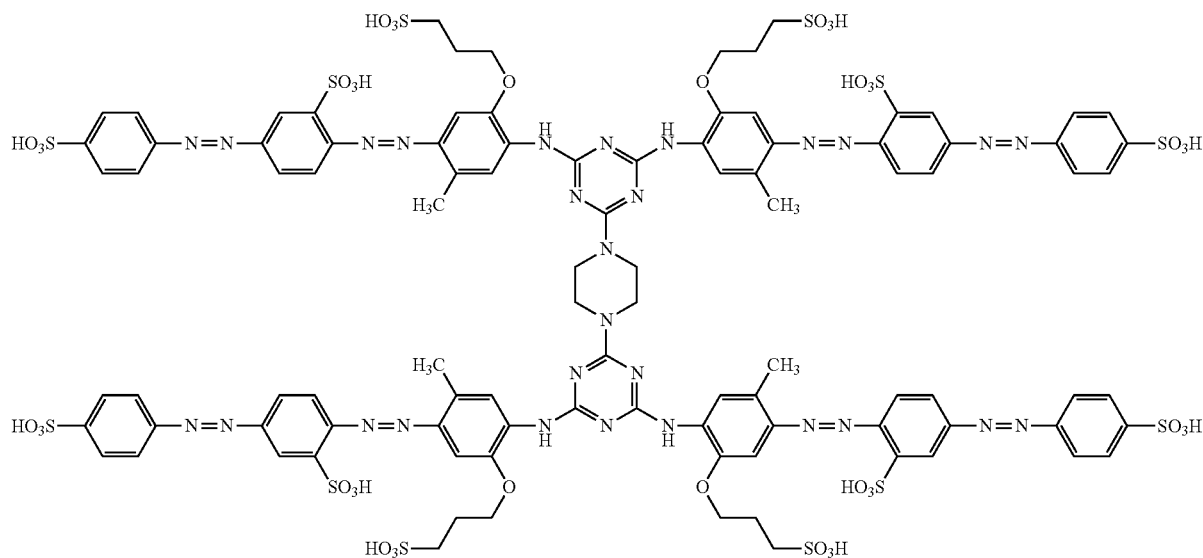

3.2. Preparation of Ink Composition

The respective components were mixed and stirred with the blending ratios shown in Table 30 and press-filtered with a membrane filter having a spherical diameter of 1.0 μm, to obtain an ink component of each of Examples 1 to 8 and Comparative Examples 1 to 3. Further, the unit described in Table 30 was % by mass. In addition, the pH of the ink composition shown in Table 30 was measured using a desktop type pH meter (product number "F-50", manufactured by Horiba, Ltd.) while the temperature of the ink composition was kept at 20° C.

The respective components shown in Table 30 are shown below. Further, the sodium salt obtained in Preparation Example 1 above was treated by an ordinary method to give a lithium salt, which was used as the following Bw-1.

1. Dye (Coloring Material)
   Bk-1 (lithium salt of a compound represented by the following formula (14), which corresponds to the "first dye" in the present specification)
   Bw-1 (lithium salt of a compound represented by the following formula (41), which corresponds to the "second dye" in the present specification)
   Bk-2 (lithium salt of a compound represented by the following formula (52), which corresponds to the "third dye" in the present specification)
   Bk-3 (lithium salt of a compound represented by the following formula (61))
   Y-1 (C. I. Direct Yellow 86, manufactured by Daiwa Kasei Co., Ltd.)
2. Moisturizer
   Glycerin
   Triethylene glycol
   2-Pyrrolidone
   Urea
3. Permeation Accelerator
   Triethylene glycol monobutyl ether
4. Surfactant
   Acetylene glycol-based surfactant (trade name "Olfine E1010", manufactured by Nissin Chemical Industry Co., Ltd.)
5. pH Adjuster
   Adipic acid
   Tri-iso-propanolamine
   Triethanolamine
6. Water
   Pure water (14)

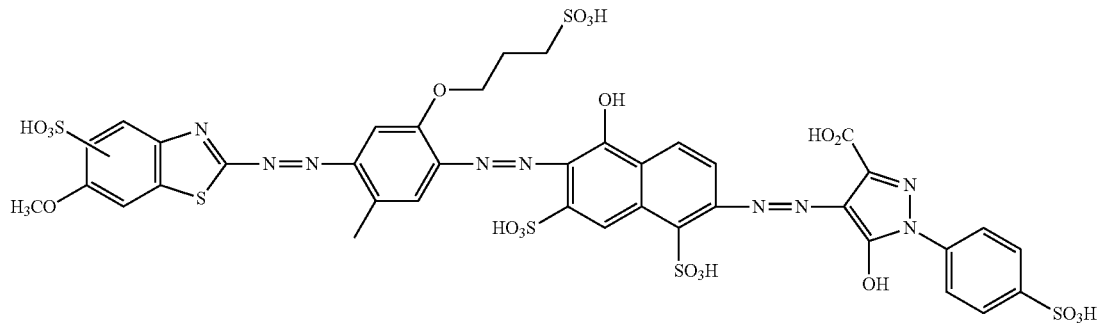

-continued

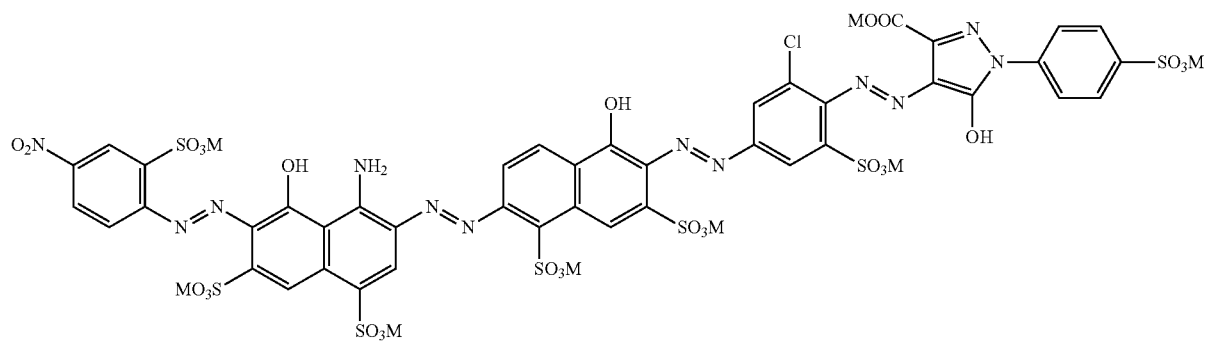
(52)

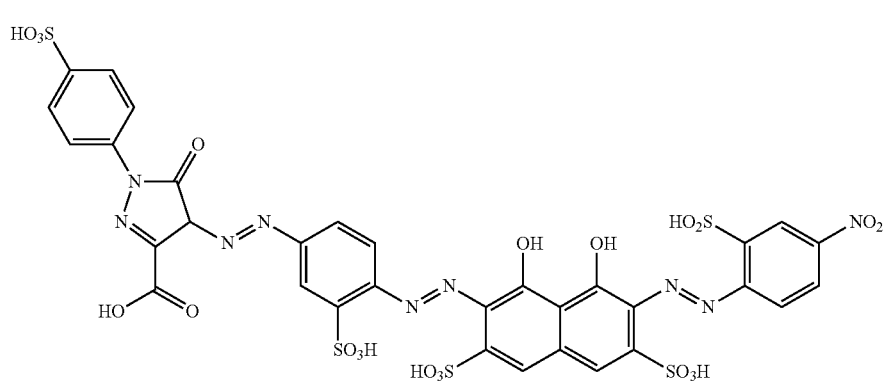
(61)

3.3. Evaluation of Storage Stability

The ink composition obtained above was diluted 2000 times by volume with pure water. The diluted liquid obtained was put into a sample bottle, and completely sealed. This sample bottle was stored at 70° C. for 6 days, and then returned to 20° C., at which time the absorption spectrum was measured. The storage stability was evaluated by determining the ratio (residual rate=Ab/Aa) of an absorbance at a maximum absorbance wavelength (Aa) at 20° C. before storage and an absorbance at a maximum absorbance wavelength (Ab) at 20° C. after storage. The absorption spectrum was measured in accordance with JIS K0115. Specifically, the ink composition was diluted 1000 times with ion-exchanged water, and the absorption spectrum was measured using a quartz cell (optical path length 10 mm) as a measurement cell, and a spectrophotometer (trade name "U-3000", manufactured by Hitachi, Ltd.) as a measurement apparatus.

The evaluation criteria for storage stability are as follows. Further, a higher residual rate indicates superior storage stability, and in the evaluation criteria, "A" and "B" indicate acceptability in practical use in the criteria. The evaluation results are also shown in Table 30.

"A": Residual rate being equal to or more than 95%.
"B": Residual rate being equal to or more than 90% and less than 95%.
"C": Residual rate being less than 90%.

3.4. Evaluation of Color Developing Density
1. Preparation of Evaluation Sample

The ink composition obtained above was filled into each ink chamber of a cartridge exclusively for an ink jet printer (trade name "PM-G800", manufactured by Seiko Epson Co., Ltd.). Further, the ink cartridge was installed in the printer, and a solid pattern image was recorded onto photographic paper, CRSIPIA (trade name, product number "KA450SCKR", manufactured by Seiko Epson Co., Ltd.) to obtain an evaluation sample. Recording of the solid pattern image was carried out under the conditions of a resolution of 2880×1440 dpi and a duty of 100%.

2. Measurement of Color Developing Density

Using a spectrophotometer, Spectrolino (trade name, manufactured by GretagMacbeth), the OD (Optical Density) value of the image recorded on the evaluation sample was measured.

The evaluation criteria for the color developing density are as follows. Further, a higher OD value indicates a superior color developing density, and in the following evaluation criteria, "A" and "B" indicate acceptability in practical use in the criteria. The evaluation results are also shown in Table 30.

"A": OD value being equal to or more than 2.3.
"B": OD value being equal to or more than 2.2 and less than 2.3.
"C": OD value being less than 2.2.

3.5. Evaluation of Color a* and b* (L*a*b* color system defined by CIE (International Commission on Illumination)) of the image recorded on the evaluation sample obtained in "1. Preparation of Evaluation Sample in 3.4. Evaluation of Color Developing Density" was measured using a spectrophotometer, Spectrolino (trade name, manufactured by GretagMacbeth) in accordance with JIS Z8729.

The evaluation criteria for the color are as follows. In the evaluation criteria, "A" indicates a color close to achromatic color, from which it can be judged that an image showing good black color to the naked eye can be recorded. The evaluation results are also shown in Table 30.

"A": The a* value is in the range from −3 to 3 while the b* value is in the range from −3 to 3.

"C": At least one of the a* value and the b* value is not in the range from −3 to 3.

3.6. Evaluation of Light Resistance

1. Preparation of Evaluation Sample

The ink composition obtained above was filled into each of an ink chamber of a cartridge for an ink jet printer (trade name "PM-A700", manufactured by Seiko Epson Co., Ltd.). Further, the ink cartridge was installed in the printer, and a solid pattern image was recorded onto photographic paper, CRSIPIA (trade name, product number "KA450SCKR", manufactured by Seiko Epson Co., Ltd.) to obtain an evaluation sample. Recording of the solid pattern image was carried out while adjusting the duty such that the OD (Optical Density) of the obtained image was 1.0.

2. Evaluation Test on Light Resistance

The evaluation sample obtained above was left to stand in a dark place at room temperature for one day. Thereafter, the evaluation sample was installed in a Xenon Light Resistance Tester XL-75s (trade name: manufactured by Suga Test Instruments Co., Ltd.), and an exposure test was carried out for 14 days under the conditions of a relative humidity at 23° C. of 50% RH and an illuminance of 75000 lux.

Moreover, using a spectrophotometer, Spectrolino (trade name, manufactured by GretagMacbeth), the OD values of the image recorded on the sample before and after light irradiation were measured. The OD value was measured using a light source of D50, without a light source filter, with an absolute whiteness as a whiteness standard at a viewing angle of 2°.

Further, evaluation of the light resistance was carried out by determining a Relict Optical Density (ROD) of an image of each recorded matter after light irradiation from the measured value obtained (OD value). The method for calculating the ROD is "ROD(%)=(Dn/Do)×100 (wherein Dn represents an OD value of the image after completion of the light irradiation test and Do represents an OD value of the image before initiation of the light irradiation test)". A higher value of ROD indicates less deterioration in the image due to light irradiation.

The evaluation criteria for the light resistance are as follows. In the evaluation criteria, "A" and "B" indicate the light resistance which can be judged to be acceptable in practical use. The evaluation results are also shown in Table 30.

"A": ROD being equal to or more than 80%.

"B": ROD being equal to or more than 70% and less than 80%.

"C": ROD being less than 70%.

3.7. Evaluation on Ozone Resistance

Evaluation of the ozone resistance of the evaluation sample obtained in "1. Preparation of Evaluation Sample in 3.6. Evaluation of Light Resistance" was carried out. Specifically, the evaluation sample was installed in an Ozone Weatherometer OMS-L Type (trade name, a weatherometer manufactured by Suga Test Instruments Co., Ltd.), and an exposure test by ozone was carried out for 40 hours under the conditions of a temperature of 23° C., a humidity of 50% RH, and an ozone concentration of 5 ppm.

Moreover, using a spectrophotometer, Spectrolino (trade name, manufactured by GretagMacbeth), the OD values of the image recorded on the sample before and after exposure to ozone were measured. The OD value was measured using a light source of D50, without a light source filter, with an absolute whiteness as a whiteness standard at a viewing angle of 2°.

In addition, evaluation of the ozone resistance was carried out by ROD that can be determined using the same determination method as "2. Evaluation Test on Light Resistance in 3.6. Evaluation of Light Resistance". A higher value of ROD indicates less deterioration in the image due to exposure to ozone.

The evaluation criteria for the ozone resistance are as follows. In the evaluation criteria, "A" and "B" indicate the ozone resistance which can be judged to be acceptable in practical use. The evaluation results are also shown in Table 30.

"A": ROD being equal to or more than 80%.

"B": ROD being equal to or more than 70% and less than 80%.

"C": ROD being less than 70%.

3.8. Evaluation Results

TABLE 30

|  |  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|---|---|
| Dye (coloring material) | Bk-1 (first dye) | 1.9 | 2.5 | 1.9 | 1.9 | 1.9 | 1.9 | 3.5 |  |  |  | 2.3 | 1.9 | 3.5 | 4.5 |
|  | Bw-1 (second dye) | 1.2 | 1.2 | 1.8 | 1.2 | 1.2 | 1.2 | 1 | 1 | 1.2 |  |  |  |  |  |
|  | Bk-2 (third dye) | 1.9 | 1.9 | 1.9 | 1 | 2.4 | 1.9 |  | 3.5 | 1.9 | 2.3 | 1.9 |  |  |  |
|  | Bk-3 |  |  |  |  |  |  |  |  |  |  |  |  |  | 6 |
|  | Y-1 |  |  |  |  |  |  |  |  |  |  |  |  |  | 0.4 |
| Moisturizer | Glycerin | 9 | 9 | 9 | 9 | 9 | 9 | 9 | 9 | 9 | 9 | 9 | 9 | 9 | 9 |
|  | Triethylene glycol | 2 | 2 | 2 | 2 | 2 | 2 | 2 | 2 | 2 | 2 | 2 | 2 | 2 | 2 |
|  | 2-Pyrrolidone | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Urea | 4 | 4 | 4 | 4 | 4 | 4 | 4 | 4 | 4 | 4 | 4 | 4 | 4 | 4 |
| Permeation accelerator | Triethylene glycol monobutyl ether | 9 | 9 | 9 | 9 | 9 | 9 | 9 | 9 | 9 | 9 | 9 | 9 | 9 | 9 |
| Surfactant | Olfine E1010 | 0.8 | 0.8 | 0.8 | 0.8 | 0.8 | 0.8 | 0.8 | 0.8 | 0.8 | 0.8 | 0.8 | 0.8 | 0.8 | 0.8 |
| pH adjuster | Adipic acid |  |  |  |  | 0.03 |  |  |  |  | 0.03 |  | 0.03 |  |  |
|  | Triisopropanolamine |  |  |  |  | 0.1 |  |  |  |  | 0.1 |  | 0.1 |  |  |
|  | Triethanolamine | 1 | 1 | 1 | 1 |  | 1 | 1 |  | 1 |  | 1 |  | 1 | 1 |
| Water | Pure water | Balance | Balance | Balance | Balance | Balance | Balance | Balance | Balance | Balance | Balance | Balance | Balance | Balance | Balance |

TABLE 30-continued

|  |  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|---|---|
| pH value measured (20° C.) | | 8.8 | 8.8 | 8.8 | 8.8 | 8.8 | 7.3 | 8.9 | 8.9 | 7.2 | 8.8 | 7.3 | 9.0 | 9.0 | 8.5 |
| Evaluation results | Color | A | A | A | A | A | A | A | A | A | C | C | C | C | C |
| | Color developing density | A | B | A | A | A | A | B | C | C | A | B | C | C | B |
| | Ozone resistance | A | A | A | A | A | A | A | B | C | A | A | A | A | C |
| | Light resistance | A | A | A | B | A | A | B | A | A | A | A | B | B | C |
| | Storage stability | B | B | B | B | B | A | B | C | B | B | A | B | B | A |

As seen from Table 30, according to the ink compositions of Examples 1 to 7, an image having good color, color developing density, light resistance, and ozone resistance could be recorded. Further, an ink composition having more excellent storage stability could be obtained by adjusting the pH.

On the other hand, the ink compositions of Comparative Examples 1 and 2 did not include a compound corresponding to the first dye. For this reason, an image having excellent color could be obtained, but an image having a sufficient color developing density could not be obtained.

The ink composition of Comparative Examples 3 and 4 did not include a compound corresponding to the second dye. For this reason, an image having excellent color developing density and ozone resistance could be obtained, but an image having a bluish black color was obtained. Thus, an image having good black color close to achromatic color could not be obtained.

Moreover, the ink composition of Comparative Examples 5 and 6 did not include a compound corresponding to the second dye. For this reason, an image having excellent ozone resistance could be obtained, but an image having sufficient color and color developing density could not be obtained. Further, in the evaluation samples of Comparative Examples 5 and 6, a bronzing phenomenon was shown. Therefore, an image having a sufficient color developing density could not be obtained even by adjusting the content of the dye as in Comparative Example 6.

Furthermore, the ink composition of Comparative Example 7 did not include a compound corresponding to the first dye and the second dye. For this reason, an image having a bluish black color can be obtained, and thus, an image having good black color close to achromatic color could not be obtained. In addition, the light resistance and ozone resistance of the recorded image were not excellent.

The invention is not limited to the embodiments as described above, and various modifications can be made. For example, the invention includes a construction that is substantially the same as the construction described in the embodiments (for example, constructions having the same functions, methods, and results as those above, or constructions having the same purposes and effects as those above). Further, the invention also includes constructions in which portion that are not essential in the constructions described in the embodiments are replaced with other portions. In addition, the invention includes constructions that exert the same action and effect or the same purposes as described in the embodiments. Further, the invention includes constructions as described in the embodiments, with well-known technologies added.

What is claimed is:

1. An ink composition comprising:
water,
a compound represented by the following general formula (1) or a salt thereof, and
a compound represented by the following general formula (21) or a salt thereof:

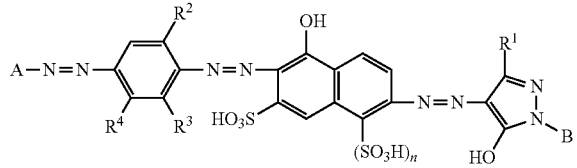

(1)

in the formula (1), n represents 0 or 1, $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group, $R^2$, $R^3$, and $R^4$ each independently represent a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy-C1-C4 alkoxy group, a sulfo group, or a carboxy group; a mono- or di-C1-C4 alkylamino group which may be substituted with a hydroxy group, a sulfo group, or a carboxy group; a C1-C4 alkylcarbonylamino group which may be substituted with a hydroxy group or a carboxy group; an N'—C1-C4 alkylureide group which may be substituted with a hydroxy group, a sulfo group, or a carboxy group; a phenylamino group in which a benzene ring may be substituted with a chlorine atom, a C1-C4 alkyl group, a nitro group, a sulfo group, or a carboxy group; a benzoylamino group in which a benzene ring may be substituted with a chlorine atom, a C1-C4 alkyl group, a nitro group, a sulfo group, or a carboxy group; or a phenylsulfonylamino group in which a benzene ring may be substituted with a chlorine atom, a C1-C4 alkyl group, a nitro group, a sulfo group, or a carboxy group, and Group A represents a substituted heterocyclic group represented by the following general formula (2) or (3)):

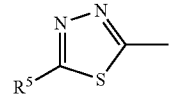

(2)

in the formula (2), $R^5$ represents a mercapto group; or a C1-C4 alkylthio group which may be substituted with a hydroxy group, a C1-C4 alkoxy group, a hydroxy-C1-C4 alkoxy group, a sulfo group, or a carboxy group, (3)

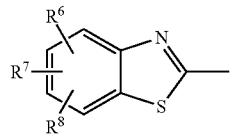

in the formula (3), $R^6$, $R^7$, and $R^8$ each independently represent a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group which may be substituted with a hydroxy group, a C1-C4 alkoxy group, a hydroxy-C1-C4 alkoxy group, a sulfo group, or a carboxy group; a C1-C4 alkylsulfonyl group which may be substituted with a hydroxy group, a sulfo group, or a carboxy group; or a phenylsulfonyl group in which a benzene ring may be substituted with a chlorine atom, a C1-C4 alkyl group, a nitro group, a sulfo group, or a carboxy group, Group B represents a substituted phenyl group or naphthyl group, in the case where the Group B is a substituted phenyl group, it has a substituent selected from the group consisting of a hydroxy group; a sulfo group; a carboxy group; a C1-C4 alkyl group; a C1-C4 alkoxy group; an amino group; a mono- or di-C1-C4 alkylamino group; an acetylamino group; and a benzoylamino group in which a benzene ring may be substituted with a chlorine atom, a C1-C4 alkyl group, a nitro group, a sulfo group, or a carboxy group, and in the case where the Group B is a substituted naphthyl group, it has a substituent selected from the group consisting of a hydroxy group; a sulfo group; a C1-C4 alkoxy group; and a phenylsulfonyloxy group in which a benzene ring may be substituted with a methyl group, a nitro group, or a chlorine atom, (21)

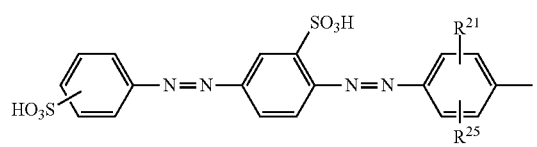

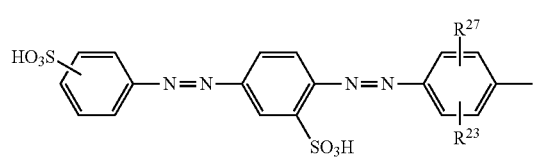

-continued

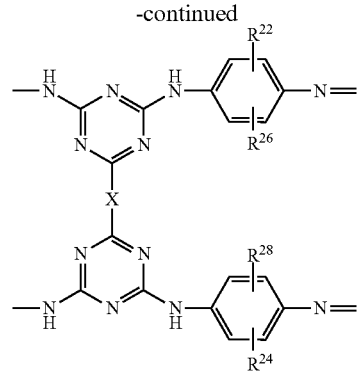

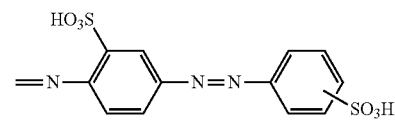

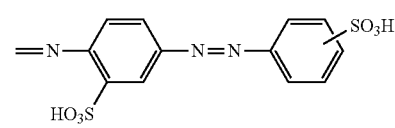

in the formula (21), $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group which is substituted with at least one group selected from the group consisting of a hydroxy group, a C1-C4 alkoxy group, a hydroxy-C1-C4 alkoxy group, a sulfo group, and a carboxy group as a substituent; a C1-C4 alkylcarbonylamino group; a C1-C4 alkylcarbonylamino group substituted with a carboxy group; a ureide group; a mono-C1-C4 alkylureide group; a di-C1-C4 alkylureide group; a mono-C1-C4 alkylureide group substituted with at least one group selected from the group consisting of a hydroxy group, a sulfo group, and a carboxy group as a substituent; a di-C1-C4 alkylureide group substituted with at least one group selected from the group consisting of a hydroxy group, a sulfo group, and a carboxy group as a substituent; a benzoylamino group; a benzoylamino group in which a benzene ring is substituted with at least one group selected from the group consisting of a halogen atom, a C1-C4 alkyl group, a nitro group, a sulfo group, and a carboxy group; a benzenesulfonylamino group; or a phenylsulfonylamino group in which a benzene ring is substituted with at least one group selected from the group consisting of a halogen atom, a C1-C4 alkyl group, a nitro group, a sulfo group, and a carboxy group; and X represents a divalent crosslinking group.

2. The ink composition according to claim 1, further comprising a compound represented by the following general formula (51):

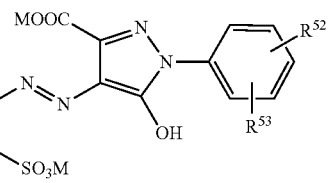
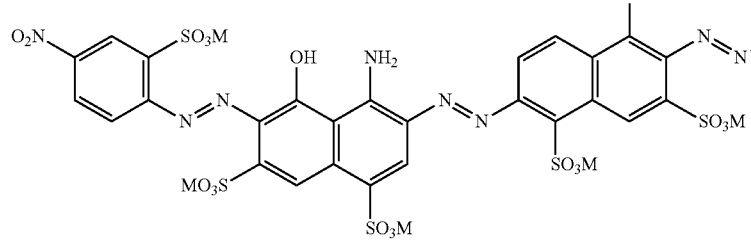

(51)

in the formula (51), $R^{51}$ represents a halogen atom; a hydrogen atom; $SO_3M$; or COOM;

$R^{52}$ and $R^{53}$ each independently represent a hydrogen atom; $SO_3M$; or COOM; and M's each independently represent at least one of Li and Na, provided that there is no case where all of $R^{52}$ and $R^{53}$ are hydrogen atom.

3. The ink composition according to claim 1,
wherein the divalent crosslinking group represented by X in the general formula (21) is any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which an alkyl moiety is substituted with a hydroxy group or a carboxy group; an amino-C1-C6 alkoxy-C1-C6 alkylamino group; an amino-C1-C4 alkoxy-C1-C4 alkoxy-C1-C4 alkylamino group; a xylenediamino group; a piperazine-1,4-diyl group; a piperazine-1,4-diyl group substituted with a C1-C4 alkyl group or a C1-C4 alkoxy group; and a phenylenediamino group.

4. The ink composition according to claim 1,
wherein $R^{21}$, $R^{22}$, $R^{23}$, $R^{24}$, $R^{25}$, $R^{26}$, $R^{27}$, and $R^{28}$ in the general formula (21) each independently represent a hydrogen atom; a halogen atom; a C1-C4 alkyl group; a C1-C4 alkoxy group; a C1-C4 alkoxy group substituted with a sulfo group or a carboxy group; or C1-C4 alkyl-carbonylamino group.

5. The ink composition according to claim 1,
wherein the compound represented by the general formula (21) or a salt thereof is a compound represented by the following formula (41) or a salt thereof:

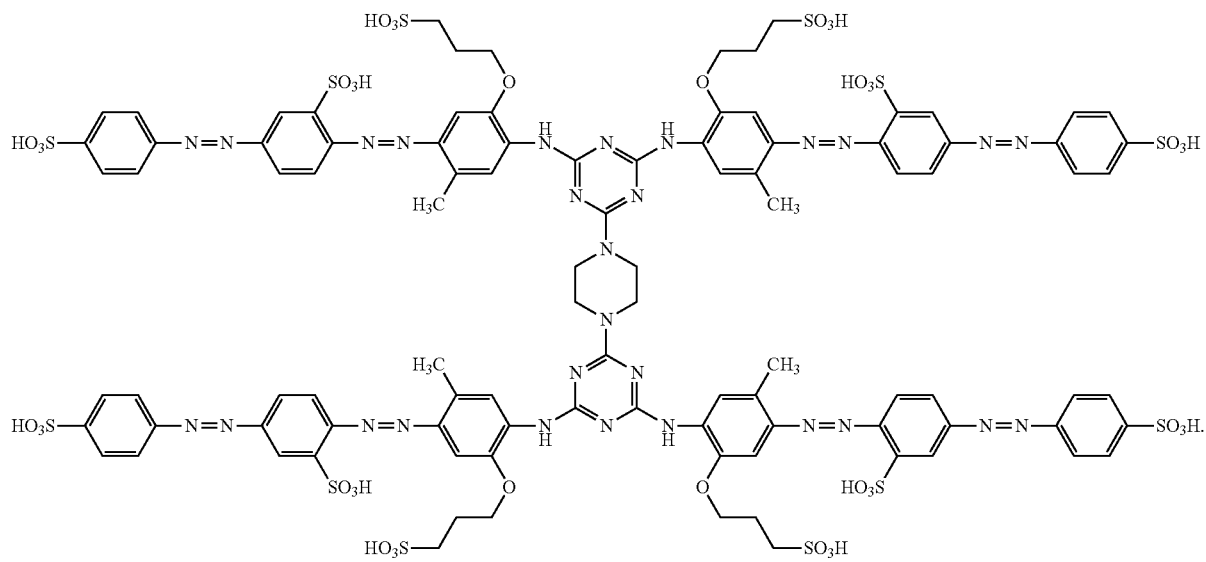

(41)

6. The ink composition according to claim 1,
wherein the compound represented by the general formula (1) or a salt thereof is a compound represented by the following general formula (14) or a salt thereof:

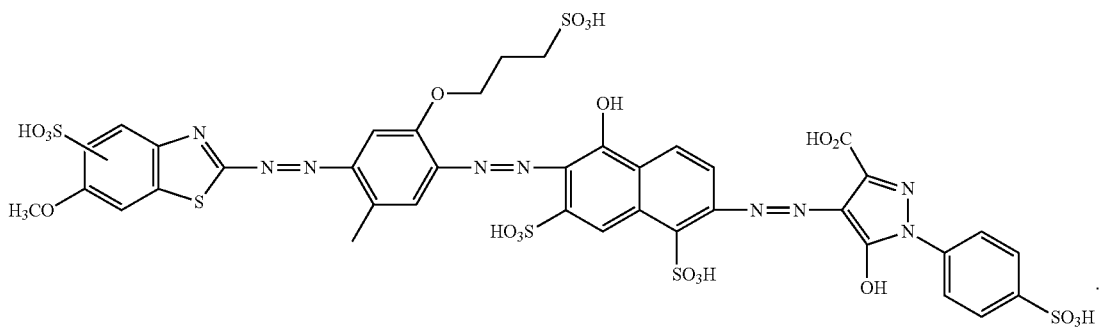

(14)

7. The ink composition according to claim 2,
wherein the compound represented by the general formula (51) is a compound represented by the following general formula (52):

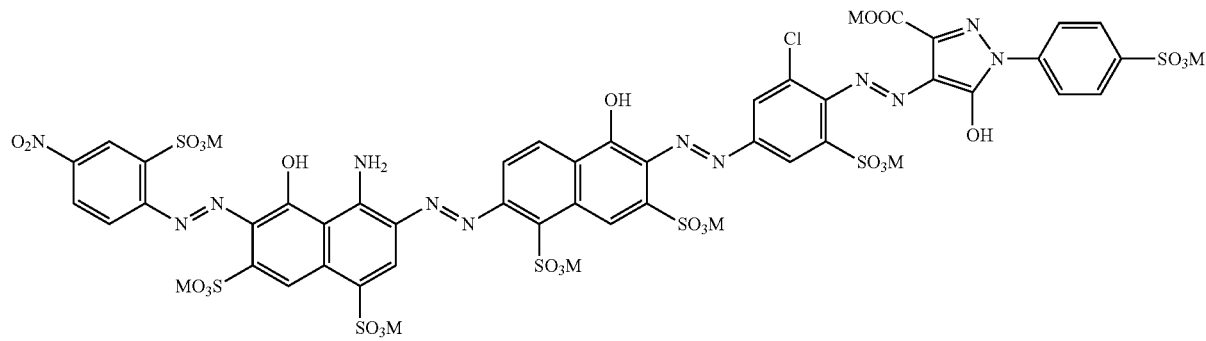

(52)

in the formula (52), M's each independently represent at least one of Li and Na.

8. The ink composition according to claim 1,
wherein the ink composition further comprises at least one of an organic acid and an organic base,
the organic acid is at least one selected from adipic acid, citric acid, and succinic acid, and
the organic base is at least one selected from triethanolamine, diethanolamine, monoethanolamine, and triisopropanolamine.

9. The ink composition according to claim 1,
wherein the ratio (MB/MA) of the content [MA (% by mass)] of the compound represented by the general formula (1) or a salt thereof and the content [MB (% by mass)] of the compound represented by the general formula (21) or a salt thereof is equal to or more than 0.4 and equal to or less than 1.

10. The ink composition according to claim 2,
wherein the ratio (MC/MA) of the content [MA (% by mass)] of the compound represented by the general formula (1) or a salt thereof and the content [MC (% by mass)] of the compound represented by the general formula (51) is equal to or more than 0.5 and equal to or less than 1.5.

11. The ink composition according to claim 1,
wherein the pH at 20° C. is equal to or more than 7 and equal to or less than 7.5.

12. An ink jet recording method comprising ejecting the liquid droplets of the ink composition according to claim 1.

13. An ink jet recording method comprising ejecting the liquid droplets of the ink composition according to claim 2.

14. An ink jet recording method comprising ejecting the liquid droplets of the ink composition according to claim 3.

15. An ink jet recording method comprising ejecting the liquid droplets of the ink composition according to claim 4.

16. An ink jet recording method comprising ejecting the liquid droplets of the ink composition according to claim 5.

17. An ink jet recording method comprising ejecting the liquid droplets of the ink composition according to claim 6.

18. An ink jet recording method comprising ejecting the liquid droplets of the ink composition according to claim 7.

19. An ink jet recording method comprising ejecting the liquid droplets of the ink composition according to claim 8.

20. An ink jet recording method comprising ejecting the liquid droplets of the ink composition according to claim 9.

* * * * *